US009492754B2

(12) United States Patent
Beppu et al.

(10) Patent No.: US 9,492,754 B2
(45) Date of Patent: Nov. 15, 2016

(54) METHOD, SYSTEM, AND STORAGE MEDIUM FOR DISPLAYING DISTRIBUTED MEDIA CONTENT IN A CALENDAR SCREEN

(75) Inventors: Yusuke Beppu, Kyoto (JP); Kiyoshi Mizuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1269 days.

(21) Appl. No.: 12/492,693

(22) Filed: Jun. 26, 2009

(65) Prior Publication Data

US 2010/0188936 A1 Jul. 29, 2010

(30) Foreign Application Priority Data

Jan. 28, 2009 (JP) ................................ 2009-017145

(51) Int. Cl.
*G06F 3/00* (2006.01)
*A63F 13/77* (2014.01)
(Continued)

(52) U.S. Cl.
CPC ............... *A63F 13/77* (2014.09); *A63F 13/12* (2013.01); *H04N 5/44543* (2013.01); *H04N 7/163* (2013.01); *H04N 21/4781* (2013.01); *H04N 21/4786* (2013.01); *H04N 21/47214* (2013.01); *H04N 21/4821* (2013.01); *H04N 21/8153* (2013.01); *A63F 13/87* (2014.09); *A63F 2300/308* (2013.01); *A63F 2300/407* (2013.01); *A63F 2300/572* (2013.01); *A63F 2300/8094* (2013.01)

(58) Field of Classification Search
CPC ........... G06Q 10/109; G06Q 10/1093; G06Q 10/06311; G06Q 10/063116; H04L 29/06; H04L 51/02; H04L 51/066; H04L 51/08; H04L 51/14; H04L 51/18; H04L 51/38; H04L 67/04; H04L 67/1095; H04L 67/16; H04L 67/18; H04L 67/26; H04L 69/16; H04L 69/329; H04L 12/66
USPC ............................. 368/10, 29; 715/751, 963
See application file for complete search history.

(56) References Cited

U.S. PATENT DOCUMENTS 6,351,763 B1 * 2/2002 Kawanaka .................... 709/206
6,948,131 B1 9/2005 Neven et al.
(Continued)

FOREIGN PATENT DOCUMENTS

| | | |
|---|---|---|
| EP | 2003588 | 12/2008 |
| JP | 9-023391 A | 1/1997 |

(Continued)

OTHER PUBLICATIONS

United States Office Action issued for U.S. Appl. No. 12/492,718, dated Feb. 7, 2012.
(Continued)

*Primary Examiner* — Alvin Tan
*Assistant Examiner* — Ayesha Huertas Torres
(74) *Attorney, Agent, or Firm* — Nixon & Vanderhye, P.C.

(57) ABSTRACT

A CPU of a game device has a weekly calendar screen displayed. In this calendar screen, dates in one week are displayed separately. In the calendar screen, a content display field is provided, in which a thumbnail image or the like of a content brought in correspondence with each day is displayed. A time and day of start of availability and a time and day of end of availability are determined for each content such as a motion picture, and downloading of the content by a user is permitted during a period from the time and day of start of availability to the time and day of end of availability.

22 Claims, 49 Drawing Sheets

(51) Int. Cl.

| | |
|---|---|
| ***A63F 13/30*** | (2014.01) |
| ***H04N 5/445*** | (2011.01) |
| ***H04N 7/16*** | (2011.01) |
| ***H04N 21/472*** | (2011.01) |
| ***H04N 21/478*** | (2011.01) |
| ***H04N 21/4786*** | (2011.01) |
| ***H04N 21/482*** | (2011.01) |
| ***H04N 21/81*** | (2011.01) |
| *A63F 13/87* | (2014.01) |

(56) References Cited

U.S. PATENT DOCUMENTS

| | | | | |
|---|---|---|---|---|
| 7,146,631 | B1 | 12/2006 | Tanaka et al. | |
| 7,188,355 | B1 | 3/2007 | Prokopenko et al. | |
| 7,721,224 | B2 * | 5/2010 | Sellen et al. | 715/804 |
| 7,827,240 | B1 * | 11/2010 | Atkins et al. | 709/204 |
| 2002/0056109 | A1 | 5/2002 | Tomsen | |
| 2002/0113820 | A1 | 8/2002 | Robinson et al. | |
| 2002/0120934 | A1 | 8/2002 | Abrahams | |
| 2002/0124263 | A1 | 9/2002 | Yokomizo | |
| 2002/0133551 | A1 | 9/2002 | Ohba et al. | |
| 2002/0133826 | A1 | 9/2002 | Ohyama | |
| 2002/0161756 | A1 * | 10/2002 | Fesq et al. | 707/4 |
| 2002/0162120 | A1 | 10/2002 | Mitchell | |
| 2002/0167484 | A1 | 11/2002 | Hatanaka et al. | |
| 2002/0194604 | A1 | 12/2002 | Sanchez et al. | |
| 2003/0005439 | A1 | 1/2003 | Rovira | |
| 2003/0166414 | A1 | 9/2003 | Sako et al. | |
| 2004/0001087 | A1 | 1/2004 | Warmus et al. | |
| 2004/0179039 | A1 | 9/2004 | Blattner et al. | |
| 2004/0187158 | A1 | 9/2004 | Fellenstein et al. | |
| 2004/0205810 | A1 | 10/2004 | Matheny et al. | |
| 2004/0250282 | A1 | 12/2004 | Bankers et al. | |
| 2005/0055713 | A1 * | 3/2005 | Lee et al. | 725/46 |
| 2005/0060746 | A1 | 3/2005 | Kim | |
| 2005/0272504 | A1 | 12/2005 | Eguchi et al. | |
| 2006/0010467 | A1 | 1/2006 | Segel | |
| 2006/0080342 | A1 * | 4/2006 | Takaki | 707/100 |
| 2006/0183099 | A1 | 8/2006 | Feely et al. | |
| 2006/0271953 | A1 | 11/2006 | Jacoby et al. | |
| 2007/0100898 | A1 | 5/2007 | Petras et al. | |
| 2007/0247979 | A1 | 10/2007 | Brillon et al. | |
| 2007/0250366 | A1 * | 10/2007 | Nurmi | 705/8 |
| 2007/0250859 | A1 | 10/2007 | Ohkita et al. | |
| 2007/0277201 | A1 | 11/2007 | Wong et al. | |
| 2008/0022302 | A1 | 1/2008 | Tanaka et al. | |
| 2008/0028314 | A1 | 1/2008 | Bono et al. | |
| 2008/0163365 | A1 * | 7/2008 | Austin et al. | 726/21 |
| 2008/0194333 | A1 | 8/2008 | Zalewski | |
| 2008/0256450 | A1 * | 10/2008 | Takakura et al. | 715/721 |
| 2008/0301739 | A1 | 12/2008 | Goldeen et al. | |
| 2009/0100480 | A1 * | 4/2009 | McQuaide, Jr. | 725/100 |
| 2009/0165046 | A1 * | 6/2009 | Stallings et al. | 725/39 |
| 2009/0171771 | A1 | 7/2009 | Carden et al. | |

FOREIGN PATENT DOCUMENTS

| | | | |
|---|---|---|---|
| JP | 11-203215 | * | 7/1999 |
| JP | 2001-189896 | A | 7/2001 |
| JP | 2001-204005 | | 7/2001 |
| JP | 2001-242777 | A | 9/2001 |
| JP | 2002-109359 | A | 4/2002 |
| JP | 2002-163541 | A | 6/2002 |
| JP | 2002-197370 | | 7/2002 |
| JP | 2002-297866 | A | 10/2002 |
| JP | 2002-330365 | A | 11/2002 |
| JP | 2002-335518 | A | 11/2002 |
| JP | 2002-199375 | A | 12/2002 |
| JP | 2002-358329 | A | 12/2002 |
| JP | 2003-251071 | A | 9/2003 |
| JP | 2003-331138 | A | 11/2003 |
| JP | 2004-194136 | A | 8/2004 |
| JP | 2004-280667 | A | 10/2004 |
| JP | 2004-287851 | A | 10/2004 |
| JP | 2005-018212 | A | 1/2005 |
| JP | 2005-039749 | A | 2/2005 |
| JP | 2005-086811 | A | 3/2005 |
| JP | 2005-094765 | A | 4/2005 |
| JP | 2005-190325 | A | 7/2005 |
| JP | 2005-352651 | | 12/2005 |
| JP | 2006-094342 | | 4/2006 |
| JP | 2006-107260 | | 4/2006 |
| JP | 2007-110502 | | 4/2007 |
| JP | 2007-219739 | A | 8/2007 |
| JP | 2007-274642 | | 10/2007 |
| JP | 2007-323370 | | 12/2007 |
| JP | 2008-017372 | A | 1/2008 |
| JP | 2008-113231 | | 5/2008 |
| JP | 2008-140060 | A | 6/2008 |
| JP | 2009-267655 | A | 11/2009 |
| JP | 2010-535362 | A | 11/2010 |
| WO | 99-14947 | A | 3/1999 |
| WO | 01-39501 | A | 5/2001 |
| WO | WO 01/84334 | | 11/2001 |
| WO | 03/094072 | | 11/2003 |
| WO | 2007/120981 | | 10/2007 |
| WO | 2008/016611 | | 2/2008 |
| WO | 2008-104784 | A1 | 4/2008 |
| WO | 2008-055140 | | 8/2008 |
| WO | 2008-108965 | A1 | 9/2008 |

OTHER PUBLICATIONS

"YouTube—Broadcast Yourself (Channels, Sponsors)" archive.org., Dec. 15, 2007, URL:http://web.archive.org/web/20071215094628/http://www.youtube.com/members?s=ms&t=w&g=6 , 1 page.

Daisuke Tsuda, "YouTube [category] Search for motion picture using categories—Dekiru Net + (Dekiru Net Plus)," [online], Impress Japan, (Jul. 3, 2007), [Searched on Jan. 16, 2009], Internet<http://dekiru.impress.co.jp/contents/002/00202.htm>.

Daisuke Tsuda, "YouTube [reproduction of motion picture] Watch motion picture—Dekiru Net + (Dekiru Net Plus)," [online], Impress Japan, (Jul. 3, 2007), [Searched on Jan. 16, 2009], Internet<http://dekiru.impress.co.jp/contents/002/00201.htm>.

Non-Final United States Office Action issued for U.S. Appl. No. 12/492,683, dated Jul. 18, 2012.

Menard, Kevin, "Evaluating User Feedback Systems," A Thesis Submitted to the Faculty of the Worcester Polytechnic Institute, May 2006, 96 pages.

Office Action issued for U.S. Appl. No. 12/492,718, dated Aug. 26, 2011.

Sep. 12, 2012 European Search Report for EP 09166287.4, 6 pages.

Gen Fukatani, PHP de Ikou!, $2^{nd}$ Flight, Web Designing, Mainichi Communications, Inc., Dec. 1, 2005, vol. 5, No. 12, pp. 166-171, with a partial English translation, 11 pages.

U.S. Office Action mailed Mar. 15, 2013, in U.S. Appl. No. 12/492,693.

U.S. Office Action mailed May 31, 2013, in U.S. Appl. No. 12/492,731.

U.S. Appl. No. 12/492,683, filed Jun. 26, 2009, Storage Medium for Storing Program Capable of Ensuring That Evaluation of Content Is Made After Watching Thereof, Information Processing Device, and Information Processing System.

U.S. Appl. No. 12/492,718, filed Jun. 26, 2009, Storage Medium for Storing Program Capable of Improving Degree of Freedom and Effect of Content Provided by Sponsor and Information Processing Device.

U.S. Appl. No. 12/492,731, filed Jun. 26, 2009, Information Processing System Relating to Content Distribution, Storage Medium for Storing Program Directed Thereto, and Information Processing Device.

U.S. Appl. No. 12/492,693, filed Jun. 26, 2009, Storage Medium for Storing Program Involved With Content Distribution and Information Processing Device.

Potential of HTML Pages Taught by Ajax Contents, Ideas for "Ease of Use" Provided by CSS and JavaScript, 07 Not Allowing "Submission" Until Required Items are Entered, Web Designing,

(56) References Cited

OTHER PUBLICATIONS

Mainichi Communications, Inc., Sep. 1, 2005, vol. 5, No. 9, p. 99 (partial English translation).

Office Action in corresponding U.S. Appl. No. 12/492,683 dated Jul. 10, 2015.

Notice of Allowance in corresponding U.S. Appl. No. 12/492,731 dated Jul. 20, 2015.

* cited by examiner

SELECT CHARACTER.

DO YOU SELECT THIS CHARACTER?

NAME: KIYOSHI
SEX: MALE
BIRTHDAY: MARCH 11

YES    NO

ENTER YEAR OF BIRTH OF THIS PERSON

1980

OK

ENTER BLOOD TYPE OF THIS PERSON

| A | B |
| O | AB |
| I DON'T KNOW ||

DO YOU ACCEPT THIS PROFILE?

NAME: KIYOSHI
SEX: MALE
BIRTHDAY: MARCH 11
YEAR OF BIRTH: 1980
BLOOD TYPE: O

YES    NO

NAME: KIYOSHI
SEX: MALE
BIRTHDAY: MARCH 11
YEAR OF BIRTH: 1980
BLOOD TYPE: O

FIG.25A

| | | |
|---|---|---|
| YEAR, MONTH AND DAY OF INTEREST | | A1 |
| POSTER ID | | A2 |
| SIGNATURE COLOR | | A3 |
| INTRODUCTION CHARACTER INFORMATION | | A4 |
| 1 | ORDER OF DISPLAY | A4-1 |
| | INTRODUCTION CHARACTER ID | A4-2 |
| 2 | ORDER OF DISPLAY | A4-1 |
| | INTRODUCTION CHARACTER ID | A4-2 |
| ⌇ | | |

FIG.25B

| | | |
|---|---|---|
| INTRODUCTION CHARACTER ID | | B1 |
| APPAREL ATTRIBUTE | | B2 |
| JACKET COLOR ATTRIBUTE | | B3 |
| TROUSERS COLOR ATTRIBUTE | | B4 |
| BEHAVIOR PATTERN | | B5 |
| PROFILE | | B6 |
| LIST OF MESSAGES | | B7 |
| 1 | ORDER | B7-1 |
| | MESSAGES | B7-2 |
| | EXPRESSION | B7-3 |
| 2 | ORDER | B7-1 |
| | MESSAGES | B7-2 |
| | EXPRESSION | B7-3 |
| ⌇ | | |
| MOTION PICTURE ID | | B8 |

FIG.25C

| | |
|---|---|
| MOTION PICTURE ID | C1 |
| TITLE | C2 |
| DURATION OF MOTION PICTURE | C3 |
| TIME AND DAY OF START OF AVAILABILITY | C4 |
| TIME AND DAY OF END OF AVAILABILITY | C5 |
| SPONSOR ID | C6 |
| PORTABLE TERMINAL DISTRIBUTION FLAG | C7 |
| MOTION PICTURE ID FOR PORTABLE TERMINAL | C8 |
| STAFF LIST ID | C9 |

FIG.30A

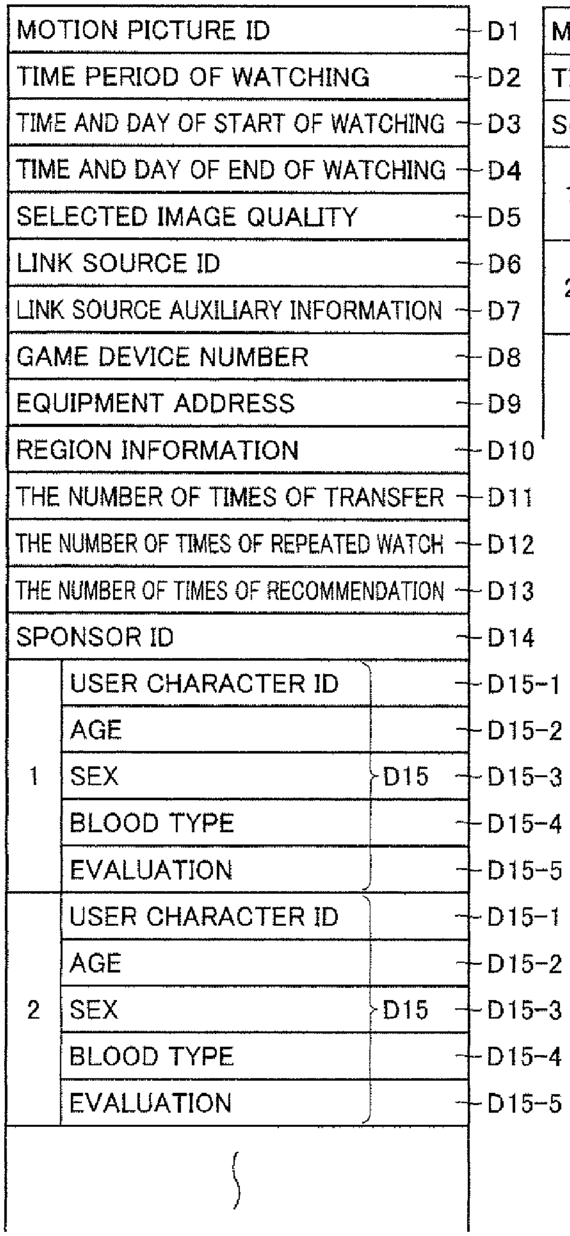

FIG.30B

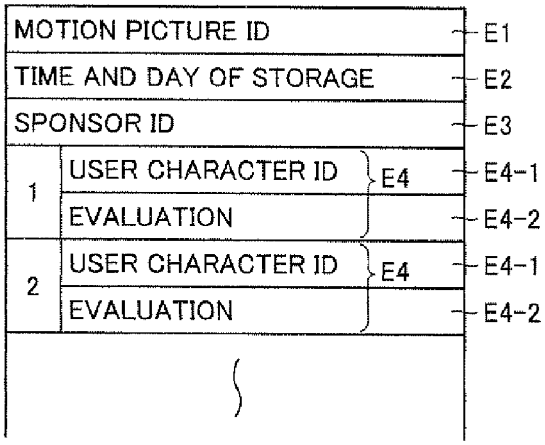

| MOTION PICTURE ID | | | — D1 |
|---|---|---|---|
| TIME PERIOD OF WATCHING | | | — D2 |
| TIME AND DAY OF START OF WATCHING | | | — D3 |
| TIME AND DAY OF END OF WATCHING | | | — D4 |
| SELECTED IMAGE QUALITY | | | — D5 |
| LINK SOURCE ID | | | — D6 |
| LINK SOURCE AUXILIARY INFORMATION | | | — D7 |
| GAME DEVICE NUMBER | | | — D8 |
| EQUIPMENT ADDRESS | | | — D9 |
| REGION INFORMATION | | | — D10 |
| THE NUMBER OF TIMES OF TRANSFER | | | — D11 |
| THE NUMBER OF TIMES OF REPEATED WATCH | | | — D12 |
| THE NUMBER OF TIMES OF RECOMMENDATION | | | — D13 |
| SPONSOR ID | | | — D14 |
| 1 | USER CHARACTER ID | D15 | — D15-1 |
| | AGE | | — D15-2 |
| | SEX | | — D15-3 |
| | BLOOD TYPE | | — D15-4 |
| | EVALUATION | | — D15-5 |
| 2 | USER CHARACTER ID | D15 | — D15-1 |
| | AGE | | — D15-2 |
| | SEX | | — D15-3 |
| | BLOOD TYPE | | — D15-4 |
| | EVALUATION | | — D15-5 |

| MOTION PICTURE ID | | | — E1 |
|---|---|---|---|
| TIME AND DAY OF STORAGE | | | — E2 |
| SPONSOR ID | | | — E3 |
| 1 | USER CHARACTER ID | E4 | — E4-1 |
| | EVALUATION | | — E4-2 |
| 2 | USER CHARACTER ID | E4 | — E4-1 |
| | EVALUATION | | — E4-2 |

FIG.47A

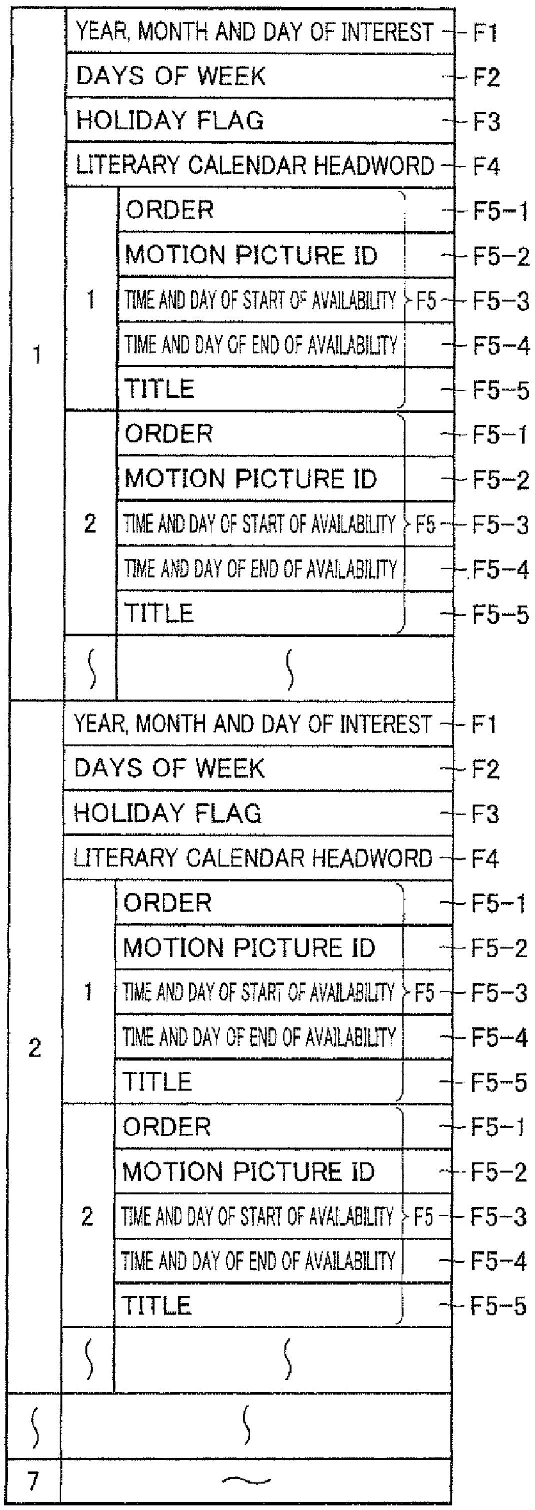

FIG.47B

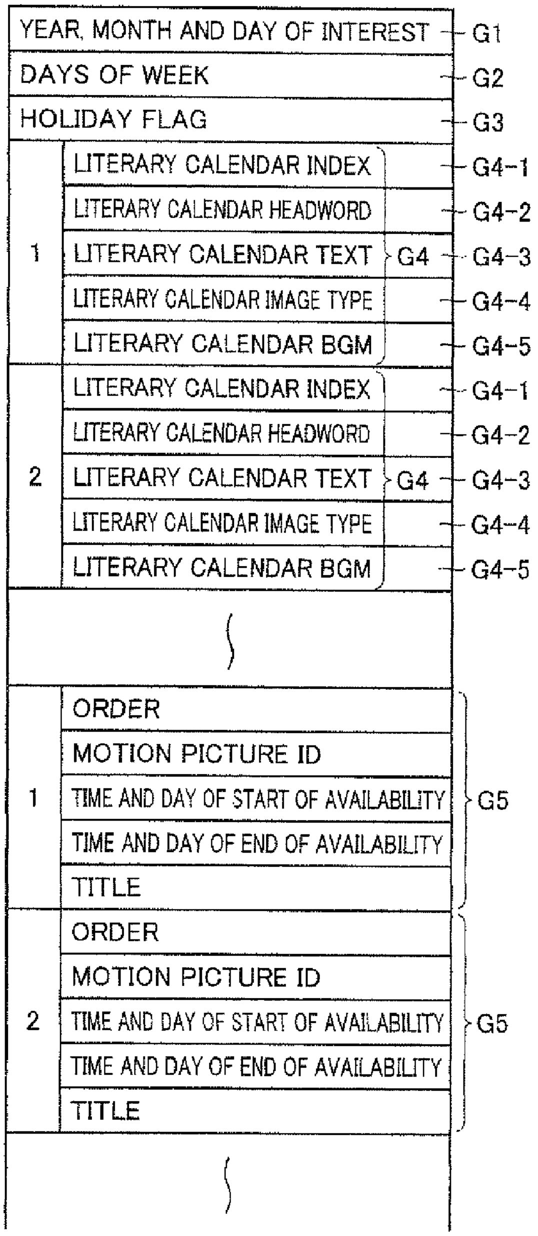

| | | | |
|---|---|---|---|---|
| 1 | YEAR, MONTH AND DAY OF INTEREST | | F1 |
| | DAYS OF WEEK | | F2 |
| | HOLIDAY FLAG | | F3 |
| | LITERARY CALENDAR HEADWORD | | F4 |
| | 1 | ORDER | F5-1 |
| | | MOTION PICTURE ID | F5-2 |
| | | TIME AND DAY OF START OF AVAILABILITY } F5 | F5-3 |
| | | TIME AND DAY OF END OF AVAILABILITY | F5-4 |
| | | TITLE | F5-5 |
| | 2 | ORDER | F5-1 |
| | | MOTION PICTURE ID | F5-2 |
| | | TIME AND DAY OF START OF AVAILABILITY } F5 | F5-3 |
| | | TIME AND DAY OF END OF AVAILABILITY | F5-4 |
| | | TITLE | F5-5 |
| 2 | YEAR, MONTH AND DAY OF INTEREST | | F1 |
| | DAYS OF WEEK | | F2 |
| | HOLIDAY FLAG | | F3 |
| | LITERARY CALENDAR HEADWORD | | F4 |
| | 1 | ORDER | F5-1 |
| | | MOTION PICTURE ID | F5-2 |
| | | TIME AND DAY OF START OF AVAILABILITY } F5 | F5-3 |
| | | TIME AND DAY OF END OF AVAILABILITY | F5-4 |
| | | TITLE | F5-5 |
| | 2 | ORDER | F5-1 |
| | | MOTION PICTURE ID | F5-2 |
| | | TIME AND DAY OF START OF AVAILABILITY } F5 | F5-3 |
| | | TIME AND DAY OF END OF AVAILABILITY | F5-4 |
| | | TITLE | F5-5 |
| 7 | | | |

| | | | |
|---|---|---|---|
| YEAR, MONTH AND DAY OF INTEREST | | | G1 |
| DAYS OF WEEK | | | G2 |
| HOLIDAY FLAG | | | G3 |
| 1 | LITERARY CALENDAR INDEX | | G4-1 |
| | LITERARY CALENDAR HEADWORD | | G4-2 |
| | LITERARY CALENDAR TEXT | } G4 | G4-3 |
| | LITERARY CALENDAR IMAGE TYPE | | G4-4 |
| | LITERARY CALENDAR BGM | | G4-5 |
| 2 | LITERARY CALENDAR INDEX | | G4-1 |
| | LITERARY CALENDAR HEADWORD | | G4-2 |
| | LITERARY CALENDAR TEXT | } G4 | G4-3 |
| | LITERARY CALENDAR IMAGE TYPE | | G4-4 |
| | LITERARY CALENDAR BGM | | G4-5 |
| 1 | ORDER | | |
| | MOTION PICTURE ID | | |
| | TIME AND DAY OF START OF AVAILABILITY | | } G5 |
| | TIME AND DAY OF END OF AVAILABILITY | | |
| | TITLE | | |
| 2 | ORDER | | |
| | MOTION PICTURE ID | | |
| | TIME AND DAY OF START OF AVAILABILITY | | } G5 |
| | TIME AND DAY OF END OF AVAILABILITY | | |
| | TITLE | | |

| | YEAR, MONTH AND DAY OF INTEREST | F1 |
|---|---|---|
| 1 | DAYS OF WEEK | F2 |
| | HOLIDAY FLAG | F3 |
| | LITERARY CALENDAR HEADWORD | F4 |
| | 1 | ORDER | F5-1 |
| | | MOTION PICTURE ID | F5-2 |
| | | SELECTION PERMISSION FLAG | F5-3' |
| | | TITLE | F5-5 |
| | 2 | ORDER | F5-1 |
| | | MOTION PICTURE ID | F5-2 |
| | | SELECTION PERMISSION FLAG | F5-3' |
| | | TITLE | F5-5 |
| | �densityfill | ⁓ | |
| ⁓ | ⁓ | |
| 7 | ~ | |

METHOD, SYSTEM, AND STORAGE MEDIUM FOR DISPLAYING DISTRIBUTED MEDIA CONTENT IN A CALENDAR SCREEN

This nonprovisional application is based on Japanese Patent Application No. 2009-017145 filed with the Japan Patent Office on Jan. 28, 2009, the entire contents of which are hereby incorporated by reference.

FIELD OF THE INVENTION

The present invention relates to a storage medium for storing a program involved with content distribution and an information processing device.

DESCRIPTION OF THE BACKGROUND ART

A configuration for allowing viewing of a motion picture or a still image in a calendar screen displayed on a computer has conventionally been disclosed. For example, according to a network content display device and a network content display program disclosed in Japanese Patent Laying-Open No. 2007-274642, metadata or a thumbnail of a content such as a video program, a still image and a motion picture is arranged on the calendar screen, and when one is selected, the corresponding content is obtained through the network and reproduced on the screen.

The device and the program disclosed in Japanese Patent Laying-Open No. 2007-274642, however, are directed to display of contents recorded in advance as intended by a user himself/herself, in correspondence with a date when the contents were obtained. Namely, the device and the program disclosed in this prior art aim to facilitate search for a content in which the user was interested in the past, and they cannot provide the user with a timely content that the user has not yet been able to know.

SUMMARY OF THE INVENTION

The present invention was made to solve the above-described problems. An object of the present invention is to provide a storage medium for storing a program capable of providing a user with a timely content at each time point and enhancing user's willingness to watch these provided contents and an information processing device.

According to a first aspect of the present invention, a storage medium for storing a program is provided. The program is executed by an information processing device (12) connected to be able to communicate with a server (104; reference numeral used in embodiments, to be understood similarly hereinafter) capable of content distribution and interacting with a display device (34), and the program causes a computer representing the information processing device to perform; an obtaining step (40; S600; S628) of obtaining calendar information including date information and content information relating to a specific content associated with the date information; a calendar output step (40; S606 to S613; S632 to S639) of outputting a calendar screen including areas divided for each date while information for introducing a content associated with a corresponding date is allocated to the areas divided for each date included in the calendar screen, based on the calendar information; and a content output step (40; S624; S656) of obtaining a content selected on the calendar screen in response to a user's operation from the server and outputting the content on the display device.

According to the first aspect, the contents that can be distributed from the server are displayed in a list in a form of a calendar. Here, information for introducing each content is output in correspondence with the area corresponding to the date information set in advance for each content. Therefore, the user who views such a calendar screen can grasp at a glance a newest content, a content associated with a certain specific day, or the like. Accordingly, from a point of view of the user, willingness to watch the content is enhanced. On the other hand, namely, from a point of view of a content distributor, a timely content or a limited-time-offer content can be appealed to the user by appropriately setting the date information of each content.

According to a preferred second aspect, the program further causes the computer to perform a first determination step (40, S622; S654) of determining whether a content can be selected or not based on the content information.

According to a yet preferred third aspect, the content information includes information indicating an accessible time period, and the computer is further configured to interact with a time counting unit (48). The first determination step includes the step of determining, based on comparison of a current time point with the accessible time period of a content of interest, whether the content of interest can be selected or not. The content output step includes the step (40; S624; S656) of outputting the content of interest only when the current time point is within the accessible time period of the content of interest (YES in S622; YES in S654).

According to the second and third aspects, the content of which distribution period is limited can be provided to the user. Thus, from a point of view of the content distributor, rarity value or a feeling of premium of the content can be increased by distributing the content only for a specific time period. Thus, user's willingness to watch the content can further be enhanced. In addition, in many cases, as the user does not know in advance when the content is distributed. Accordingly, in such a case, the user can have no choice but to check a substance of the distributed content by using the present program. Therefore, use of the present program by the user and frequency of access to the distribution server can further be increased.

According to a yet preferred fourth aspect, the information indicating the accessible time period of the content is defined based on the corresponding date information. According to a typical embodiment, a year, month and day of interest brought in correspondence with each content is set as a day of reference of the day of release, and in addition, a flag indicating whether distribution before this day of release is permitted or not is added to the calendar information.

According to a yet preferred fifth aspect, the information indicating the accessible time period of the content includes permission information indicating permission/prohibition of distribution based on the date information. The first determination step includes the step of determining whether the content of interest can be selected or not based on the accessible time period determined by the date information and the permission information.

According to the fourth and fifth aspects, as the accessible time period is set based on the date information brought in correspondence with each content. Therefore, the user can readily recognize the accessible time period of each content in association with display on the calendar screen.

According to a preferred sixth aspect, the content information is configured as information indicating the accessible time period of the content, such that definition limiting the accessible time period to a specific time period and definition not limiting the accessible time period to a specific time period can be set.

According to the sixth aspect, the content of which accessible time period is set and the content of which accessible time period is not set are displayed on the same calendar screen. From a point of view of the content distributor, rarity value or a feeling of premium of the content of which accessible time period is set can further be increased. Thus, user's willingness to watch the content can further be enhanced.

According to a preferred seventh aspect, the obtaining step further includes the step (40; S602; S630) of obtaining a thumbnail image corresponding to each piece of content information included in the calendar information. The calendar output step includes the step of outputting the obtained thumbnail image as the information for introducing the content.

According to the seventh aspect, as the thumbnail image of the content brought in correspondence with each date is displayed, the user can grasp at a glance the substance of the content being distributed. Therefore, user's hesitation to watch the content is lessened and user's willingness to watch the content can further be enhanced.

According to a preferred eighth aspect, the program further causes the computer to perform a second determination step (40; S608; S634) of determining whether a current time point is within the accessible time period or not, for each piece of content information included in the calendar information. The calendar output step includes the step (40; S610, S612; S636, S638) of changing a manner of display on screen of the information for introducing the content, between content information for which the current time point has been determined as being within the accessible time period in the second determination step and content information for which the current time point has been determined as not being within the accessible time period in the second determination step.

According to the eighth aspect, the user can grasp at a glance on the calendar screen which content can be watched among the distributed contents. Therefore, user's hesitation to watch the content is lessened and user's willingness to watch the content can further be enhanced.

According to a preferred ninth aspect, the calendar output step further includes the step of displaying an image for accepting a message creation instruction in correspondence with a date displayed on the calendar screen. The program further causes the computer to perform a generation step (40; S644) of generating a message in response to selection of the image for accepting the message creation instruction from a user, and a transmission step (40; S448, S450) of transmitting the generated message to another information processing device. The generation step includes the step of adding the dare brought in correspondence, as a designated day of opening the message.

According to the ninth aspect, as the user can create a message in the calendar screen, information on a content or the like, of which accessible time period is limited, can easily be exchanged with a family member or a friend. In addition, as the designated day of opening the message can be attached to a message to be transmitted, by having the message read on a specific day such as a birthday or some anniversary, message exchange can be valuable.

According to a yet preferred tenth aspect, the program further causes the computer to perform a reception step (40; S604) of receiving the message from another information processing device, a message output step (40; S618) of outputting the received message, and a third determination step (40; S617) of determining, with regard to the received message, whether or not a current time point coincides with or has passed the designated day of opening the message added to that message. The message output step includes the step of outputting that message only when it is determined in the third determination step that the current time point coincides with or has passed the designated day of opening the message.

According to the tenth aspect, a message is not output until the designated day of opening the message set by a message sender user comes. Therefore, as the user who received the message cannot read the message until a specific day such as a birthday or some anniversary comes, a timely message can be sent to a family member or a friend by appropriately setting the designated day of opening the message. In addition, as the message cannot be read until the designated day of opening the message comes, user's expectation can be increased.

According to a preferred eleventh aspect, the content includes at least one of a motion picture and a still image. The content output step includes the steps of reproducing the motion picture when the content of interest is the motion picture and displaying the still image when the content of interest is the still image.

According to the eleventh aspect, a wide variety of matters can be distributed, depending on the substance of the contents. Therefore, as the user can expect distribution of not only the motion picture but also a content such as a still image, user's willingness to watch the content can further be enhanced.

According to a twelfth aspect of the present invention, a storage medium for storing a program is provided. The program is executed by an information processing device (12) connected to be able to communicate with a server (104) capable of content distribution and interacting with a display device (34). The program causes a computer representing the information processing device to perform a first obtaining step (40; S600) of obtaining calendar information including a date of interest and content information relating to a specific content associated with the date of interest. The content information includes access permission information indicating whether access to the content is permitted or not before the date of interest comes. The present program further causes the computer to perform: a second obtaining step (40; S602) of obtaining a thumbnail image corresponding to each piece of content information included in the calendar information; a calendar output step (40; S606) of outputting a calendar screen including areas divided for each date while the thumbnail image of a content associated with a corresponding date is allocated to the areas divided for each date included in the calendar screen, based on the calendar information; a determination step (40; S622) of determining, when any thumbnail image allocated in the calendar screen is selected, with regard to the content corresponding to the selected thumbnail image, whether access to that content is permitted or not, based on whether access permission information indicating that access before the corresponding date of interest is permitted is defined or not and whether a current time point coincides with or has passed the corresponding date of interest or not; and a content output step (40; S624) of obtaining the content of interest from the server and outputting the content on the display device when it is determined in the determination step that access to the content of interest is permitted.

According to the twelfth aspect, the content of which distribution period is limited can be provided to the user.

Thus, from a point of view of the content distributor, rarity value or a feeling of premium of the content can be increased by distributing the content only for a specific time period. Thus, user's willingness to watch the content can further be enhanced. In addition, in many cases, the user does not know in advance when the content is distributed. Accordingly, in such a case, the user can have no choice but to check the substance of the distributed content by using the present program. Therefore, use of the present program by the user and frequency of access to the distribution server can further be increased.

According to a thirteenth aspect of the present invention, an information processing device (12) connected to be able to communicate with a server (104) capable of content distribution and interacting with a display portion (34) is provided. The present information processing device includes: an obtaining unit (40; S600; S628) for obtaining calendar information including date information and content information relating to a specific content associated with the date information; a calendar output unit (40; S606 to S613; S632 to S639) for outputting a calendar screen including areas divided for each date while information for introducing a content based on the content information of the content associated with a corresponding date is allocated to the areas divided for each date included in the calendar screen, based on the calendar information; and a content output unit (40; S624; S656) for obtaining a content selected on the calendar screen in response to a user's operation from the server and outputting the content on the display portion.

According to the thirteenth aspect, the contents that can be distributed from the server are displayed in a list in a form of a calendar. Here, information for introducing each content is output in correspondence with the area corresponding to the date information set in advance for each content. Therefore, the user who views such a calendar screen can grasp at a glance a newest content, a content associated with a certain specific day, or the like. Accordingly, from a point of view of the user, willingness to watch the content is enhanced. On the other hand, namely, from a point of view of a content distributor) a timely content or a limited-time-offer content can be appealed to the user by appropriately setting the date information of each content.

In the description above for better understanding of the present invention, reference numerals, supplemental explanation and the like for showing correspondence with embodiments which will be described below are provided, however, they are not intended to limit the present invention in any manner.

According to the present invention, the user can be provided with a timely content at each time point and user's willingness to watch these provided contents can be enhanced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a diagram showing an example (No. 2) of a main screen of the content distribution application according to the embodiment of the present invention.

FIGS. 25A to 25C are diagrams showing an exemplary structure of data exchanged in the sequence diagram shown in FIG. 24.

FIGS. 30A and 30B are diagrams showing an exemplary structure of data exchanged in the flowchart shown in FIG. 29.

FIGS. 47A and 47B are diagrams showing an exemplary data structure of calendar data exchanged in the sequence diagram shown in FIG. 46.

DESCRIPTION OF THE PREFERRED EMBODIMENTS

Figure 1:
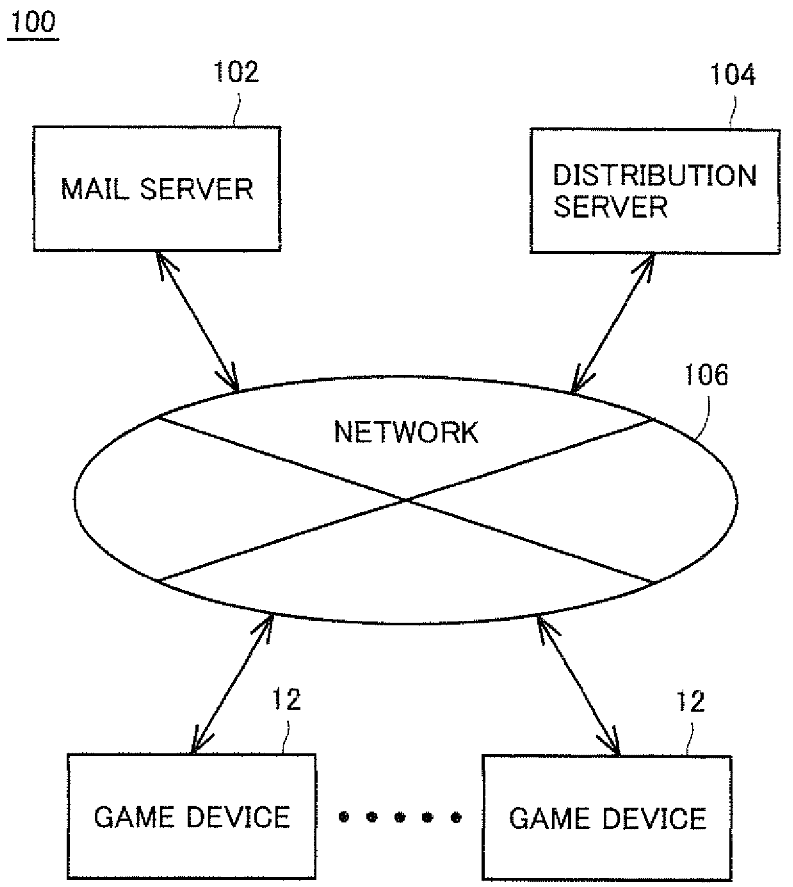
FIG. 1 is a schematic configuration diagram of a distribution system according to an embodiment of the present invention.

An embodiment of the present invention will be described in detail with reference to the drawings. The same or corresponding elements in the drawings have the same reference characters allotted, and description thereof will not be repeated.

DEFINITION

The phrase "can interact" herein means that a device such as an input portion, a display portion, a storage portion, and an audio output portion is connected to a computer representing an information processing device (typically, a game device) via wire or wireless communication and that data can be communicated. Here, a device such as an input portion, a display portion, a storage portion, and an audio output portion may integrally be formed with the computer or separately be provided.

<Overall Configuration>

Initially, a distribution system 100 will be described as a typical example of an information processing system according to the present invention. Referring to FIG. 1, distribution system 100 according to an embodiment of the present invention includes a distribution server 104 distributing a content such as a motion picture which will be described later and a mail server 102 for exchanging a message between users or players (hereinafter, also simply collectively referred to as "user"). These servers 102 and 104 are connected to one video game device or a plurality of video game devices (hereinafter, also simply referred to as "game device") through a network 106 including the Internet or LAN so that data can be communicated. As distribution of contents such as motion pictures requires a relatively wide network band, a distributed system may be adopted. The distributed system is provided by including at least one main server and at least one cache server for distributing the same data or content substantially in synchronization with this main server. Typically, by providing one main server and a plurality of cache servers on network 106 and configuring the plurality of cache servers so as to reflect data update in the main server, a cache server closest to a game device 12 that accesses from various locations on network 106 can distribute thereto contents or various types of data. Thus, response to game device 12 can be improved.

Though details of game device 12 will be described later, the user operates game device 12 to request distribution server 104 for downloading of a content that he/she found interesting or to inform a family member, a friend or the like of a content that he/she found interesting among the watched distribution contents via an e-mail.

Though FIG. 1 illustrates a configuration where a plurality of game devices 12 are connected to network 106, a single game device 12 may be provided. In addition, a plurality of distribution servers 104 may be provided, depending on a type, load, or the like of downloaded data (content). In addition, a personal computer (PC), a portable telephone or the like may be connected to network 106. In addition, various electronic devices may be connected to network 106 so that a message can be exchanged with game device 12 via mail server 102.

Alternatively, instead of what is called a server-client configuration shown in FIG. 1, a P2P (Peer to Peer) configuration in which data is directly exchanged between game devices 12 without using distribution server 104 may be adopted. Further alternatively, instead of a method using the network, a content, introduction character information, motion picture information, or the like may be obtained through a storage medium such as a portable semiconductor memory and an optical disc.

Game devices 12 can also communicate with each other through network 106. A message input by the user or a message generated by game device 12 is converted to an e-mail format and transmitted/received (exchanged) between game devices 12 through network 106 and mail server 102. Therefore, a common mail server may be used as mail server 102. Thus, game device 12 can also exchange a message, that is, an e-mail, with a portable terminal (a terminal other than another game device 12) such as a PC or a portable telephone. As such message exchange processing in game device 12 is automatically performed in accordance with prescribed schedule without a user's instruction for exchange, the user can receive a message while playing a game or executing another application, without his/her own periodic checking operation. In addition, game device 12 may also exchange a message only with game device 12 or a terminal other than game device 12 (hereinafter may simply also be referred to as "another terminal"), of which address has been registered in an address book (a friend list **44*d*** which will be described later). In such a case, reception of an undesired message such as a spam mail by the user can be avoided, even though a common mail system is used.

In addition, game device 12 can provide a message board function which is an application for displaying a received message on a monitor 34. Preferably, however, a specific message dependent on other applications (games and the like), that is, data used only by such applications can be read only by means of such applications. Therefore, if a user would like to send a message only to a specific user, by transmitting that message together with data dependent on an individual application, the message can be in such a format that cannot be read with the message board function. It is noted that a message that can be referred to regardless of a type of an application can be referred to (read) by anybody based on the message board function, when it is displayed on monitor 34.

The message board function is provided by an application having a function to display a received message on monitor 34, and it achieves display of the message obtained from network 106. Not only a message received from other game devices 12 or other terminals but also a message created for the game device itself can also similarly be displayed. Therefore, even when game device 12 is not connected to network 106, this message board function can be utilized as a message board at home and/or as a personal memo pad. In addition, a record generated by an application such as a game may also subsequently be viewed by using the message board function. Here, by storing in the same area a message generated in game device 12 in a format the same as that for the message obtained through network 106 (in the present embodiment, an e-mail format), it is not necessary to prepare individual display processing. For example, data should only be converted to an e-mail format in generating a memo or a message, or data in an e-mail format should only be generated in game program processing.

<Configuration of Game Device>

Figure 2:
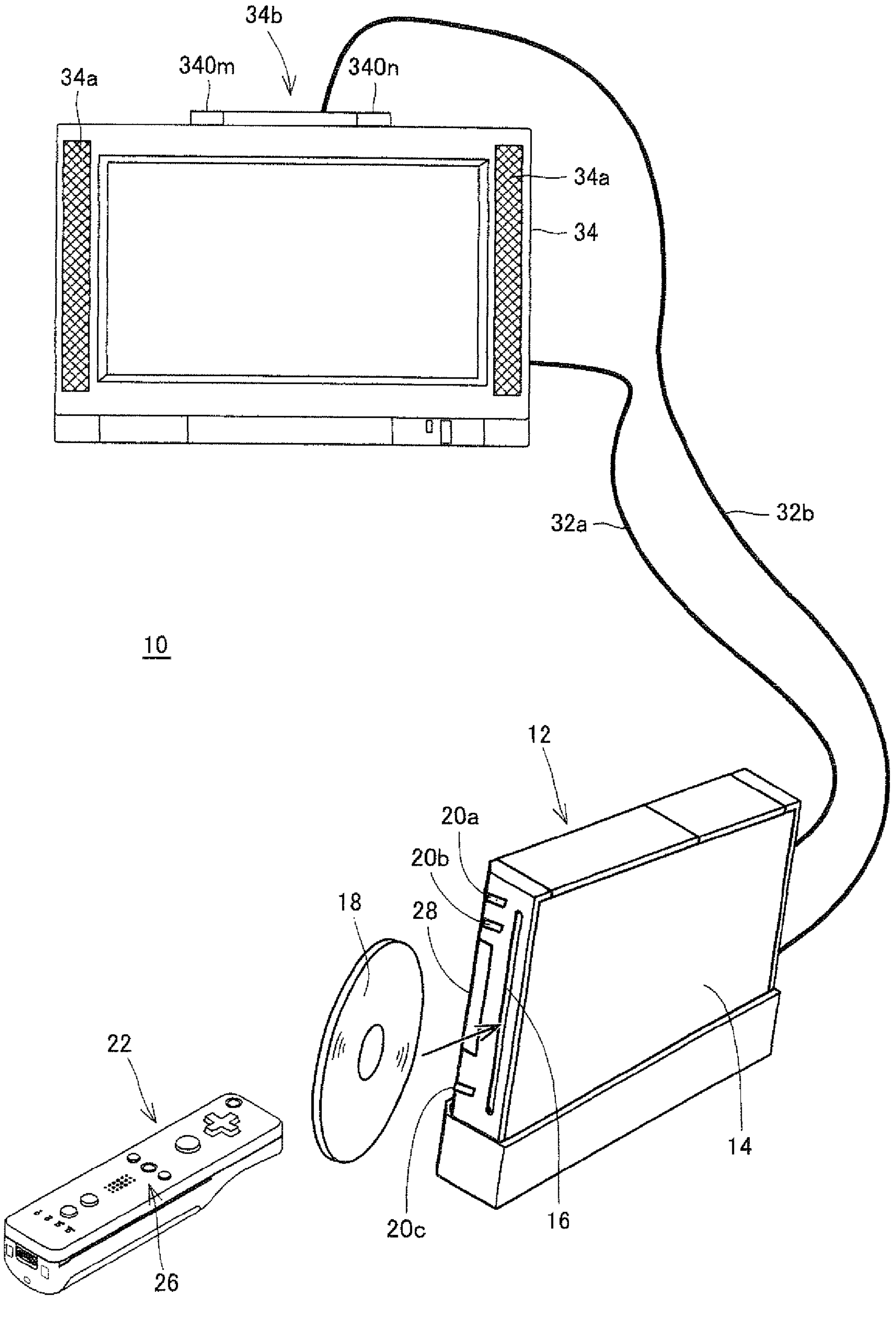
FIG. 2 is a schematic configuration diagram of a video game system according to the embodiment of the present invention.

Referring to FIG. 2, a video game system 10 according to the embodiment of the present invention includes game device 12 and a controller 22. A content distribution application is incorporated in game device 12 and video game system 10 functions as a content distribution terminal.

Game device 12 according to the present embodiment is designed to be able to communicate with four controllers 22 at the maximum. In addition, game device 12 and each controller 22 are connected to each other through wireless communication. For example, wireless communication is implemented under Bluetooth® specifications, however, it may be implemented under other specifications such as infrared or wireless LAN. Alternatively, wire connection may be adopted.

Game device 12 includes a housing 14 in a substantially parallelepiped shape, and a disc slot 16 is provided in a front surface of housing 14. An optical disc 18 typically representative of a storage medium for storing a game program or the like is inserted in disc slot 16 and attached to a disc drive 54 (see FIG. 3) within housing 14. An LED and a light guide plate are arranged around disc slot 16, and the LED can illuminate in response to various processes.

In addition, in the front surface of housing 14 of game device 12, a power button **20*a* and a reset button 20*b* are provided in an upper portion thereof and an eject button 20*c* is provided in a lower portion thereof. Moreover, a connector cover 28 for an external memory card is provided between reset button 20*b* and eject button 20*c*, in the vicinity of disc slot 16. An external memory card connector 62 (see FIG. 3) is provided inside connector cover 28 for external memory card, in which a not-shown external memory card (hereinafter simply also referred to as a "memory card") is inserted. The memory card is used for temporarily storing a game program or the like that is read from optical disc 18 and loaded, or it is used for storing (saving) game data of the game played with this video game system 10 (data of a game result or data while playing the game). The game data above, however, may be stored in an internal memory such as a flash memory 44 (see FIG. 3) provided inside game device 12, instead of the memory card. In addition, the memory card may be used as a back-up memory for the internal memory. Further, the game program or the like may be supplied (downloaded) to game device 12 from a server or the like connected to the network through a wire or wireless communication line. The game program or the like thus downloaded is stored in flash memory 44 (see FIG. 3) or a memory card provided in game device 12**.

A general-purpose SD (Secured Digital) card may be employed as the memory card, however other general-purpose memory cards such as a memory stick or a multimedia card (trademark) may also be employed.

An AV cable connector 58 (see FIG. 3) is provided on a rear surface of housing 14 of name device 12. An AV cable 32*a* is connected to AV connector 58, and game device 12, monitor 34 (display portion) and a speaker 34*a* (an audio output portion) are connected to one another through this AV cable 32*a*. Monitor 34 and speaker 34*a* are typically implemented by a color television, AV cable 32*a* inputs a video signal from game device 12 to a video input terminal of the color television and inputs an audio signal to an audio input terminal. Therefore, for example, a game image of a three-dimensional (3D) video game is displayed on a screen of color television (monitor) 34 and stereophonic game sound such as game music or sound effect is output from left and right speakers 34*a*. In addition, a marker portion 34*b* having two infrared LEDs (markers) 340*m* and 340*n* is provided around monitor 34 (in the example shown in FIG. 2, on the top of monitor 34). Marker portion 34*b* is connected to game device 12 through a power cable 32*b*. Therefore, marker portion 34*b* is supplied with power from game device 12. Thus, markers 340*m* and 340*n* emit light and output infrared rays from the front of monitor 34.

Game device 12 is supplied with power by a general AC adapter (not shown). The AC adapter is inserted in an ordinary wall outlet at home and power supply for home (commercial power supply) is converted to a low DC voltage signal suitable for driving game device 12. In other implementations, a battery may be employed as the power supply.

When the user plays some kind of a video game (or another application, without limited to the video game) with this video game system 10, the user initially turns on power of game device 12, selects appropriate optical disc 18 recording a program of a video game (or another application the user desires to play), and loads optical disc 18 to disc drive 54 of game device 12. Then, game device 12 starts execution of the video game or another application based on the program recorded on that optical disc 18. Alternatively, game device 12 may start execution of the video game or another application based on a program downloaded in advance from the server and stored in flash memory 44 (see FIG. 3) or the like.

The user operates controller 22 to provide an input to game device 12. For example, by operating any button in an input portion 26, the user starts the video game or another application. Further, by moving controller 22 itself other than operating input portion 26, the user can move a motion picture object (a user object) in a different direction or change a point of view of the user (a camera position) in a 3D game world.

Figure 3:
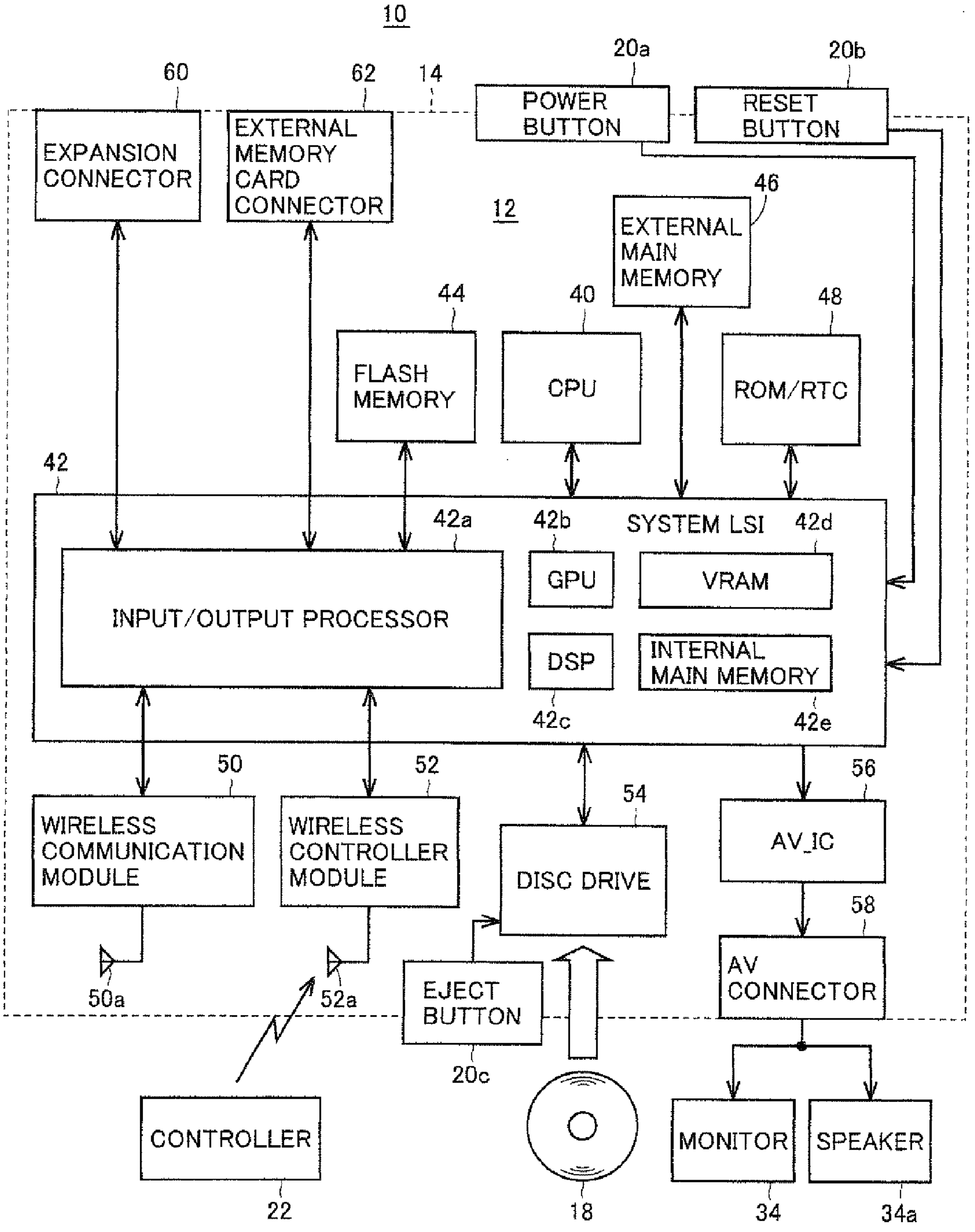
FIG. 3 is a block diagram showing an electric configuration of the video game system shown in FIG. 2.

FIG. 3 is a block diagram showing an electric configuration of video game system 10 shown in FIG. 2. Each component within housing 14 is mounted on a printed circuit board. As shown in FIG. 3, game device 12 is provided with a CPU 40. CPU 40 functions as a game processor. A system LSI 42 is connected to CPU 40. An external main memory 46, a ROM/RTC 48, disc drive 54, and an AV_IC 56 are connected to this system LSI 42.

External main memory 46 stores a program of various applications or various types of data, and it is used as a work area or a buffer area of CPU 40. ROM/RTC 48 is what is called a boot ROM, and a program for starting up game device 12 is incorporated therein and provided with a time counting circuit for counting time. Namely, CPU 40 obtains current time and day (year, month, day, and time) by referring to ROM/RTC 48. Disc drive 54 reads program data, texture data or the like from optical disc 18, and writes such data in an internal main memory 42*e* or external main memory 46 which will be described later under the control of CPU 40.

System LSI 42 includes an input/output processor 42*a*, a GPU (Graphics Processor Unit) 42*b*, a DSP (Digital Signal Processor) 42*c*, a VRAM 42*d*, and internal main memory 42*e*, and these components are connected to one another through an internal bus.

Input/output processor (I/O processor) 42*a* transmits and receives data or downloads data. Transmission and reception and downloading of data will be described later in detail.

GPU 42*b* forms a part of rendering means. Receiving a graphics command (an image creation command) from CPU 40, GPU 42*b* generates game image data in accordance with the command. It is noted that CPU 40 provides an image generation program necessary for generating game image data to GPU 42*b*, in addition to the graphics command.

As described above, VRAM 42*d* is connected to GPU 42*b*. GPU 42*b* obtains data necessary for GPU 42*b* to execute the image creation command (image data: data such as polygon data or texture data) by accessing VRAM 42*d*. It is noted that CPU 40 writes image data necessary for rendering in VRAM 42*d*, by utilizing GPU 42*b*. GPU 42*b* accesses VRAM 42*d* and creates the game image data for rendering.

In the present embodiment, an example where CPU 42*b* generates game image data is described. On the other hand, when some kind of application other than the game application is executed, GPU 42*b* generates image data for that application.

In addition, DSP 42*c* functions as an audio processor and generates audio data corresponding to sound, voice or music to be output from speaker 34*a*, by using sound data or a sound waveform (tone) data stored in internal main memory 42*e* or external main memory 46

The game image data and the audio data generated as described above are read by AV_IC 56 and output to monitor 34 and speaker 34*a* through AV connector 58. Therefore, a game picture is displayed on monitor 34 and sound (music) necessary for the game is output from speaker 34*a*.

In addition, flash memory 44, a wireless communication module 50 and a wireless controller module 52 are connected to input/output processor 42*a*. Moreover, an antenna 50*a* is connected to wireless communication module 50 and an antenna 52*a* is connected to wireless controller module 52.

Input/output processor 42*a* can communicate with another game device or various servers connected to the network through wireless communication module 50. Input/output processor 42*a*, however, can also communicate directly with another game device without communicating via the network. Input/output processor 42*a* periodically accesses flash memory 44 and detects whether data that should be transmitted to the network (referred to as transmission data) is present or not. If such transmission data is present, input/output processor 42*a* transmits the data to the network through wireless communication module 50 and antenna 50*a*. In addition, input/output processor 42*a* receives data transmitted from another game device (also referred to as reception data) through the network, antenna 50*a* and wireless communication module 50 and causes flash memory 44 to store the reception data. Under a prescribed condition, however, input/output processor 42*a* discards the reception data. In addition, input/output processor 42*a* receives data downloaded from a download server (referred to as the downloaded data) through the network, antenna 50*a* and wireless communication module 50 and causes flash memory 44 to store the downloaded data.

In addition, input/output processor 42*a* receives input data transmitted from controller 22 through antenna 52*a* and wireless controller module 52, and causes internal main memory 42*e* or external main memory 46 to store (temporarily store) the input data in a buffer area thereof. After the input data is used in game processing by CPU 40, it is erased from the buffer area.

In the present embodiment, as described above, wireless controller module 52 communicates with controller 22 under Bluetooth® specifications.

In addition, an expansion connector 60 and external memory card connector 62 are connected to input/output processor 42*a*. Expansion connector 60 is a connector for an interface such as a USB or an SCSI, and a medium such as an external storage medium or a peripheral device such as another controller can be connected. In addition a wired LAN adapter may be connected to expansion connector 60 and wired LAN can be utilized instead of wireless communication module 50. An external storage medium such as a memory card can be connected to external memory card connector 62. Therefore, for example, input/output processor 42*a* can access the external storage medium to store data therein or to read data therefrom, through expansion connector 60 or external memory card connector 62.

As shown also in FIG. 2, game device 12 (housing 14) is provided with power button 20*a*, reset button 20*b* and eject button 20*c*. Power button 20*a* is connected to system LSI 42. When power button 20*a* is turned on, system LSI 42 supplies power to each component in game device 12 through a not-shown AC adapter and sets a mode in a normally powered state (referred to as a normal mode). On the other hand, when power button 20*a* is turned off, system LSI 42 supplies power only to some components in game device 12 and sets a mode in which power consumption is minimized (hereinafter also referred to as a "stand-by mode"). In the present embodiment, when the stand-by mode is set, system LSI 42 indicates stop of power supply to components other than input/output processor 42*a*, flash memory 44, external main memory 46, ROM/RTC 48, wireless communication module 50, and wireless controller module 52. Therefore, the stand-by mode refers to a mode in which CPU 40 does not execute an application.

Though power is supplied to system LSI 42 even in the stand-by mode, power consumption is lowered by avoiding drive of GPU 42*b*, DSP 42*c* and VRAM 42*d* as a result of stop of supply of a clock thereto.

In addition, a fan for expelling heat of an IC such as CPU 40 or system LSI 42 is provided in housing 14 of game device 12. In the stand-by mode, this fan is also stopped. If the user does not wish to use the stand-by mode, setting for not using the stand-by mode may be made so that power supply to all circuit components is completely stopped as power button 20*a* is turned off.

In addition, switching between the normal mode and the stand-by mode may also be made remotely by switching on and off a power switch 26*h* (see FIG. 4) of controller 22. When such a remote operation is not performed, such setting that power is not supplied to wireless controller module 52 in the stand-by mode may be made.

Reset button 20*b* is also connected to system LSI 42. When reset button 20*b* is pressed, system LSI 42 re-starts a start-up program of game device 12. Eject button 20*c* is connected to disc drive 54. When eject button 20*c* is pressed, optical disc 18 is ejected from disc drive 54.

<Configuration of Controller>

Figure 4A:
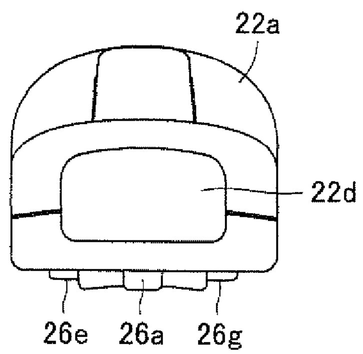
FIGS. 4A to 4E show appearance of a controller shown in FIG. 2.
Figure 4E:
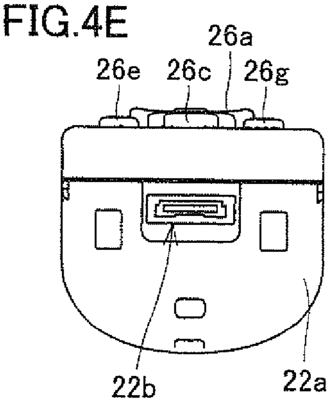
Figure 4B:
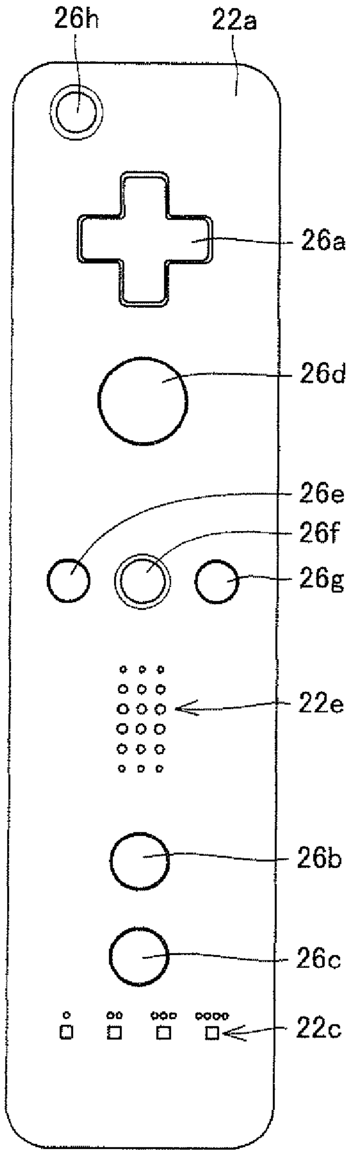
Figure 4C:
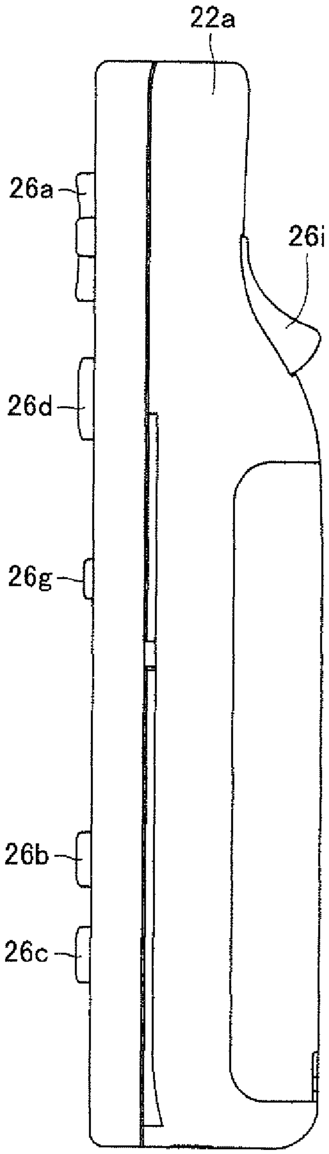
Figure 4D:
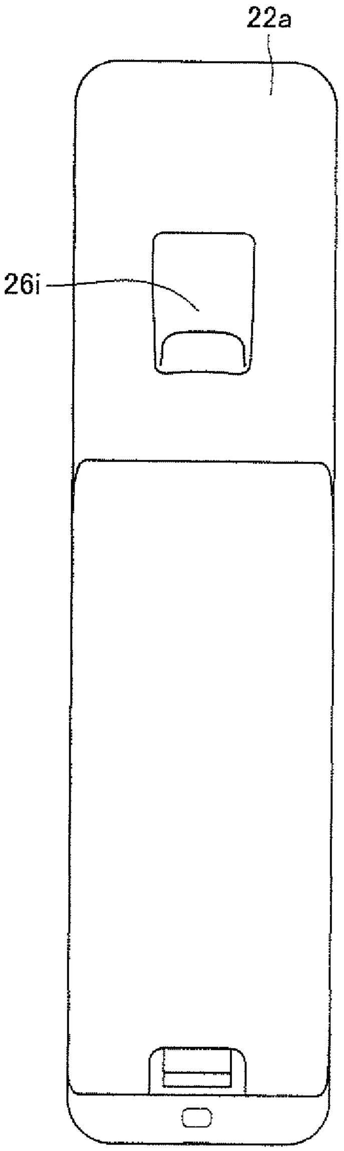

FIGS. 4A to 4E show exemplary appearance of controller 22. FIG. 4A shows a tip end surface of controller 22, FIG. 4B shows an upper surface of controller 22, FIG. 4C shows a right side surface of controller 22, FIG. 4D shows a lower surface of controller 22, and FIG. 4 shows a rear end surface of controller 22.

Referring to FIGS. 4A to 4E, controller 22 has a housing 22*a* formed, for example, by plastic molding. Housing 22*a* is in a substantially parallelepiped shape and has such a size as being held by the user with one hand. Housing 22*a* (controller 22) is provided with input means (a plurality of buttons and/or switches) 26. Specifically, as shown in FIG. 4B, a cross key 26*a*, a 1 button 26*b*, a 2 button 26*c*, an A button 26*d*, a − button 26*e*, a HOME button 26*f*, a + button 26*g*, and power switch 26*h* are provided on the upper surface of housing 22*a*. In addition, as shown in FIGS. 4C and 4D, an inclined surface is formed in the lower surface of housing 22*a*, where a B trigger switch 26*i* is provided.

Cross key 26*a* is a four-directional push switch, and includes operation portions pointing to four directions shown with arrows, that is, front (or up), rear (or down), right, and left. As the user operates any one of these operation portions, a direction of movement of a character or an object (a user character or a user object) operable by the user can be indicated or a direction of movement of a cursor can be indicated.

Each of 1 button 26*b* and 2 button 26*c* is a push-button switch. For example, these buttons are used for a game operation such as adjustment of a position of a viewpoint or a direction of viewpoint, that is, a position or a field angle of a virtual camera, for example, in displaying a three-dimensional game image. Alternatively, 1 button 26*b* and 2 button 26*c* may be used for an operation the same as that with A button 26*d* and B trigger switch 26*i*, respectively, or for an auxiliary operation.

A button 26*d* is a push-button switch, and it is used for causing the user character or the user object to perform an operation other than indication of a direction, that is, any action including hitting (punching), throwing, catching (grasping), riding, jumping, or the like. For example, in an action game, jumping, punching, actuating a weapon, or the like can be indicated. Alternatively, in a role-playing game (RPG) or simulation RPG, acquiring of an item, selection and determination of a weapon or a command, or the like can be indicated.

Each of − button 26*e*, HOME button 26*f*, + button 26*g*, and power switch 26*h* is also a push-button switch. − button 26*e* is used for selecting a game mode. HOME button 26*f* is used for displaying a game menu (a menu screen). + button 26*g* is used for starting (resuming) a game or causing the game to pause. Power switch 26*h* is used for turning on/off power of game device 12 by remote operation.

In the present embodiment, a power switch for turning on/off controller 22 itself is not provided, and controller 22 is configured such that it is turned on by operating any input portion 26 of controller 22 and it is automatically turned off in the absence of an operation for a prescribed period (for example, 30 seconds) or longer.

B trigger switch 26*i* is also a push-button switch, and it is mainly used for providing an input simulating a trigger such as shooting a gun or for designating a position selected by controller 22. In addition, by keep pressing B trigger switch 26*i*, an operation of the user object or a parameter can also be maintained in a prescribed state. In addition, in a prescribed case, B trigger switch 26*i* functions similarly to a normal B button, and it is used for canceling an action selected by using A button 26*d*.

In addition, as shown in FIG. 4E, an external expansion connector 22*b* is provided in the rear end surface of housing 22*a*, and as shown in FIG. 4B, an indicator 22*c* is provided on the upper surface of housing 22*a*, toward the side of the rear end surface. External expansion connector 22*b* is used, for example, for connection to a not-shown another expansion controller. Indicator 22*c* is constituted, for example, of four LEDs. Illumination of any one of these four LEDs can indicate identification information (a controller number) of controller 22 corresponding to the illuminating LED or indicate a state of charge of controller 22 based on the number of illuminating LEDs.

Moreover, controller 22 has an image pick-up information operating unit 80 (see FIG. 5), and a light incident port 22*d* of image pick-up information operating unit 80 is provided at the tip end surface of housing 22*a* as shown in FIG. 4A. Further, controller 22 has a speaker 86 (see FIG. 5). As shown in FIG. 4B, speaker 86 is provided inside housing 22*a*, in correspondence with a sound emission hole 22*e* provided in the upper surface of housing 22*a*, between 1 button 26*b* and HOME button 26*f*.

The shape of controller 22 and the shape, the number, the position, and the like of input portions 26 shown in FIGS. 4A to 4E are merely by way of example, and even variation as appropriate thereof is encompassed in the essence of the present invention.

Figure 5:
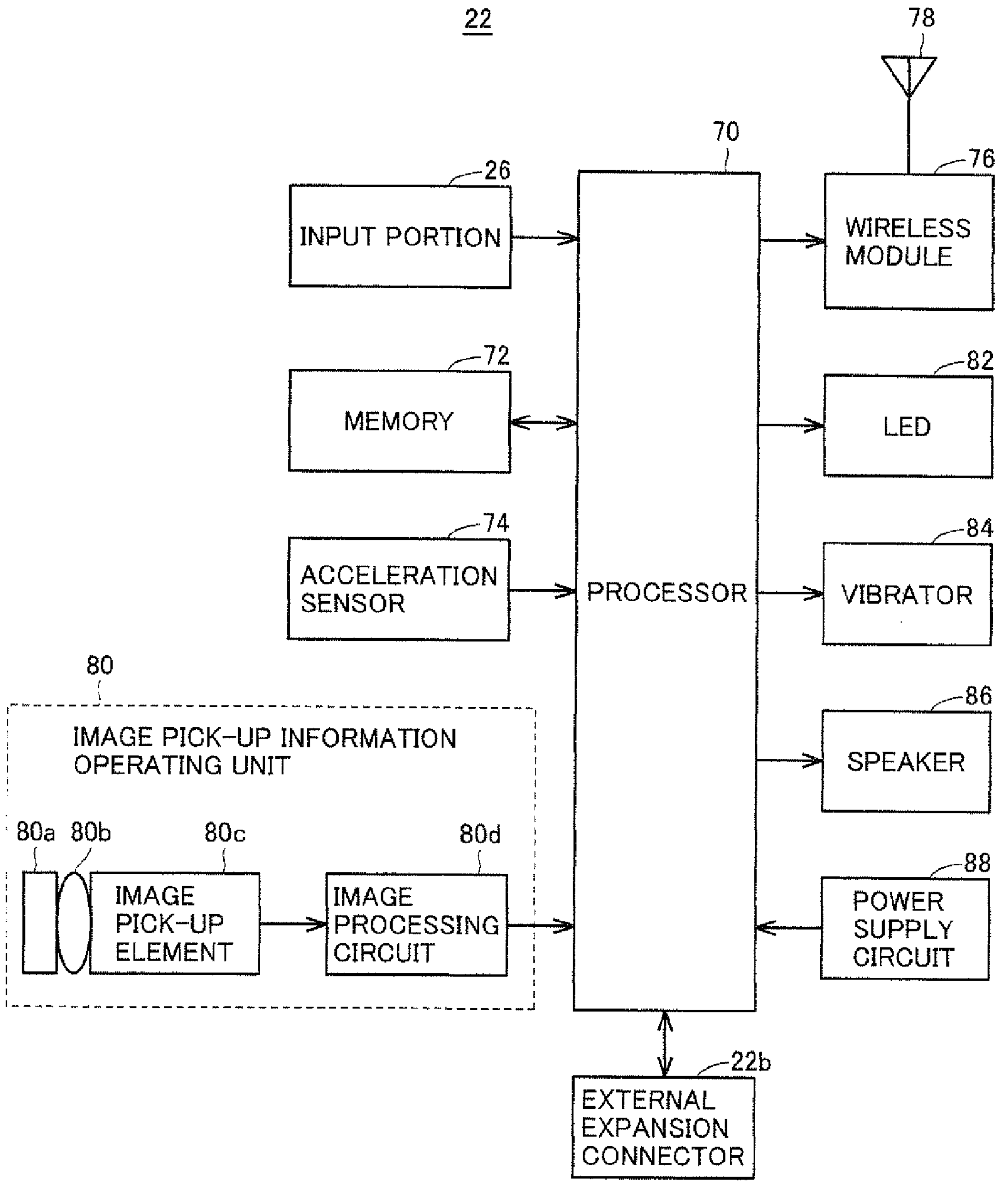
FIG. 5 is a block diagram showing an electric configuration of the controller shown in FIG. 2.

FIG. 5 is a block diagram showing an electric configuration of controller 22. Referring to FIG. 5, controller 22 includes a processor 70, to which external expansion connector 22*b*, input portion 26, a memory 72, an acceleration sensor 74, a wireless module 76, image pick-up information operating unit 80, an LED 82 (indicator 22*c*), a vibrator 84, speaker 86, and a power supply circuit 88 are connected through an internal bus (not shown). In addition, an antenna 78 is connected to wireless module 76.

Processor 70 is responsible for overall control of controller 22, and it transmits (inputs) as input data, information input from input portion 26, acceleration sensor 74 and image pick-up information operating unit 80 (input information) to game device 12 through wireless module 76 and antenna 78. Here, processor 70 uses memory 72 as a work area or a buffer area.

An operation signal (operation data) from input portion 26 (26*a* to 26*i*) described above is input to processor 70, which once causes memory 72 to store the operation data.

In addition, acceleration sensor 74 detects each acceleration in three axes of a vertical direction (direction of y-axis), a horizontal direction (direction of x-axis) and a front-rear direction (direction of z-axis) of controller 22. Acceleration sensor 74 is typically a capacitance-type acceleration sensor, however, a sensor of another type may be employed.

For example, acceleration sensor 74 detects acceleration for each of the x-axis, the y-axis and the z-axis (ax, ay, az) every first prescribed time, and inputs the detected acceleration data (acceleration data) to processor 70. For example, acceleration sensor 74 detects acceleration in the direction of each axis in a range from −2.0 G to 2.0 G (G represents acceleration of gravity; to be understood similarly hereinafter). Processor 70 detects acceleration data provided from acceleration sensor 74 every second prescribed time, and causes memory 72 to once store the acceleration data. Processor 70 creates input data including at least one of operation data, acceleration data and marker coordinate data which will be described later, and transmits the created input data to game device 12 every third prescribed time (for example, 5 msec.).

Though not shown in FIGS. 4A to 4E, in the present embodiment, acceleration sensor 74 is provided on a substrate inside housing 22*a*, around a position where cross key 26*a* is arranged.

Here, a person skilled in the art could readily understand from the description in the present specification that further information on controller 22 can be estimated and/or calculated (determined) as a result of processing by the processor of game device 12 (such as CPU 40), the processor of controller 22 (such as processor 70) or the like, based on the acceleration data output from acceleration sensor 74.

For example, in an example where the processor performs processing on the premise that the controller including a one-axis acceleration sensor is in a static state, that is, where it is assumed that acceleration detected by the acceleration sensor consists of only acceleration of gravity, if controller 22 is actually in a static state, whether an attitude of controller 22 is inclined with respect to the direction of gravity or how it is inclined can be determined based on the detected acceleration data. Specifically, if a state that an axis detected by the acceleration sensor is in the vertically downward direction is defined as the reference, inclination can be determined only based on whether 1 G (acceleration of gravity) is applied or not, and magnitude of inclination can be determined based on magnitude of acceleration of gravity.

Alternatively, in a case of a multi-axis acceleration sensor, acceleration data in each axis is further processed so that a degree of inclination with respect to the direction of gravity can be known in further detail. In such a case, processor 70 may perform processing for calculating data of an angle of inclination of controller 22 based on outputs from the acceleration sensors, however) processing may be such that approximate inclination can be estimated based on outputs from the acceleration sensors without processing for calculating inclination angle data. Thus, by combining the acceleration sensor with the processor, an inclination, an attitude or a position of controller 22 can be determined.

On the other hand, in an example where the acceleration sensor is premised on a dynamic state, acceleration in accordance with movement of the acceleration sensor is detected in addition to a component of acceleration of gravity. Therefore, by eliminating the component of acceleration of gravity with prescribed processing, a direction of movement or the like can be determined. Specifically, when controller 22 having the acceleration sensors is moved in a manner dynamically accelerated by a user's hand, the acceleration data generated by the acceleration sensors is processed so that various movements and/or positions of controller 22 can be calculated.

Even in an example where the acceleration sensor is premised on a dynamic state, inclination with respect to the direction of gravity can be determined by eliminating acceleration in accordance with movement of the acceleration sensor with prescribed processing. In another embodiment, the acceleration sensor may incorporate an embedded signal processing device or a dedicated processing device of another type for subjecting an acceleration signal (acceleration data) output from contained acceleration detection means to desired processing prior to output of acceleration data to processor 70. For example, an embedded or dedicated processing device may convert sensed acceleration data into a corresponding inclination angle (or other preferred parameters) if the acceleration sensor serves to detect static acceleration (for example, acceleration of gravity).

Wireless module 76 modulates a carrier wave at a prescribed frequency with input data and emits the resultant weak radio signal from antenna 78, using, for example, the Bluetooth® technique. Namely, input data is modulated by wireless module 76 into a weak radio signal and transmitted from antenna 78 (controller 22). This weak radio signal is received by wireless controller module 52 provided in game device 12 described above. The received weak radio wave is subjected to demodulation and decoding processing, and consequently, game device 12 (CPU 40) can obtain input data from controller 22. Then, CPU 40 proceeds with game processing in accordance with the obtained input data and the program (game program).

In addition, as described above, controller 22 is provided with image pick-up information operating unit 80. Image pick-up information operating unit 80 is constituted of an infrared filter 80*a*, a lens 80*b*, an image pick-up element 80*c*, and an image processing circuit 80*d*. Infrared filter 80*a* allows passage of only infrared of light incident from the front of controller 22. As described above, markers 340*m* and 340*n* arranged in the vicinity of (around) a display screen of monitor 34 are infrared LEDs for outputting infrared rays from the front of monitor 34. Therefore, an image of markers 340*m* and 340*n* can more accurately be picked up by providing infrared filter 80*a*. Lens 80*b* collects the infrared rays that have passed through infrared filter 80*a* and directs the infrared rays toward image pick-up element 80*c*. Image pick-up element 80*c* is implemented by a solid-state image pick-up element such as a CMOS sensor or a CCD, and it picks up an image of the infrared rays collected by lens 80*b*. Therefore, image pick-up element 80*c* picks up an image only of the infrared rays that have passed through infrared filter 80*a* to generate image data. An image picked up by image pick-up element 80*c* is hereinafter referred to as a picked-up image. The image data generated by image pick-up element 80*c* is processed by image processing circuit god. Image processing circuit 80*d* calculates a position of an image pick-up object (markers 340*m* and 340*n*) within the picked-up image and outputs each coordinate value indicating the position to processor 70 as the image pick-up data every fourth prescribed time. Processing in image processing circuit 80*d* will be described later.

Figure 6:
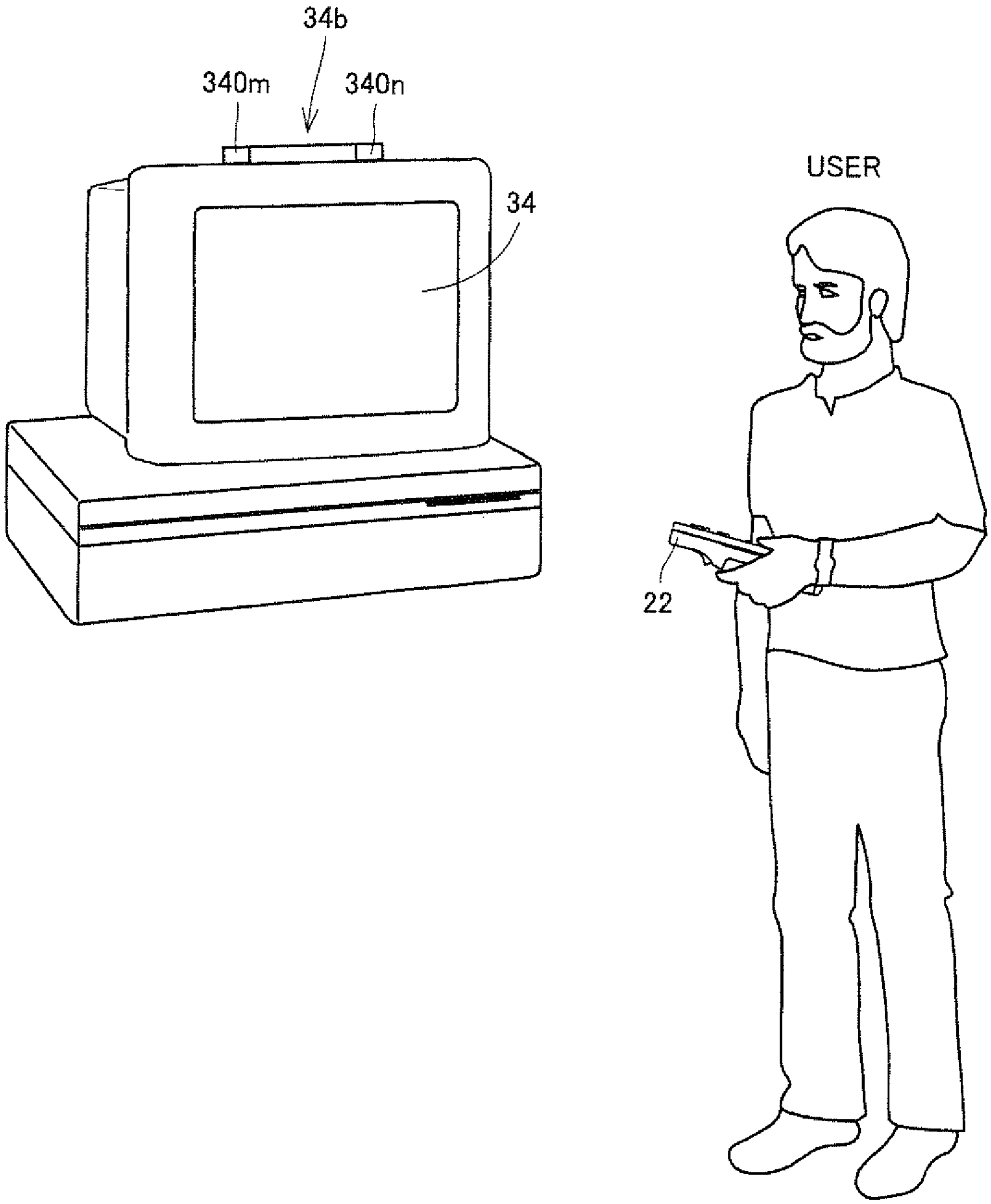
FIG. 6 is a diagram showing an exemplary state of playing a game using the controller shown in FIG. 2.

FIG. 6 is a diagram showing an exemplary state of playing a game using controller 22. As shown in FIG. 6, in playing a game using controller 22 in video game system 10, the user holds controller 22 with one hand. Strictly speaking, the user holds controller 22 in such a state that the tip end surface of controller 22 (on the side of port 22*d* on which light to be picked up by image pick-up information operating unit 80 is incident) is directed toward markers 340*m* and 340*n*. As can be seen also from FIG. 6, however, markers 340*m* and 340*n* are arranged in parallel to the horizontal direction of the screen of monitor 34. In such a state, the user performs a game operation by changing a position on the screen indicated by controller 22 or by changing a distance between controller 22 and each marker 340*m*, 340*n*.

Figure 7:
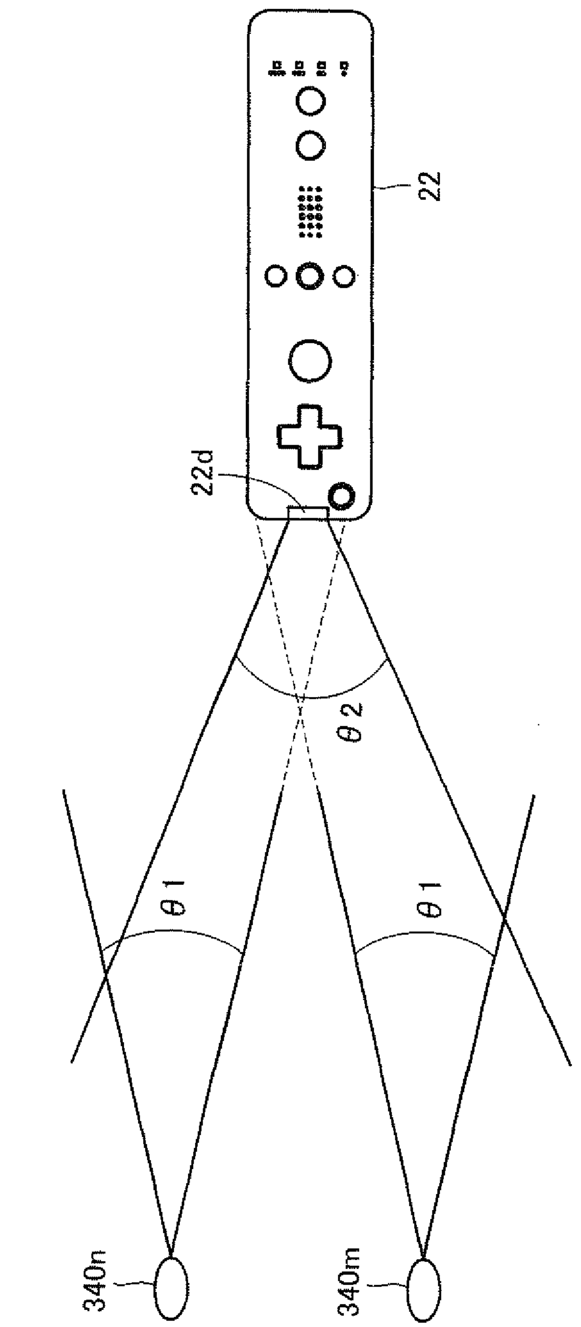
FIG. 7 is a diagram for illustrating a viewing angle of a marker and the controller.

FIG. 7 is a diagram for illustrating a viewing angle of markers 340*m* and 340*n* and controller 22. As shown in FIG. 7, each of markers 340*m* and 340*n* emits infrared rays in a range of a viewing angle θ1. In addition, image pick-up element 80*c* of image pick-up information operating unit 80 can receive incident light in a range of a viewing angle θ2, with a direction of line of sight of controller 22 being defined as the center. For example, viewing angle θ1 of markers 340*m* and 340*n* is set to 34° (half-value angle), while viewing angle θ2 of image pick-up element 80*c* is set to 41°. The user holds controller 22 in such a position and an orientation that image pick-up element 80*c* can receive infrared rays from two markers 340*m* and 340*n*. Specifically, the user holds controller 22 such that at least one of markers 340*m* and 340*n* is located within viewing angle θ2 of image pick-up element 80*c* and controller 22 is located in viewing angle θ1 of at least one of markers 340*m* and 340*n*. In such a state, controller 22 can sense at least one of markers 340*m* and 340*n*. The user can perform a game operation by changing the position and the orientation of controller 22 in a range satisfying this condition.

If the position and the orientation of controller 22 are out of this range, the game operation based on the position and the orientation of controller 22 cannot be performed. Such a range above will hereinafter be referred to as an "effective operation range."

Figure 8:
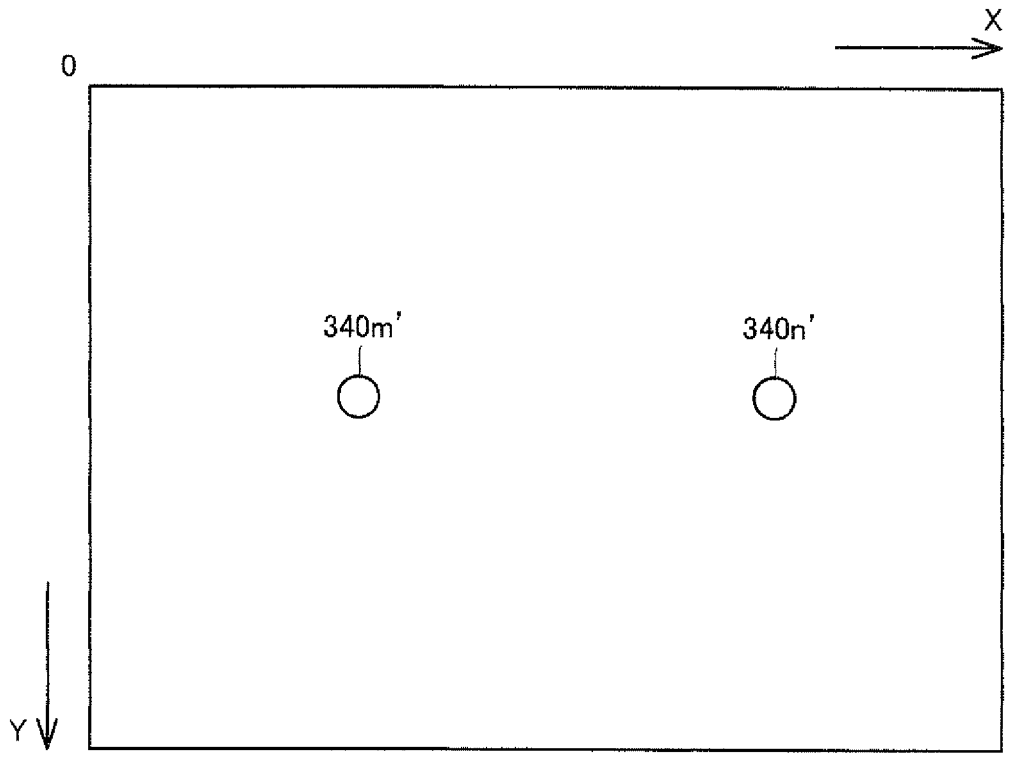
FIG. 8 is a diagram showing an exemplary picked-up image including a target image.

When controller 22 is held within the effective operation range, an image of each marker 340*m*, 340*n* is picked up by image pick-up information operating unit 80. Namely, the picked-up image obtained by image pick-up element 80*c* includes an image of each marker 340*m*, 340*n*, which is a target of image pick-up (target image). FIG. 8 is a diagram showing an exemplary picked-up image including a target image. Using the image data of the picked-up image including the target image, image processing circuit 80*d* calculates a coordinate indicating a position of each marker 340*m*, 340*n* in the picked-up image (a marker coordinate).

As the target image appears as a high-luminance portion in the image data of the picked-up image, image processing circuit 80*d* initially detects this high-luminance portion as a candidate for the target image. Then, image processing circuit 80*d* determines whether that high-luminance portion is the target image or not, based on a size of the detected high-luminance portion. The picked-up image may include not only target images 340*m*' and 340*n*' corresponding to two respective markers 340*m* and 34 on but also an image other than the target image due to solar rays passing through a window or light of a fluorescent lamp in a room. Processing for determining whether the high-luminance portion is the target image or not is performed in order to distinguish between target images 340*m* and 340*n*' corresponding to respective markers 340*m* and 340*n* and an image other than that and to accurately detect the target image. Specifically, in the determination processing, whether the detected high-luminance portion has a size in a predetermined prescribed range or not is determined. When the high-luminance portion has a size in the prescribed range, the high-luminance portion is determined as the target image. In contrast, when the high-luminance portion does not have a size in the prescribed range, the high-luminance portion is determined as an image other than the target image.

In addition, image processing circuit 80*d* calculates a position of the high-luminance portion that has been determined as the target image as a result of the determination processing above. Specifically, the position of the center of gravity of the high-luminance portion is calculated. Here, the coordinate of the position of the center of gravity is referred to as a marker coordinate. In addition, the position of the center of gravity can be calculated on an order higher than resolution of image pick-up element 80*c*. Here, the resolution of the image picked up by image pick-up element 80*c* is assumed as 126 dots×96 dots and the position of the center of gravity is calculated on a scale of 1024 dots×768 dots. Namely, the marker coordinate is expressed as an integer value from (0, 0) to (1024, 768).

It is noted that the position in the picked-up image is expressed in a coordinate system (an XY coordinate system) in which the upper left of the picked-up image is defined as the origin, a downward direction is defined as the positive direction of the Y-axis, and a right direction is defined as the positive direction of the X-axis.

In addition, if the target images are properly detected, two high-luminance portions are extracted as the target images through the determination processing, and therefore, two marker coordinates are calculated. Image processing circuit 80*d* outputs data indicating calculated two marker coordinates. The output data of the marker coordinates (marker coordinate data) is included in the input data and transmitted to game device 12 by processor 70, as described above.

When game device 12 (CPU 40) detects the marker coordinate data from the received input data, it can calculate a position indicated by controller 22 on the screen of monitor 34 (an indicated coordinate) and a distance from controller 22 to each of markers 340*m* and 340*n* based on this marker coordinate data. Specifically, the position to which controller 22 is directed, that is, the indicated position, is calculated based on the position of an intermediate point between two marker coordinates. In addition, as the distance between the target images in the picked-up image is varied depending on a distance between controller 22 and markers 340*m*, 340*n*, game device 12 can obtain the distance between controller 22 and markers 340*m*, 340*n* by calculating the distance between the two marker coordinates.

<Data Configuration>

Figure 9:
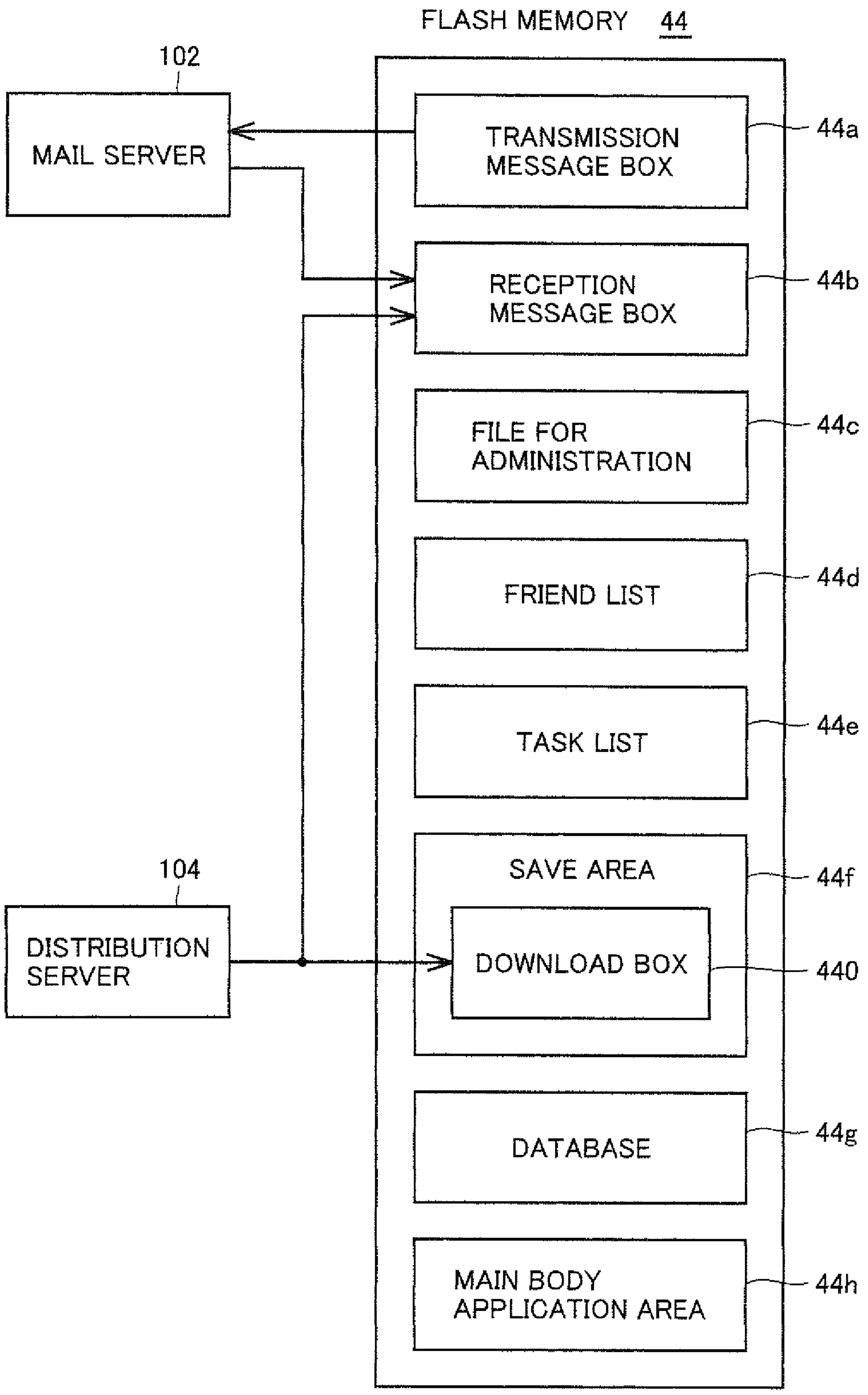
FIG. 9 is a diagram showing a data configuration stored in a flash memory embedded in a game device.

A configuration of data stored in flash memory 44 contained in game device 12 will now be described with reference to FIG. 9.

Game device 12 performs two types of communication processing for exchange of a message with mail server 102 and downloading of data from distribution server 104. Processing for exchanging the message and downloading is performed by input/output processor 42*a*. Flash memory 44 includes as a storage area, a transmission message box 44*a*, a reception message box 44*b*, a file for administration 44*c*, a friend list 44*d*, a task list 44*e*, a save area 44*f*, a database 44*g*, and a main body application area 44*h*.

Transmission message box 44*a* is an area for storing a message in an e-mail format transmitted from game device 12 to another game device 12 or other terminals (referred to as transmission data). As can also be seen in FIG. 9, the transmission data is transmitted to mail server 102. Therefore, game device 12 can transmit a message to another game device 12 through mail server 102 and network 106. Input/output processor 42*a* refers to transmission message box 44*a* based on a prescribed schedule (for example, every 10 minutes), and if transmission data is stored, it transmits the stored transmission data to mail server 102. When the transmission data is transmitted to mail server 102, the transmission data is erased from transmission message box 44*a*. Alternatively, the processing above may be performed in response to the user's operation.

Thus, input/output processor 42*a* transmits an e-mail independently of the applications. Therefore, only by performing processing for creating a message and thereafter recording the message in the e-mail format in transmission message box 44*a*, a message can be transmitted, with an application such as a message board function or a game being executed by CPU 40.

In the present embodiment, data in a more general e-mail format is exchanged with mail server 102, however, the data format is not limited to an e-mail but any data format may be adopted. Speaking in particular of communication between game devices 12, it is not necessary to adopt a general format. Even in an example of communication with another terminal, any general format adapted to processing by that terminal is also applicable. In addition, regarding a type of the server as well, any server of a type other than the mail server may be adopted, so long as it holds received data until it is accessed from a terminal.

If a transmission function is suspended or communication fails for some reason, transmission data is not transmitted and a data capacity in transmission message box 44*a* may become full. In such a case, addition of a transmission message to transmission message box 44*a* is not accepted.

Reception message box 44*b* is an area for storing a message in an e-mail format received from another game device 12, another terminal, or distribution server 104 (it may also herein be referred to as "reception data" in contrast to "transmission data" above). As can also be seen in FIG. 9, the reception data is transmitted from mail server 102 and/or distribution server 104. Input/output processor 42*a* accesses mail server 102 based on a prescribed schedule (for example, every 10 minutes) to check whether there is a new incoming mail in the server or not. When there is a new incoming mail, the new mail is obtained and stored in reception message box 44*b* as reception data. In reception message box 44*b*, the reception data is opened (used) by the application and erased, or held until reception message box 44*b* becomes full. For example, when reception message box 44*b* becomes full, oldest reception data is erased each time new reception data is received. In addition, when game device 12 is in the normal mode, the reception data held in reception message box 44*b* is moved to database 44*g* in accordance with header information except for such data as attached with data dependent on an application such as game data, and the reception data is readable by means of the message board function.

The reception data from mail server 102 is a message from another game device 12 or another terminal. Moreover, the reception data from distribution server 104 is a message such as notification from an administrator or the like of distribution server 104 to a plurality of users. For example, the administrator or the like of distribution server 104 transmits (notifies the user of) a message such as information on a new game application (game software) or information on an event in the game. Details of processing for storing data received from distribution server 104 in reception message box 44*b* will be described later.

File for administration 44*c* contains information on administration of game device 12, and it stores information specific to game device 12 such as identification information of game device 12, a user profile or the like, which is read as necessary. Friend list 44*d* corresponds to what is called an e-mail address book, and identification information of registered another game device 12 (or a mail address) and a mail address of another terminal are described. Friend list 44*d* can be referred to not only when a message board function is provided but it can also be referred to by various applications. It is noted that an e-mail other than an e-mail (reception data) that has the identification information of another game device 12 or is transmitted from another terminal having the mail address registered as friend in friend list 44*d* (address registration) is erased. Namely, when a sender is unknown, reception data is filtered. Thus, an undesired e-mail such as a spam mail can automatically be erased.

Task list 44_e_ is a list of tasks representing a schedule of downloading data from distribution server 104, and it stores tasks registered in advance for necessity of game device 12 or tasks arbitrarily registered by the user. As a result of execution of each task, downloading processing is performed.

Save area 44_f_ is an area for storing (saving) data of an application, and it includes a download box 440 in that area. Download box 440 is an area for storing data downloaded from distribution server 104 in accordance with the task, as described above. In addition, an area for each application is secured in save area 44_f_. Therefore, in another embodiment, a download box for each application may be provided in an area for storing data of an application corresponding to the download data.

Database 44_g_ is an area for storing a message for each date that is used by the message board function described above, and it can be referred to also by another application. As described above, the reception data is stored in reception message box 445, however, the capacity of reception message box 44_b_ is limited. Accordingly, when the capacity is full, oldest reception data is sequentially erased. Therefore, database 44_g_ is provided for long-time storage of messages or sharing thereof, and the reception data (message) stored in reception message box 44_b_ is moved to database 44_g_ except for data used only with an individual application, such as data attached with game data. Here, the header information of the message is referred to, so that the message is stored in each area of database 44_g_ managed for each date. For example, when year, month, day, and time are described as information for designating the time and day of the message board, the reception data is stored in the area corresponding to the designated year, month and day. If the header information of the message does not designate the time and day or the like, the message is stored in an area corresponding to the day of reception of the message. Regarding a method of managing the area for each date, for example, a folder is provided for each date so that the message is stored in a corresponding folder. Alternatively, a file may be stored under a name indicating the time.

When a memory card is attached to external memory card connector 62, the content in database 44_g_ may be backed up in the memory card either automatically or in accordance with a user's instruction.

Main body application area 44_h_ is an area for storing a program of an application (software) incorporated as a main body function. For example, a menu program at the time of start-up of game device 12 or an application of a function of game device 12 itself (a main body function) such as a message board function and a friend registration function is stored (installed) in main body application area 44_h_. Namely, game device 12 can read a program such as a game stored in optical disc 18 to execute an application, or can read a program stored in flash memory 44 to execute an application. In addition, the program stored in main body application area 44_h_ may also be added, in addition to the software described above.

<Configuration of Server>

Mail server 102 and distribution server 104 are typically implemented by a general-purpose server computer. Such a server computer includes a processor such as a CPU (Central Processing Unit) or an MPU (Micro Processing Unit), a storage device such as a dynamic memory or a hard disk, and an input/output device such as a keyboard, a mouse and a monitor. As the configuration of the server computer has been known, further description will not be provided. Mail server 102 and distribution server 104 may also be configured such that a plurality of processors cooperate with each other to provide each server function, like what is called a cluster computer.

<Overview of Application>

Overview of an application provided by execution of a content distribution application according to the present embodiment will be described. When the content distribution application according to the present embodiment is started up, initially, an initial screen as shown in FIG. 10 is displayed.

In game device 12 according to the present embodiment, when power button 20_a_ (FIG. 2) is turned on, a main menu screen is displayed in which a list of icons indicating one or more application installed in advance, including the content distribution application according to the present embodiment, is arranged. The user operates controller 22 to select an icon indicating a desired application on this main menu screen. Then, the program corresponding to the selected icon is executed.

Figure 10:
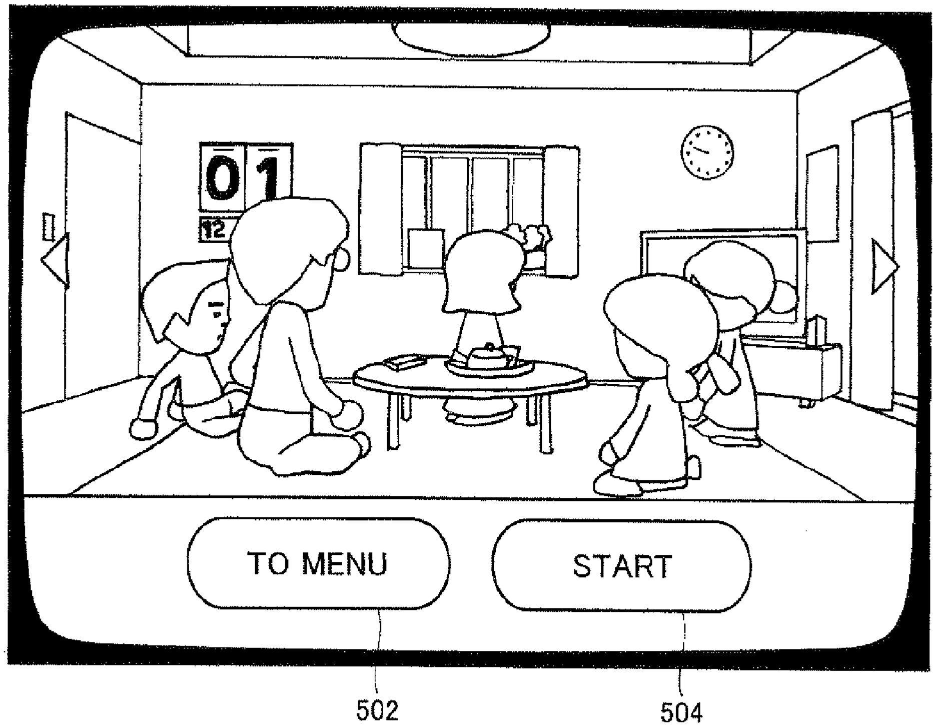
FIG. 10 is a diagram showing an exemplary initial screen of a content distribution application according to the embodiment of the present invention.

Referring to FIG. 10, in the initial screen of the content distribution application according to the present embodiment, an icon, a banner and the like are displayed in a manner superimposed on a screen shot immediately after start-up of the present application which will be described later.

When the user operates controller 22 to select a "start" icon 504, CPU 40 of game device 12 performs initialization processing and then has the main screen shown in FIG. 1 displayed. On the other hand, when the user operates controller 22 to select a "to menu" icon 502, the screen returns to the main menu.

Figure 11:
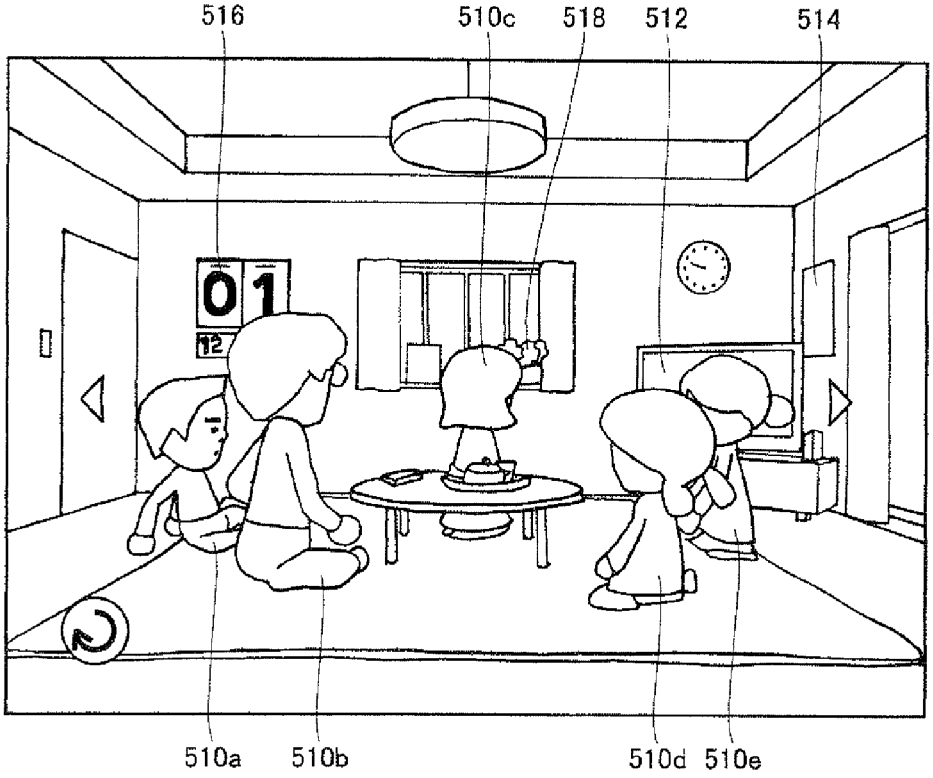

Referring to FIG. 11, the main screen displays such a 3D game image that one character or a plurality of characters 510_a_ to 510_e_ registered in advance is (are) gathering in a living room. When the user operates controller 22, a point of view of the user (camera position) in this 3D game world can be varied. Namely, CPU 40 of game device 12 has a game image different in a point of view displayed, in accordance with the user's operation of controller 22.

Here, as characters 510_a_ to 510_e_ shown in FIG. 11 can be registered in advance by the user as will be described later, they are also collectively referred to as "user character 510" for distinction from other characters.

In addition, the main screen shown in FIG. 11 shows various objects, which typically include a television object 512, a cork board object 514, a calendar object 516, a foliage plant object 518, and a poster object (not shown). These objects are all displayed in a selectable manner, and when one is selected, a corresponding function is started. Such a function will be described later.

(1. Introduction Character from Distribution Server)

Figure 12:
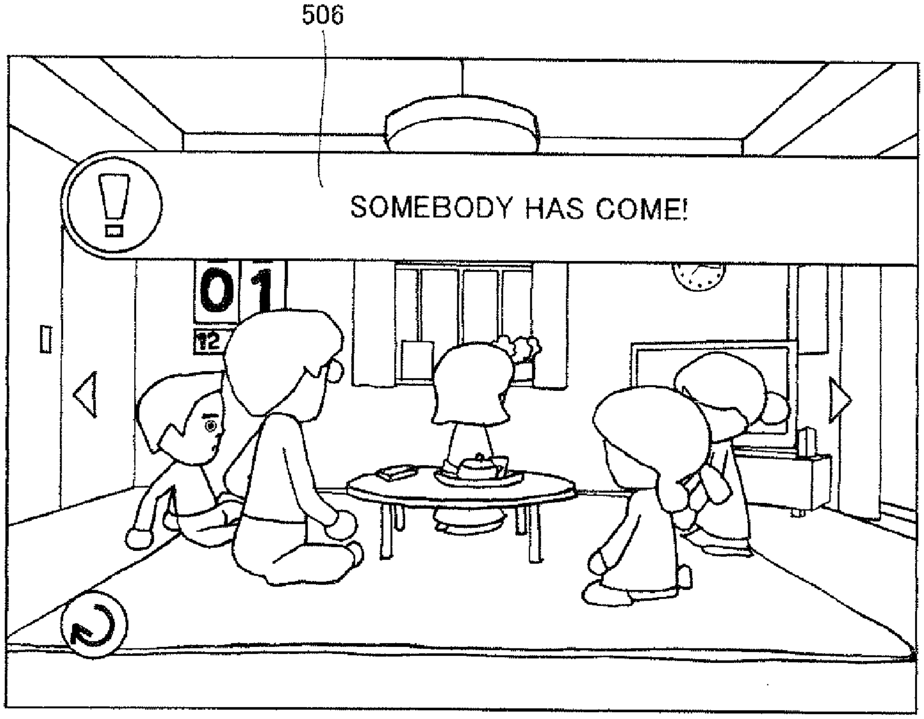
FIG. 12 is a diagram showing an example (No. 1) of a main screen of the content distribution application according to the embodiment of the present invention.
Figure 13:
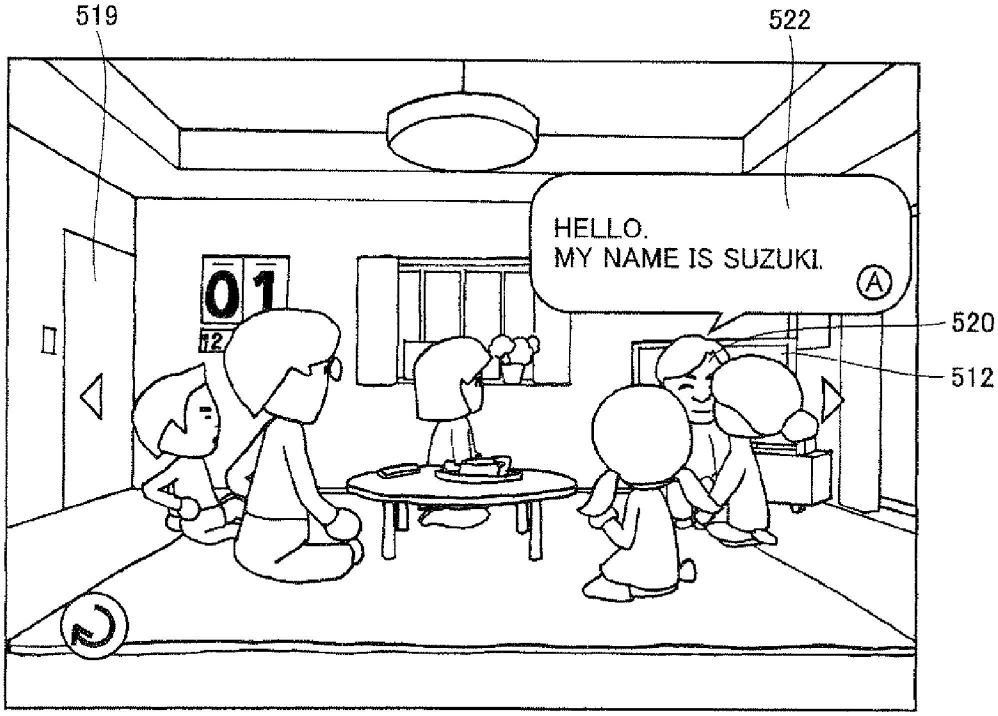
FIG. 13 is a diagram showing an example No. 3) of a main screen of the content distribution application according to the embodiment of the present invention.

At predetermined timing or at completely random timing after display of the main screen shown in FIG. 11 is started, a caption object 506 informing the user of appearance of a new character as shown in FIG. 12 is displayed. More specifically, such a message as "somebody has come" is displayed in this object 506. In succession to display of this object 506, as shown in FIG. 13, a new introduction character 520 appears on the main screen in accordance with a pre-set behavior pattern. In other words, user character 510 registered in the game device itself and introduction character 520 are displayed in the same screen. It is noted that FIG. 13 shows an effect that introduction character 520 comes out of television object 512. In addition, such an effect that a door object 519 opens and introduction character 520 enters the living room through the door may also be provided.

Figure 14:
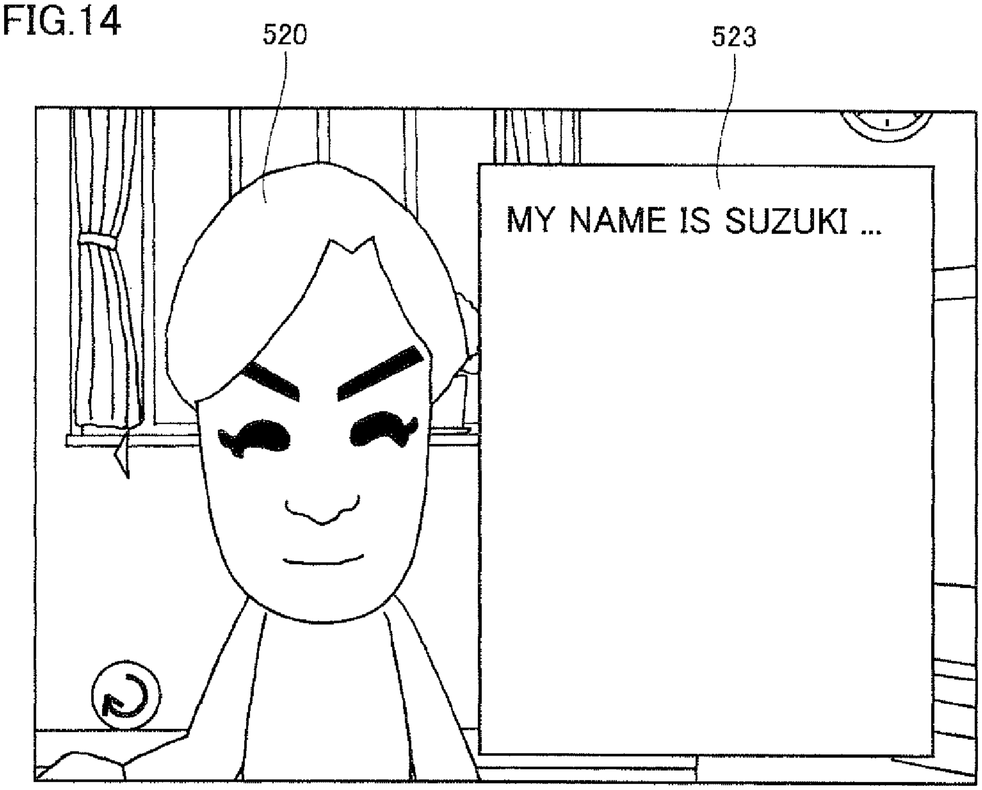
FIG. 14 is a diagram showing an exemplary screen displaying a profile of a user character of the content distribution application according to the embodiment of the present invention.

Introduction character 520 is a character for introducing a content such as a motion picture registered in distribution server 104 (FIG. 1) to the user of game device 12. For distinction from the user character described above, this character is also hereinafter referred to as "introduction character 520," Introduction character 520 is displayed in a manner based on character setting set in advance on distribution server 104 side. Then, introduction character 520 initially introduces himself/herself such as his/her name, through a balloon object 522, voice and sound, or the like. FIG. 13 shows a message of first appearance such as "hello, my name is Suzuki" in balloon object 522. In addition, introduction character 520 presents his/her own profile through balloon object 522, voice and sound, or the like. FIG. 14 shows such a profile as "my name is Suzuki . . . " in a balloon object 523. Namely, CPU 40 outputs information for introducing the introduction character itself in association with the introduction character.

After self-introduction, introduction character 520 tells the user of game device 12 that he/she will introduce a content registered in distribution server 104 through a balloon object 524, voice and sound, or the like. FIG. 5 shows such a video introduction message as "today, I came here to introduce you recommended motion picture" in balloon object 524.

Figure 16:
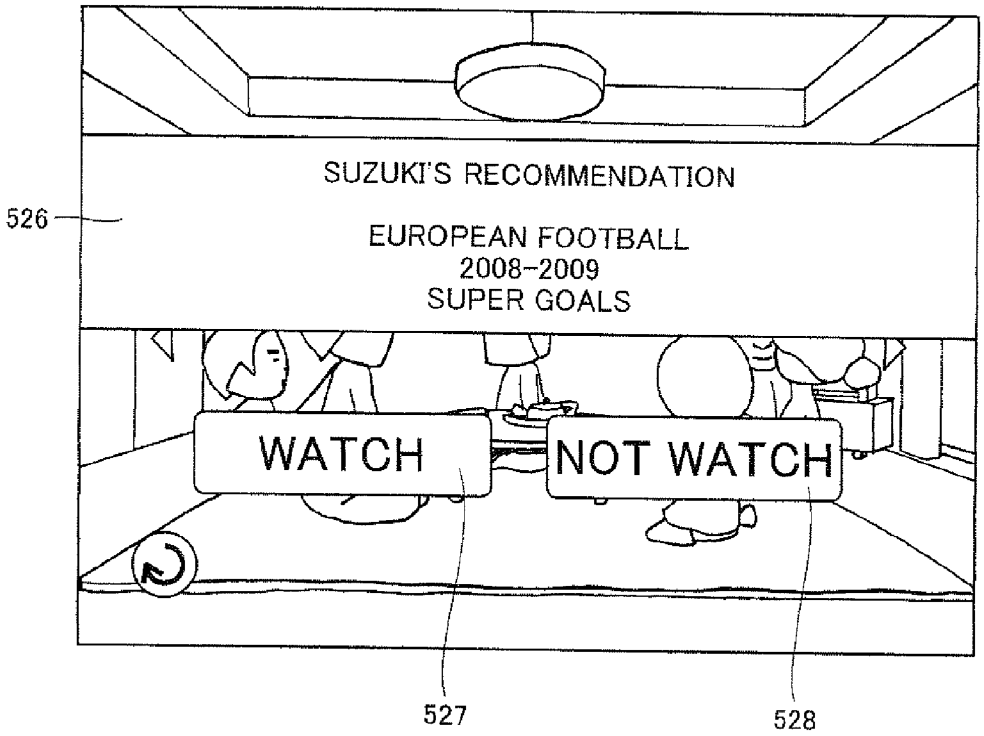
FIG. 16 is a diagram showing an example (No. 5) of a main screen of the content distribution application according to the embodiment of the present invention.

In succession, as shown in FIG. 16, the main screen displays content introduction information (such as a title or a comment) as a caption object 526 and also displays buttons 527 and 528 for asking the user whether to watch the introduced content or not, in a selectable manner. Namely, CPU 40 causes monitor 34 to display a selection screen for accepting an input for selection as to consent to reproduction of a specific introduced content. Thus, at least one of an image representing a substance of the content and voice and sound representing a substance of the content is output as the information for introducing the content.

When the user operates controller 22 to select a "watch" button 527, downloading (typically streaming) from distribution server 104 to game device 12 which will be described later is started and the content is reproduced on monitor 34 connected to game device 12. Details of the content reproduction processing will be described later.

On the other hand, when the user operates controller 22 to select a "not watch" button 528, downloading from distribution server 104 is not started. Then, introduction of the content by introduction character 520 ends.

Figure 17:
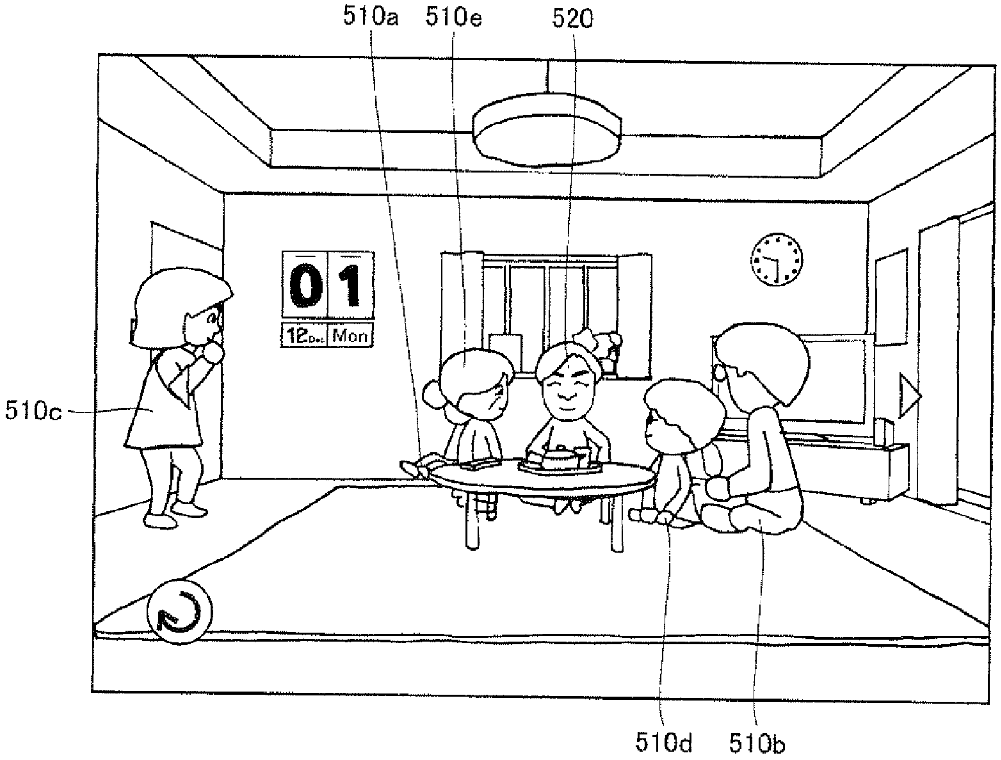
FIG. 17 is a diagram showing an example (No. 6) of a main screen of the content distribution application according to the embodiment of the present invention.

Thereafter, introduction character 520 stays in the main screen until prescribed timing comes. For example, as shown in FIG. 17, introduction character 520 remains in the living room with user character 510. Here, when the user operates controller 22 to select introduction character 520, the profile of introduction character 520 as shown in FIG. 14 is displayed again.

Figure 18:
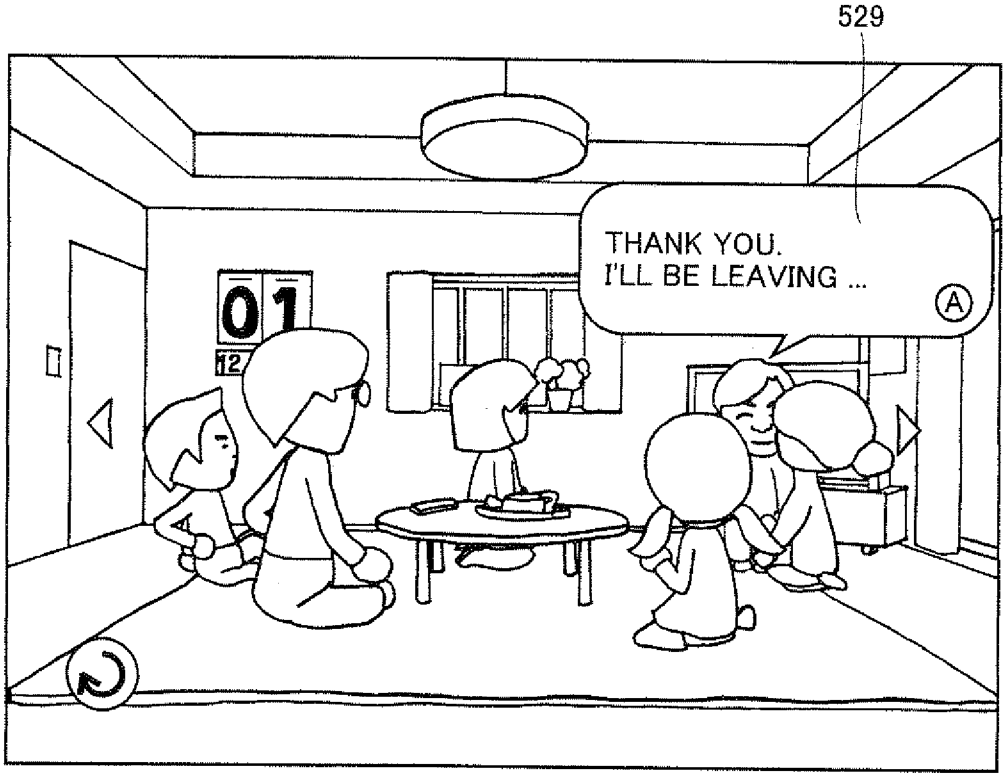
FIG. 18 is a diagram showing an example (No. 7) of a main screen of the content distribution application according to the embodiment of the present invention.

When the prescribed timing comes subsequently, as shown in FIG. 18, a balloon object 529 indicating that introduction character 520 will leave is displayed and he/she exits from the main screen. FIG. 18 shows a farewell message that "Thank you, I'll be leaving . . . " in balloon object 529.

Thus, when the content distribution application according to the present embodiment is executed, introduction character 520 introduces the content registered in distribution server 104 based on the character information set in distribution server 104. Namely, each piece of character information is brought in correspondence with the specific content stored in distribution server 104. In addition, distribution server 104 also stores content information (motion picture information) describing the information for introducing each content, and information for introducing the specific content brought in correspondence with is output based on the character information transmitted from game device 12. In the present embodiment, the content information is information that is present independently of the content itself (a substance of a motion picture or a still image), and it includes content information such as a motion picture ID and a title or a comment of the corresponding content. Namely, the content information does not include the content itself.

Figure 15:
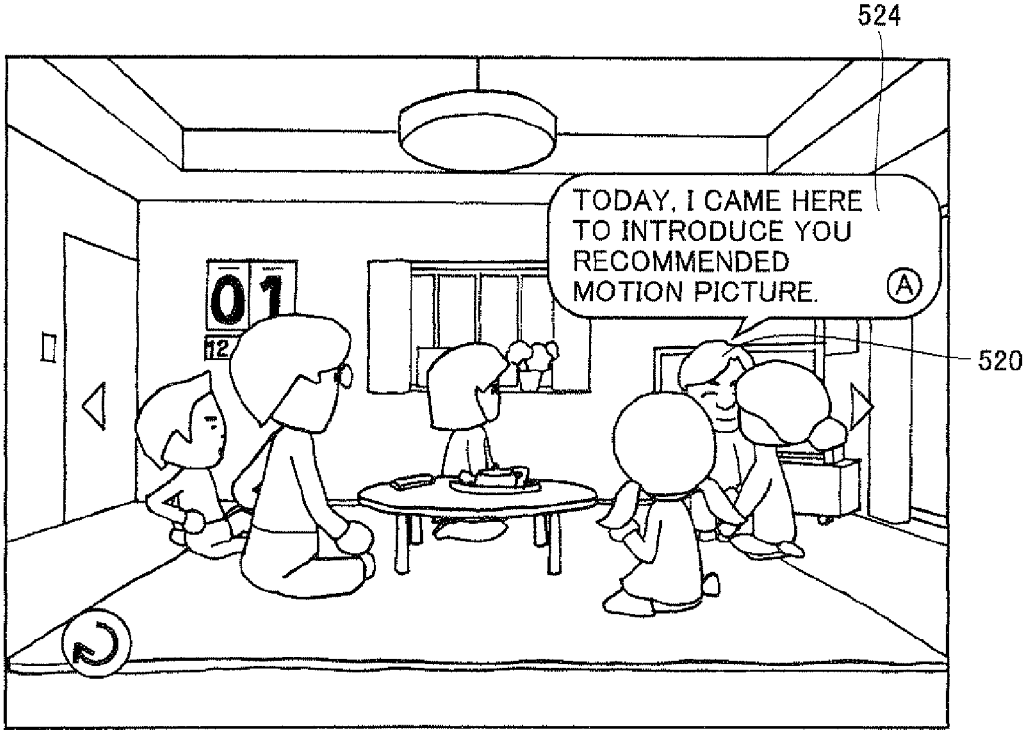
FIG. 15 is a diagram showing an example (No. 4) of a main screen of the content distribution application according to the embodiment of the present invention.

It is noted that information on a plurality of characters can be set in distribution server 104, and CPU 40 of game device 12 selects as appropriate the set character information such that frequency of appearance of these introduction characters 520 is substantially the same among one another. Namely, in game device 12, the same introduction character 520 may appear a plurality of times. In such a case, the content in balloon objects 522 and 524 as shown in FIGS. 13 and 15 respectively may be changed. Typically, the content of the message shown when certain introduction character 520 appears for the first time in a game space provided by game device 12 is preferably different from the content of the message shown when the same introduction character 520 appears in the game space provided by game device 12 for the second time or later.

For example, when introduction character 520 appears for the second time or later, such a message indicating its second appearance as "I came here again . . . " may be displayed as the content in balloon object 522 shown in FIG. 13. Further, a video introduction message that "I came here to introduce again the recommended motion picture" may be displayed as the content in balloon object 524 shown in FIG. 15.

(2. Introduction Character from Another Game Device)

In the description above, the processing that introduction character 520 introduces the content based on the information registered in distribution server 104 has been illustrated, however, a content felt interesting by the user of another game device 12 among the watched contents can be introduced to a family member, a friend or the like. It is noted that processing for recommending a substance of the content to a family member, a friend or the like after the content is watched will be described later. Processing in game device 12 that has received a message for introducing a content from the user of another game device 12 will be described hereinafter.

When the message for introducing the content from another game device 12 is received as well, the introduction character appears and introduces the substance as described above. More specifically, when the message from another game device 12 is received CPU 40 of game device 12 has caption object 506 indicating appearance of a new character displayed, as in FIG. 12 above. In succession, subsequent to display of this object 506, an introduction character appears on the main screen in accordance with a pre-set behavior pattern. Here, the introduction character that appears on the main screen is the same as the user character selected to transmit a message from among the user characters that have been registered in another game device 12. Namely, such an effect that a character substantially the same as the user character that appears on certain game device 12 is displayed as the introduction character on the main screen of another game device 12 is provided.

In addition, in indicating transmission of a message from another game device 12, the user of another game device 12 designates a behavior pattern in delivering the message (as will be described later, for example, any of calm, excited, sorrowful, apology, celebration, and birthday). The introduction character corresponding to the user character of another game device 12 that appears operates in accordance with this designated behavior pattern. Namely, CPU 40 changes animation of the introduction character to be shown, based on the behavior pattern which is the information for designating the behavior.

For example, the introduction character from another game device 12 that appears on the main screen takes a seat at the table in the living room together with user character 510, and the substance input by the user of another game device 12 as a message is reproduced. Namely, as in FIG. 15 above, the message input by the user of another game device 12 is displayed in balloon object 524 that is shown proximate to the introduction character. In other words, the user character registered in the game device itself and the introduction character based on the character information received from another game device 12 (the user character of another game device 12) are displayed in the same screen.

In addition, in an example where information on a recommended content is added to this message, the substance of the introduced content as shown in FIG. 16 (such as a title or a comment) is displayed as caption object 526 and buttons 527 and 528 for asking the user whether to watch the introduced content or not are displayed in a selectable manner.

When the user operates controller 22 to select "watch" button 527, downloading (typically streaming) from distribution server 104 to game device 12 is started and the content is reproduced on monitor 34 connected to game device 12. On the other hand, when the user operates controller 22 to select "not watch" button 528, downloading from distribution server 104 is not started.

Thereafter, the introduction character from another game device 12 exits from the main screen.

In addition to the substance described above, the "introduction information" according to the present embodiment may include information such as a message for introducing a content input by the user of another game device 12, all or a part of content information such as a title of the content or duration of a motion picture, or lines included in the character information.

<Processing Procedure at the Time of Start-Up>

Figure 19:
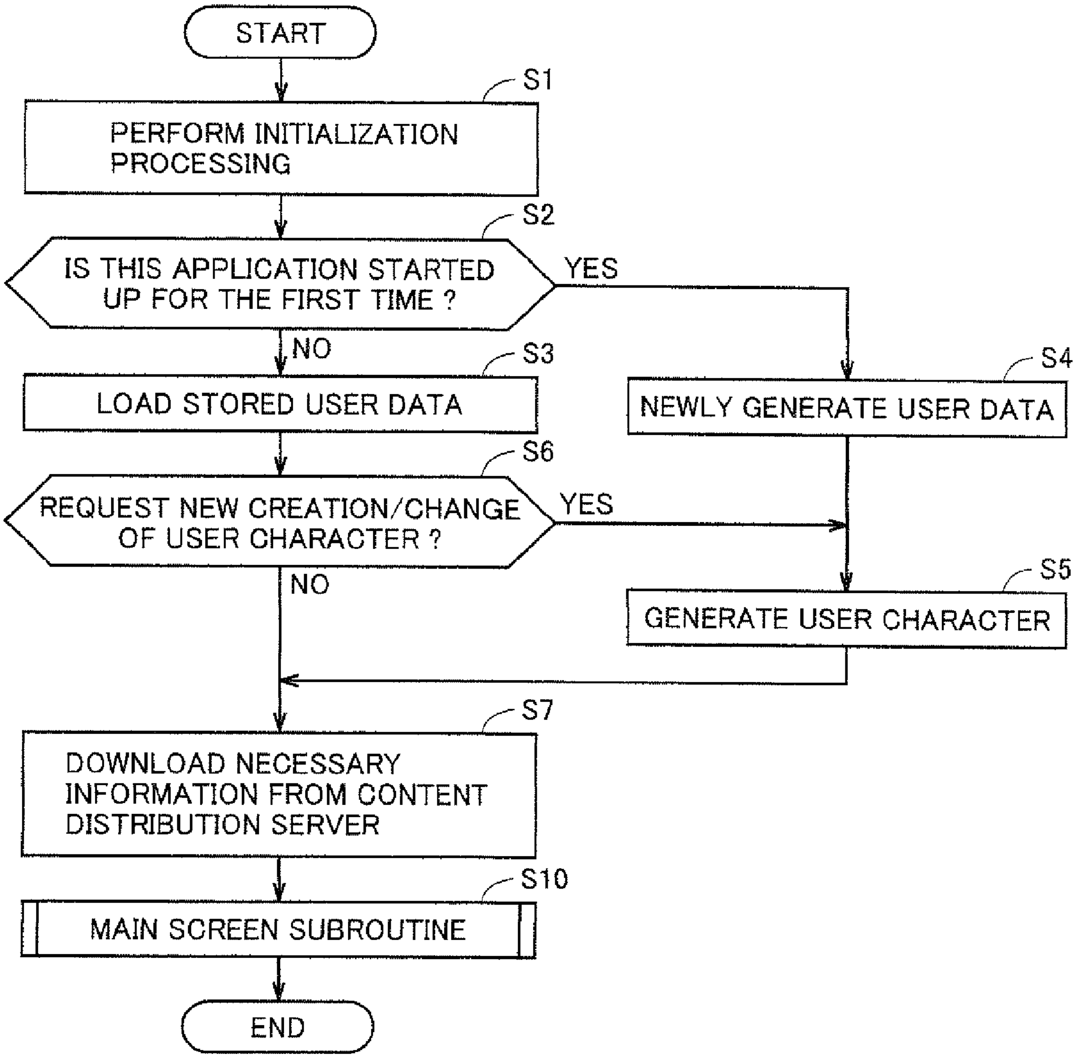
FIG. 19 is a flowchart showing a processing procedure at the time of start-up in the game device according to the embodiment of the present invention.

FIG. 19 is a flowchart showing a processing procedure when game device 12 according to the embodiment of the present invention is started up. Each step shown in FIG. 19 is provided by execution of the content distribution application according to the present embodiment by CPU 40 of game device 12.

Referring to FIG. 19, when selection of an icon indicating the content distribution application according to the present embodiment is accepted on the main menu screen, CPU 40 of game device 12 loads the corresponding program into internal main memory 42*e* or the like and starts the content distribution application. Initially, CPU 40 of game device 12 performs initialization processing (step S1). More specifically, CPU 40 performs processing such as memory check, initialization of an internal flag, establishment of network connection, or the like. In succession, CPU 40 determines whether the present application is started up for the first time or not (step S2). When start-up of the present application is not for the first time (NO in step S2), that is, when the present application has been executed in the past, CPU 40 loads user data stored in flash memory 44 or the like (step S3). Then, the process proceeds to step S6.

On the other hand, when the present application is started up for the first time (YES in step S2), that is, when the present application has never been executed in the past, CPU 40 newly generates user data relating to the present application (step S4). In successive step S5, CPU 40 has the screen for creating the user character displayed and generates the user character in accordance with the user's operation of the screen. CPU 40 causes flash memory 44 or the like to store the information on the generated user character. Then, the process proceeds to step S7. Processing for registering such a user character will be described later.

In step S6, CPU 40 determines whether the user has requested new creation or change of the user character or not. When the user requests new creation or change of the user character (YES in step S6), CPU 40 performs the processing in step S5. When the user does not request new creation or change of the user character (NO in step S6), the process proceeds to step S7.

In step S7, CPU 40 downloads necessary information from connected distribution server 104 to internal main memory 42*e* or the like. More specifically, CPU 40 accesses distribution server 104 and searches for and obtains latest event data registered in distribution server 104. It is noted that the event data includes information for introducing the content by having introduction character 520 described above appear, information or an image displayed in an object on the main screen, information for providing a calendar function which will be described later, or the like.

In succession, CPU 40 executes a main screen subroutine (step S10). The details of processing in this main screen subroutine will be described later.

<Character Registration Function>

A character registration function will now be described with reference to FIGS. 20A to 20D and FIGS. 21A to 21F. The content distribution application according to the present embodiment can generate and register various user characters in advance, in accordance with preference of the user. It is expected that such a character is created as an avatar of a user himself/herself who plays game device 12. Therefore, in game device 12 according to the present embodiment, a program for creating a character face (a character face creation application) is installed as an application independent of the present content distribution application.

Figure 20A:
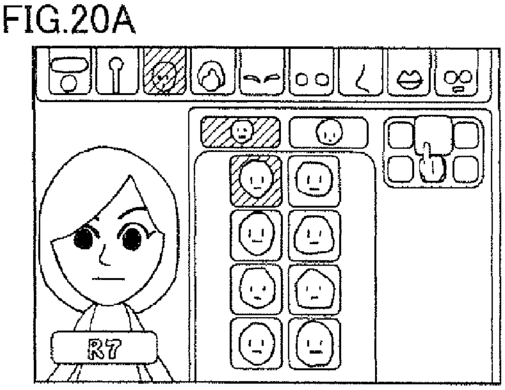
FIGS. 20A to 20D are diagrams showing an exemplary operation for a character registration function according to the embodiment of the present invention.
Figure 20B:
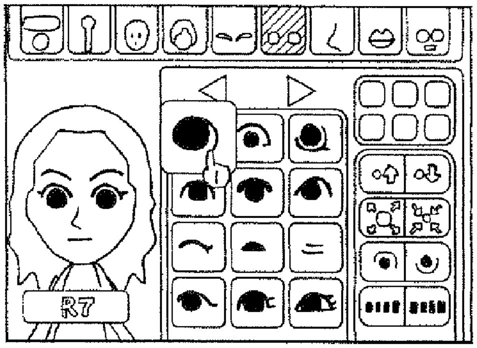
Figure 20C:
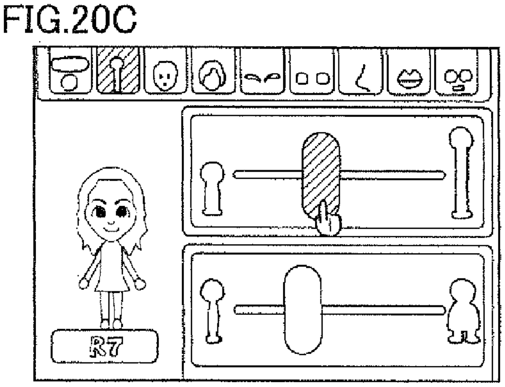
Figure 20D:
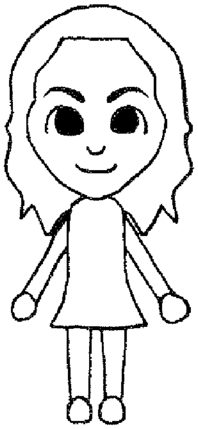

FIGS. 20A to 20D are diagrams showing exemplary screens provided by the character face creation application according to the present embodiment. Referring to FIG. 20A, in the character face creation application, initially, a screen for having the user select a contour and a hairstyle of the character is displayed. The user selects a desired contour and hairstyle on the screen shown in FIG. 20A. In succession the user selects each desired part of the face on the screen shown in FIG. 20B. In addition, the user selects a desired physical constitution and height of the character on the screen shown in FIG. 20C. Then) the character as shown in FIG. 20D is generated in accordance with selected items on respective screens shown in FIGS. 20A to 20C.

In game device 12 according to the present embodiment, a prescribed number (such as 10) of characters can be registered. Such registration information is stored in flash memory 44 or the like. Thus, CPU 40 causes flash memory 44 or the like to store the user character information for displaying the user character object on monitor 34.

Typically, such a usage that characters in number corresponding to the number of family members in a family who purchased game device 12 are registered is assumed. The characters thus registered can be used not only in the content distribution application according to the present embodiment but also in other applications installed in game device 12. Thus, as the information is shared among many applications, only basic information such as the face or the physical constitution of the character is registered in the character face creation application shown in FIGS. 20A to 20D. Namely, these characters are registered prior to execution of the flowchart shown in FIG. 19.

Figure 21A:
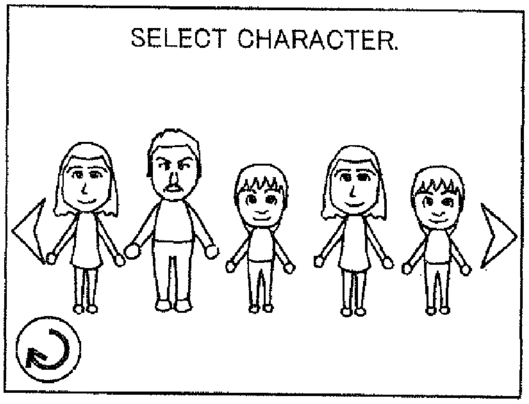
FIGS. 21A to 21F are diagrams showing an exemplary operation for creating a user character according to the embodiment of the present invention.
Figure 21B:
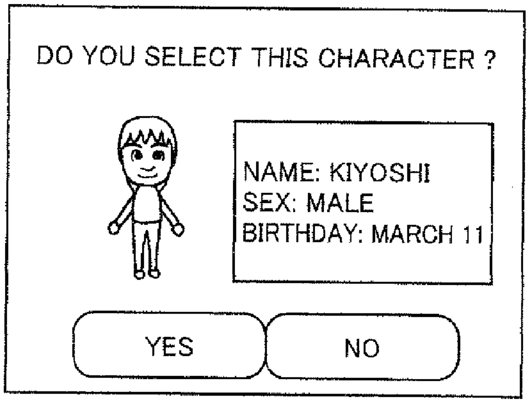
Figure 21C:
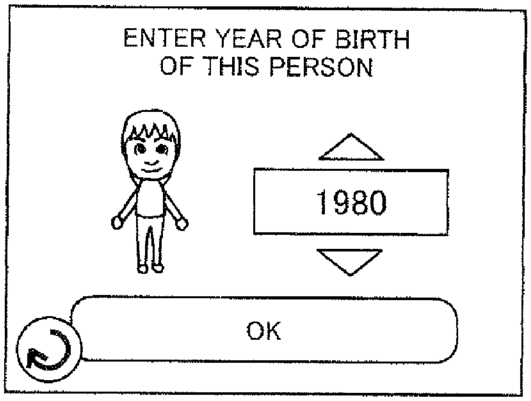
Figure 21D:
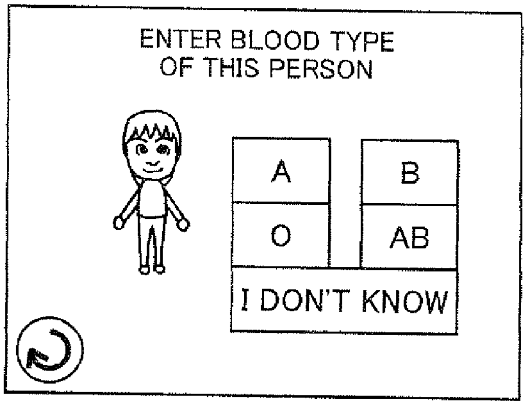
Figure 21E:
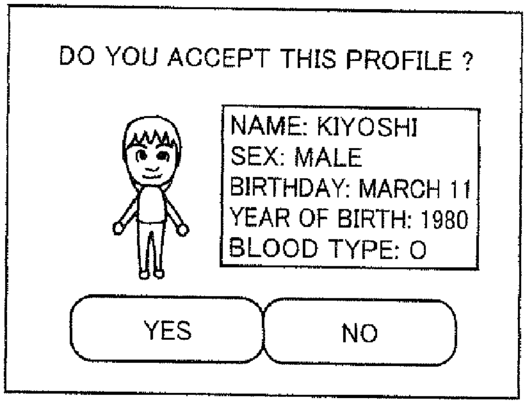
Figure 21F:
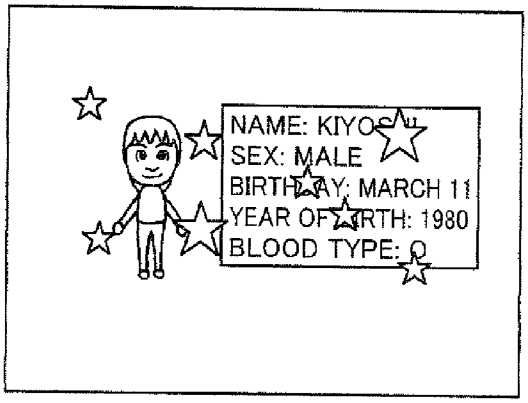

In "generate user character" shown in step S5 shown in FIG. 19, the screen as shown in FIGS. 21A to 21F is displayed. It is noted that an item set for the user character shown in FIG. 21F is typically used as an attribute in evaluation after the content is watched which will be described later.

Referring to FIG. 21A, in "generate user character" shown in step S5 in FIG. 19, initially, a screen for having the user select the user character that has already been registered is displayed. The user selects a desired user character, on the screen shown in FIG. 21A. In succession, the user checks the information already registered for the selected user character on the screen shown in FIG. 21B. When a "YES" button is selected after checking the registered information, the screen shown in FIG. 21C is displayed. The user enters a year, month and date of birth of the selected user character, on the screen shown in FIG. 21C. When the user selects the "TES" button after the year, month and date of birth is entered, the screen shown in FIG. 21D is displayed. The user enters a blood type of the selected user character, on the screen shown in FIG. 21D. When the user selects the "YES" button after the blood type is entered, the screen shown in FIG. 21E is displayed. On the screen shown in FIG. 21E, the information set by the user (a profile of the user character) is displayed. When the user selects the "YES" button after the user checks the registered information, a screen including the information of the user character profile, together with an effect that stars are twinkling, which indicates that registration has been completed, is displayed as shown in FIG. 21E.

<Processing Procedure in Main Screen>

Figure 22:
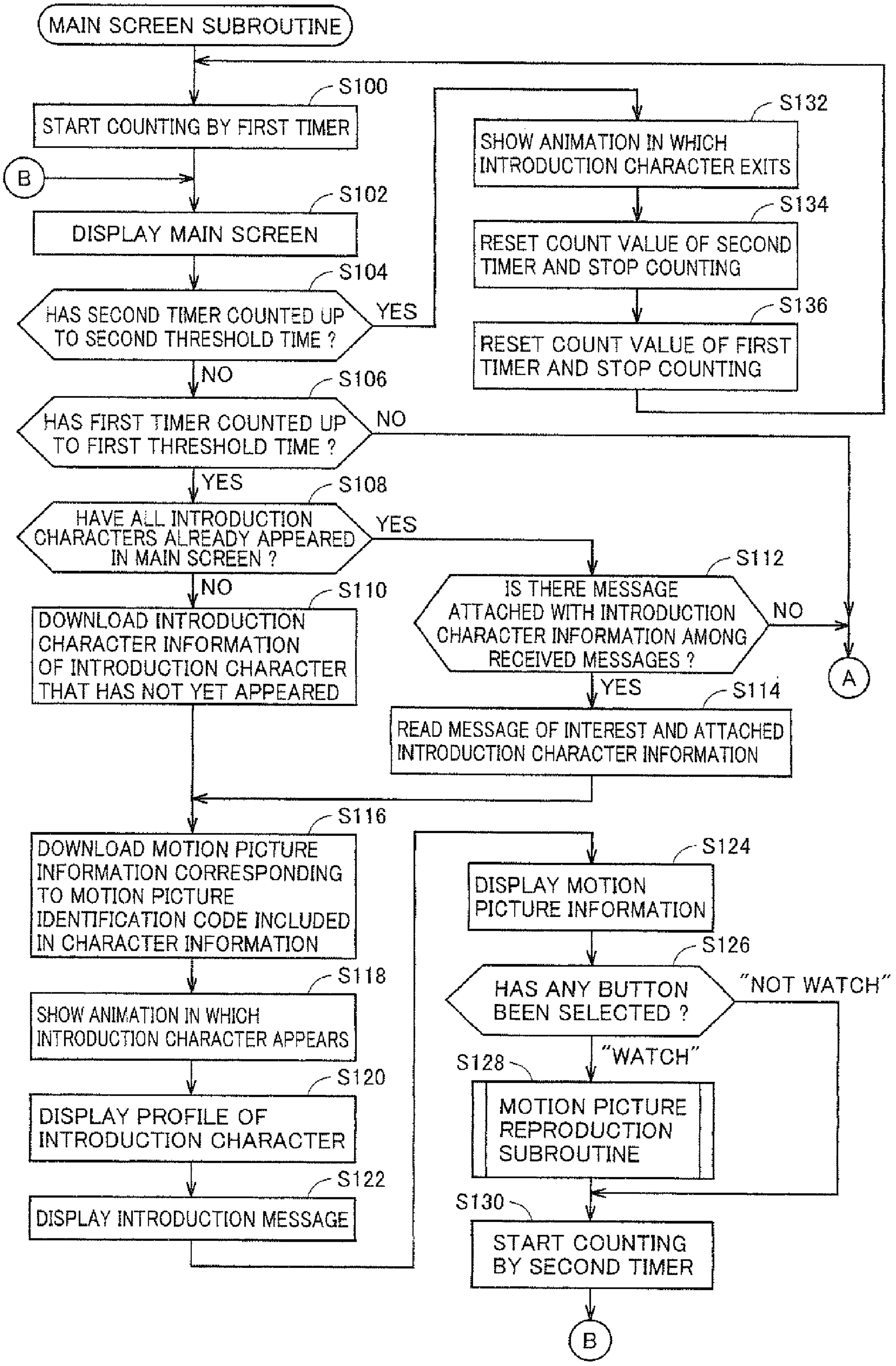
FIG. 22 is a flowchart showing a processing procedure (No. 1) of a main screen subroutine in the game device according to the embodiment of the present invention.
Figure 23:
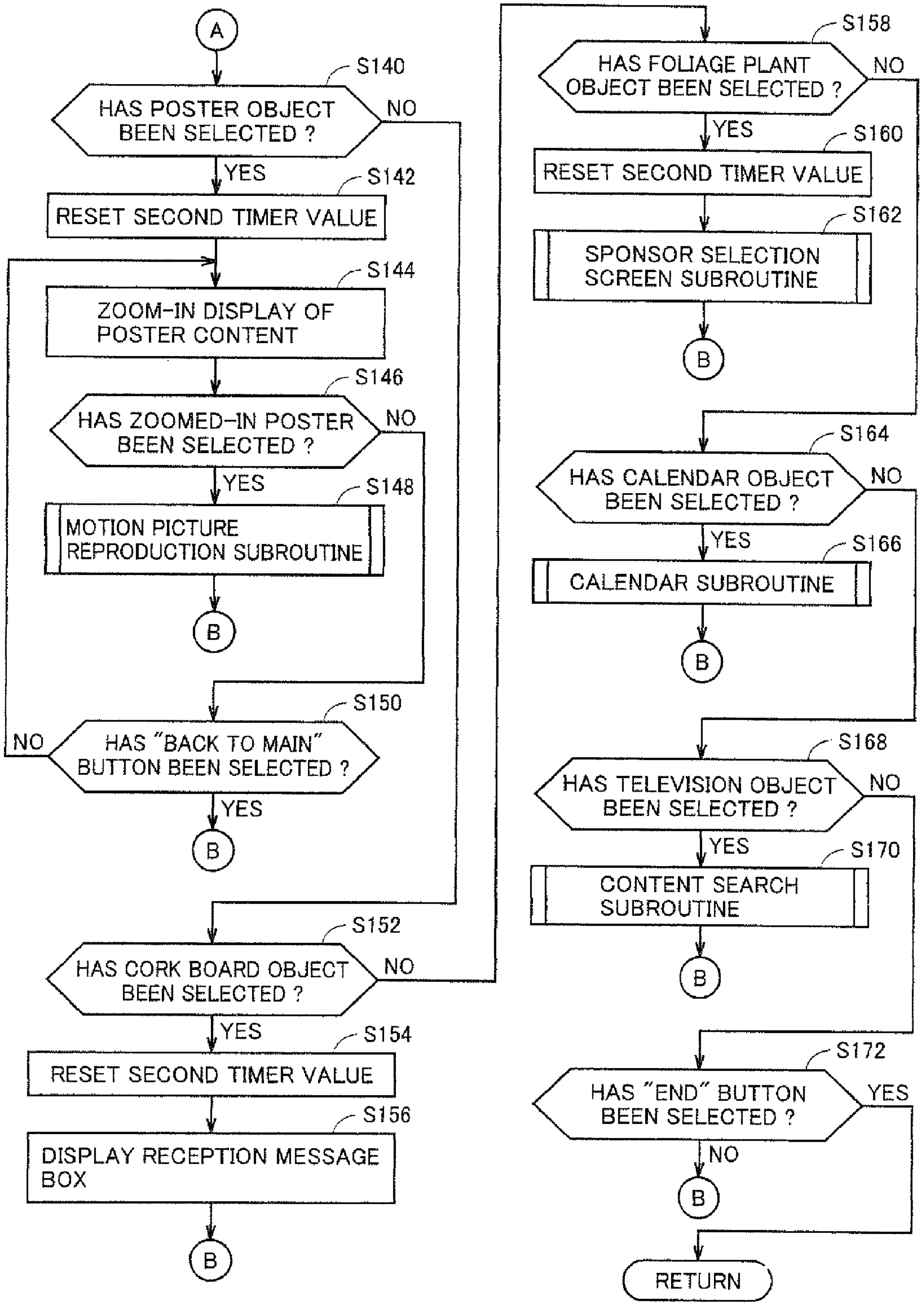
FIG. 23 is a flowchart showing a processing procedure (No. 2) of the main screen subroutine in the game device according to the embodiment of the present invention.

Referring next to FIGS. 22 and 23, the main screen subroutine (the details in step S10 in FIG. 19) for providing the main screen shown in FIGS. 11 to 18 above will now be described. Each step shown in FIGS. 22 and 23 is provided by execution of the content distribution application according to the present embodiment by CPU 40 of game device 12. In FIGS. 22 and 23, a first timer is an element for determining whether a condition for appearance of the introduction character on the main screen is satisfied or not and a second timer is an element for determining whether a condition for exit of the introduction character from the main screen is satisfied or not.

Referring to FIGS. 22 and 23, CPU 40 of game device 12 starts counting by the first timer (step S100). Namely, CPU 40 starts counting of a timer value for determining timing of appearance of the introduction character in such a situation that the introduction character has not yet appeared in the main screen. In succession, CPU 40 reads the registered user object and various objects from flash memory 44 or the like and has the main screen displayed (step S102).

Thereafter, CPU 40 determines whether the second timer has counted up to a second threshold time set in advance or not (step S104). Specifically, CPU 40 determines whether the count value of the second timer of which counting is started after the introduction character appears has reached a predetermined time or not. Namely, CPU 40 determines whether a prescribed condition for disappearance of the introduction character has been satisfied or not. In other words, CPU 40 refers to ROM/RTC 48 to obtain a current time and day, and determines whether the current time point is the timing of exit of the introduction character or not. When the second timer has counted up to the second threshold time (YES in step S104), the process proceeds to step S132. In contrast, when the second timer has not yet counted up to the second threshold time (NO in step S104), the process proceeds to step S106.

In step S106, CPU 40 determines whether the first timer has counted up to a predetermined first threshold time or not. Namely, CPU 40 determines whether a prescribed condition for displaying the introduction character is satisfied or not. In other words, CPU 40 determines whether it is necessary to have a new introduction character appear or not. When the first timer has counted up to the first threshold time (YES in step S106), the process proceeds to step S108. In contrast, when the first timer has not yet counted up to the first threshold time (NO in step S106), the process proceeds to step S140.

In step S108, CPU 40 determines whether all of the registered introduction characters have appeared on the main screen or not, based on the registration information of introduction character 520 included in the event data downloaded at the time of start-up (step S7 in FIG. 19). As described above, a plurality of introduction characters can be registered in distribution server 104. In order to introduce contents by having these introduction characters appear multiple times with similar frequencies on the main screen, in step S108, CPU 40 of game device 12 determines whether there is an introduction character that has not yet appeared or not. When all of the registered introduction characters have appeared on the main screen (YES in step S108), the process proceeds to step S112. On the other hand, when all of the registered introduction characters have not appeared on the main screen (NO in step S108), the process proceeds to step S10.

In step S110, CPU 40 downloads the introduction character information from a specified access target (distribution server 104) based on the registration information of introduction character 520 that has not yet appeared, included in the event data. Thus, CPU 40 obtains the character information brought in correspondence with the specific content from distribution server 104. In a variation of the processing in this step S110, the introduction character information of introduction character 520 that has not yet appeared may be included in the event data (step S7 shown in FIG. 19) obtained in the processing immediately after start-up of the content distribution application according to the present embodiment. Alternatively, the processing in steps S108 and S110 may be performed immediately after reception of the event data (step S7 shown in FIG. 19). In such a case, as the introduction character information obtained in the initialization processing is stored in advance in internal main memory 42*e*, external main memory 46, or flash memory 44, CPU 40 refers to the memory storing the information and reads the necessary introduction character information in step S110.

On the other hand, in step S112, CPU 40 determines whether or not a message attached with the introduction character information is present among the messages received from another game device 12 through mail server 102, in reception message box 44*b* of flash memory 44. Namely, CPU 40 determines whether a message for introducing some content is received from the user of another game device 12 or not.

In order to suppress reception of an undesired message such as a spam mail, a sender from which reception of a message is permitted may be limited to specific game device 12. In this case, CPU 40 obtains a sender of a new incoming message (new incoming mail) that has arrived at mail server 102 and determines whether the obtained sender is included in the addresses registered in friend list 44*d* (FIG. 9) or not. Then, CPU 40 causes reception message box 44*b* to store only a new message from the sender of which address is registered in friend list 44*d* and erases other new messages from mail server 102. Alternatively, CPU 40 may cause reception message box 44*b* to once store all new incoming messages (new incoming mails) that have arrived at mail server 102 and thereafter determine whether the sender of each of the stored new incoming messages is registered in friend list 44*d* or not, so that only a message of which address is registered in friend list 44*d* is maintained and other messages are erased. Namely, the received messages may be filtered based on the registration settings in friend list 44*d*. Thus, CPU 40 effectively receives a message only when the sender of the message is game device 12 registered in advance as the communication destination. Further alternatively, the registration settings in friend list 44*d* of game device 12 may periodically be transferred to mail server 102 so that mail server 102 itself determines whether or not the sender is registered in friend list 44*d* of corresponding game device 12 and only a message from the sender of which address is registered is received.

When a message attached with the introduction character information is present (YES in step S112), the process proceeds to step S114. On the other hand, when a message attached with the introduction character information is not present (NO in step S112), the process proceeds to step S140.

In step S114, CPU 40 reads the message of interest and the introduction character information attached with the message from reception message box 44*b* of flash memory 44. Then, the process proceeds to step S116.

In step S116, CPU 40 downloads the motion picture information of the content corresponding to the motion picture ID included in the downloaded introduction character information or the introduction character information read from reception message box 44*b* from distribution server 104. It is noted that the motion picture information includes a title, duration of the motion picture, sponsor identification information corresponding to the content, or the like, which will be described later. Thus, CPU 40 obtains the content information of the specific content brought in correspondence with the character information from distribution server 104. Then, the process proceeds to step S118. It is noted that the message may be attached in advance with the motion picture information such as a title, duration of the motion picture, sponsor identification information corresponding to the content, or the like, in addition to the introduction character information. In this case, it is not necessary to download the motion picture information of the content from distribution server 104 in step S116. Namely, in sender game device 12, the motion picture information relating to the content of interest may be added in advance to the message at the time of creation of the message.

In step S118, CPU 40 shows animation in which the introduction character appears. More specifically, CPU 40 shows animation after an expression, an action or the like of the introduction character is determined in accordance with the behavior pattern included in the introduction character information. Typically, CPU 40 provides such an effect that the introduction character appears out of the television as shown in FIG. 13 or the introduction character enters the room through door object 519. Thus, CPU 40 has the character object displayed when the condition for the first timer for displaying the introduction character is satisfied.

In addition, a message can be transmitted in game device 12 itself. In this case as well, the message is stored in reception message box 44*b* of flash memory 44. In such a case of displaying the message on game device 12 itself, CPU 40 provides such an effect to cause the user character selected to transmit the message to raise hand. Then, when the user character that has raised hand is selected, the substance of the message is displayed.

In successive step S120, CPU 40 has the profile of the introduction character displayed as shown in FIG. 14. More specifically, based on the profile information included in the introduction character information, CPU 40 has the substance thereof displayed. In further successive step S122, CPU 40 has the introduction message displayed as shown in FIG. 15. More specifically, based on lines included in the introduction character information or the introduction message input and transmitted by another game device 12, CPU 40 has the substance thereof displayed.

In subsequent step S124, CPU 40 has the motion picture information displayed as shown in FIG. 16. More specifically, based on the title or the like included in the motion picture information downloaded from distribution server 104, CPU 40 has the substance thereof displayed. Namely, CPU 40 causes monitor 34 to display the introduction character (the character object) based on the obtained character information and outputs the information for introducing the specific content in association with the introduction character (the character object) based on the obtained content information.

At the same time, CPU 40 has a button displayed for asking the user whether or not to watch the motion picture specified based on the motion picture information. In successive step S1126, CPU 40 determines which of the "watch" button and the "not watch" button has been selected. When the user selected the "watch" button ("watch" in step S1126), the process proceeds to step S128. In step S128, CPU 40 executes a motion picture reproduction subroutine. Namely, CPU 40 obtains the specific content from distribution server 104 in response to the user's operation and causes reproduction of the content on monitor 34. The processing details of this motion picture reproduction subroutine will be described later. After this motion picture reproduction subroutine is executed, the process proceeds to step S130.

On the other hand, when the user selected the "not watch" button ("not watch" in step S126), the process proceeds to step S130.

In step S130, CPU 40 starts counting by the second timer. Namely, CPU 40 starts counting of a timer value for determining the timing of exit of the introduction character that has appeared on the main screen. In other words, CPU 40 continues display of the introduction character, but when a condition for the second timer is satisfied, CPU 40 causes the introduction character object that is being displayed to disappear. Then, the process returns to step S102.

In contrast, in step S132, CPU 40 shows animation in which the introduction character exits. More specifically, CPU 40 causes the character to exit in accordance with the behavior pattern included in the introduction character information. In successive step S134, CPU 40 resets the count value of the second timer and stops counting by the second timer. In further successive step S136, CPU 40 resets the count value of the first timer and stops counting by the first timer. Then, the process returns to step S100.

In addition, in step S140, CPU 40 determines whether the poster object on the main screen has been selected or not. When the poster object on the main screen is selected (YES in step S140), CPU 40 resets the second timer value (step S142) and in succession, CPU 40 causes zoomed-in display of the poster content (step S144). CPU 40 has the information registered as recommended in distribution server 104 displayed, based on poster data included in the event data (step S7 in FIG. 19) downloaded at the time of start-up. In further successive step S146, CPU 40 determines whether the zoomed-in poster has been selected or not. When the zoomed-in poster is selected (YES in step S146), CPU 40 executes the motion picture reproduction subroutine in order to reproduce the motion picture brought in correspondence with the displayed poster (step S148). The processing details of this motion picture reproduction subroutine will be described later. After this motion picture reproduction subroutine is executed, the process returns to step S102.

On the other hand, when the zoomed-in poster is not selected (NO in step S146), CPU 40 determines whether a “back to main” button has been selected or not (step S150). When the “back to main” button is selected (YES in step S150), the process returns to step S102. In contrast, when the “back to main” button is not selected (NO in step S150), the processing in step S144 and subsequent steps is repeated.

On the other hand, when the poster object on the main screen is not selected (NO in step S140), CPU 40 determines whether cork board object 514 on the main screen has been selected or not (step S152). When cork board object 514 on the main screen is selected (YES in step S152), CPU 40 resets the second timer value (step S154) and in succession CPU 40 has the reception message box displayed (step S156). In addition, CPU 40 reads the designated message from reception message box 44*b* of flash memory 44 in response to selection or the like of the message by the user and has the message displayed. Thereafter, the process returns to step S102.

On the other hand, when cork board object 514 is not selected (NO in step S152), CPU, 40 determines whether foliage plant object 518 on the main screen has been selected or not (step S158). When foliage plant object 518 on the main screen is selected (YES in step S158), CPU 40 resets the second timer value (step S160) and in succession executes a sponsor selection screen subroutine (step S162). This sponsor selection screen subroutine is processing for displaying a screen for providing various contents provided by sponsors which will be described later in a selectable manner for each sponsor. After this sponsor selection screen subroutine is executed, the process returns to step S102.

On the other hand, when foliage plant object 518 is not selected (NO in step S158), CPU 40 determines whether calendar object 516 on the main screen has been selected or not (step S164). When calendar object 516 on the main screen is selected (YES in step S164), CPU 40 executes a calendar subroutine (step S166). According to this calendar subroutine, a content that is being distributed or will be distributed is displayed in a form of a calendar, or a literary calendar or the like is displayed in correspondence with each date. After this calendar subroutine is executed, the process returns to step S102.

On the other hand, when calendar object 516 on the main screen is not selected (NO in step S164), CPU 40 determines whether television object 512 on the main screen has been selected or not (step 568). When television object 512 on the main screen is selected (YES in step S168), CPU 40 executes a content search subroutine (step S170). In this content search subroutine, a search function which will be described later is performed, or a list of contents such as “new arrival”, “high-satisfaction”, “recommended”, and “favorite” is displayed in a selectable manner, In addition, the sponsor selection screen subroutine which will be described later may also be executed from the content search subroutine. After this content search subroutine is executed, the process returns to step S102.

On the other hand, when television object 512 on the main screen is not selected (NO in step S168), CPU 40 determines whether an “end” button has been selected or not (step S172). When the “end” button is not selected (NO in step S172), the process returns to step S102. In contrast, when the “end” button is selected (YES in step S172), execution of the main screen subroutine ends and the process returns to the parent process.

In the flowchart described above, the processing for determining the timing of appearance of the introduction character based on the first timer and the timing of exit of the introduction character based on the second timer has been illustrated, however, appearance/exit of the introduction character may be determined based on other various conditions. For example, some kind of user’s operation may be set as a condition for appearance. In such a case, as it can be determined that the user is definitely present in front of monitor 34, the content can reliably be introduced to the user. Alternatively, a fact that game device 12 belongs to a specific region may be set as a condition for appearance in such a case, a content aimed at that specific region can be introduced in a pinpoint manner.

<Data Exchange Between Game Device and Server>

Data exchange in distribution system 100 according to the present embodiment will now be described.

Figure 24:
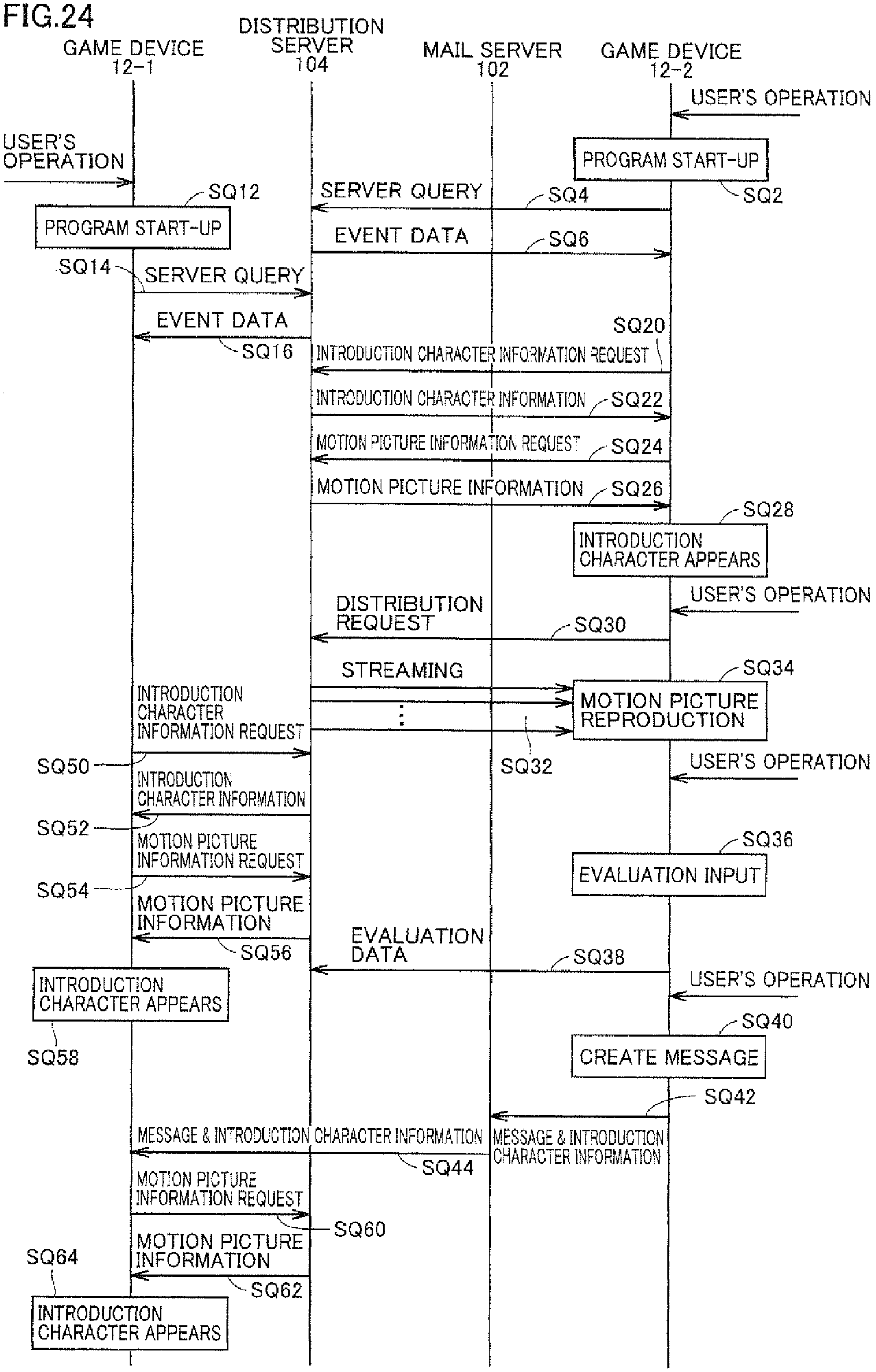
FIG. 24 is a sequence diagram relating to an introduction character in the distribution system according to the embodiment of the present invention.

Referring to FIG. 24, processing when each of two game devices 12-1 and 12-2 executes the content distribution application and a message introducing a content from one game device 12-2 to the other game device 12-1 is further transmitted will be described by way of example of data exchange in distribution system 100 according to the present embodiment.

Initially, CPU 40 of game device 12-2 starts up a program relating to the content distribution application in response to the user’s operation (sequence SQ2). In succession) CPU 40 of game device 12-2 issues a query to distribution server 104 (sequence SQ4). In response to this query, distribution server 104 transmits event data or the like to game device 12-2 (sequence SQ6).

On the other hand, CPU 40 of game device 12-1 also starts up a program relating to the content distribution application in response to the user’s operation (sequence SQ12). In succession, CPU 40 of game device 12-1 issues a query to distribution server 104 (sequence SQ14). In response to this query, distribution server 104 transmits event data or the like to game device 12-1 (sequence SQ16).

CPU 40 of game device 12-2 transmits an introduction character information request to distribution server 104 at prescribed timing (the timing of counting up to the first threshold time by the first timer shown in FIGS. 22 and 23) (sequence SQ20). In response to this introduction character information request, distribution server 104 transmits the introduction character information to game device 12-2 (sequence SQ22). In addition, CPU 40 of game device 12-2 transmits a motion picture information request to distribution server 104 (sequence SQ24). In response to this motion picture information request, distribution server 104 transmits the motion picture information to game device 12-2 (sequence SQ26).

Receiving the introduction character information and the motion picture information, CPU 40 of game device 12-2 has the introduction character appear on the main screen to introduce the content prepared in distribution server 104 (sequence SQ28).

Similarly, CPU 40 of game device 12-1 transmits an introduction character information request to distribution server 104 at prescribed timing (the timing of counting up to the first threshold time by the first timer shown in FIGS. 22 and 23) (sequence SQ50). In response to this introduction character information request, distribution server 104 transmits the introduction character information to game device 12-1 (sequence SQ52). In addition, CPU 40 of game device 12-1 transmits a motion picture information request to distribution server 104 (sequence SQ54). In response to this motion picture information request, distribution server 104 transmits the motion picture information to game device 12-1 (sequence SQ56).

Receiving the introduction character information and the motion picture information, CPU 40 of game device 12-1 has the introduction character appear on the main screen to introduce the content prepared in distribution server 104 (sequence SQ58).

When the user who watched introduction of the content on game device 12-2 selects "watch" icon 527, CPU 40 of game device 12-2 transmits a distribution request including the motion picture ID to distribution server 104 (sequence SQ30). In response to this distribution request, distribution server 104 starts distribution (typically, streaming-play) of the content such as the designated motion picture stored therein to game device 12-2 (sequence SQ32), CPU 40 of game device 12-2 generates this distributed motion picture (sequence SQ34).

After reproduction of this motion picture ends, CPU 40 of game device 12-2 accepts evaluation on the motion picture from the user (sequence SQ36). As will be described later, the content distribution application according to the present embodiment is configured to accept evaluation from the user without exception after the motion picture distributed from distribution server 104 is reproduced. Namely, CPU 40 of game device 12-2 does not perform subsequent processing until the user inputs some evaluation after reproduction of the motion picture.

When the user inputs evaluation of the motion picture, CPU 40 of game device 12-2 transmits the input evaluation to distribution server 104 (sequence SQ38).

In succession, it is assumed that the user of game device 12-2 performs an operation to select a message screen and CPU 40 of game device 12-2 creates a message directed to game device 12-1 (sequence SQ40). Thereafter, CPU 40 of game device 12-2 transmits the created message to mail server 102 (sequence SQ42). Mail server 102 transmits the message received from game device 12-2 to destination game device 12-1 (sequence SQ 44).

When CPU 40 of game device 12-1 determines that the introduction character information is attached to the message received from mail server 102 at prescribed timing, it transmits the motion picture information request to distribution server 104 based on the attached introduction character information (sequence SQ60). In response to this motion picture information request, distribution server 104 transmits the motion picture information to game device 12-1 (sequence SQ62).

Receiving the motion picture information, CPU 40 of game device 12-1 has the introduction character appear on the main screen to introduce the content that the user of game device 12-2 once watched and found interesting, based on the introduction character information attached to the message and the received motion picture information (sequence SQ64).

In the sequence diagram above, a configuration to download the introduction character information and the motion picture information from distribution server 104 has been illustrated, however, a source of supply of various contents (for example, a sponsor) may directly distribute an e-mail, a message or the like to each game device 12.

In addition, in the sequence diagram above, a configuration in which a message from certain game device 12 to another game device 12 is transmitted via mail server 102 has been illustrated, however, sender game device 12 may upload the introduction character information, the motion picture information or the like to distribution server 104 so that receiver game device 12 can download the message from distribution server 104. Alternatively, instead of a manner of using the network, the introduction character information, the motion picture information or the like may be exchanged between game devices 12 or between game device 12 and the server through a storage medium such as a portable semiconductor memory or an optical disc.

Alternatively, the introduction character information, the motion picture information or the like may be transmitted as attached with a message (e-mail) or it may directly be described in a text of the message. Alternatively, content data itself may directly be transmitted instead of the motion picture information for identifying the content.

<Data Structure of Introduction Character>

An exemplary structure of data exchanged in the sequence diagram shown in FIG. 24 above will now be described with reference to FIGS. 25A to 25C. FIG. 25A shows exemplary items included in the event data, FIG. 25B shows exemplary items included in the introduction character information, and FIG. 25C shows exemplary items included in the motion picture information. It is noted that such information is typically described in a markup language such as XML (extensible markup language). This is because ability to expand a system can be enhanced by freely defining a tag (an attribute provided to a character surrounded by < > and </>).

Referring to FIG. 25A, the event data typically includes (A1) year, month and day of interest, (A2) a poster ID, (A3) a signature color, and (A4) introduction character information. (A1) year, month and day of interest indicates a date on which each piece of event data is to be displayed so that the content displayed on the poster on the main screen is daily changed. (A2) poster ID is identification information for uniquely specifying the content to be displayed on the poster in distribution server 104. (A3) signature color indicates a signature color on that day used in a background of the poster or the like. (A4) introduction character information indicates the introduction character that appears on the main screen. More specifically, (A4) introduction character information includes (A4-1) the order of display and (A4-2) an introduction character ID for each of (normally a plurality of) introduction characters that appears on that day. Regarding (A4-1) the order of display, typically, the introduction characters are numbered such that an introduction character registered most recently is displayed first. In addition, (A4-2) introduction character ID is the identification information for uniquely specifying the introduction character in distribution server 104.

Referring to FIG. 25B, the introduction character information typically includes (B1) an introduction character ID, (B2) an apparel attribute, (B3) a jacket color attribute, (B4)

a trousers color attribute, (B5) a behavior pattern, (B6) a profile, (B7) a list of messages, and (B8) a motion picture ID.

(B1) introduction character ID is the identification information for specifying the introduction character information, and it is brought in correspondence with (A4-2) introduction character ID of the event data shown in FIG. 25A. (B2) apparel attribute is attribute information for defining apparel of the introduction character. (B3) jacket color attribute and (B4) trousers color attribute are attribute information for defining a color of the jacket and the trousers of the introduction character, (B5) behavior pattern indicates an expression, an action or the like of the introduction character when it appears or exits. In (B6) profile, comments and the like displayed in balloon object 523 in FIG. 14 are stored as the profile of the introduction character. In (B7) list of messages, comments and the like displayed in a balloon for the introduction character are stored. Namely, comments and the like displayed in balloon object 524 shown in FIG. 15 are stored. More specifically, (B7) list of messages includes (B7-1) an order, (B7-2) messages and (B7-3) an expression, in number corresponding to the number of messages. The order of messages to be displayed in correspondence with the introduction character is allocated to (B7-1) order. In (B7-2) messages, contents to be displayed are stored, and in (B7-3) expression, an expression of the introduction character in displaying the corresponding messages is stored. (B8) motion picture ID is the identification information for uniquely specifying the content (motion picture) of interest in distribution server 104. When the content is introduced with voice and sound, character strings stored in (B7-2) lines are input for voice synthesis processing so that synthesized voice is output.

Referring to FIG. 25C, the motion picture information typically includes (C1) a motion picture ID, (C2) a title, (C3) duration of motion picture, (C4) time and day of start of availability, (C5) time and day of end of availability, (C6) a sponsor ID, (C7) a portable terminal distribution flag, (C5) a motion picture ID for portable terminal, and (C9) a staff list ID.

(C1) motion picture ID is brought in correspondence with (B8) motion picture ID of the introduction character information. (C2) title stores the title of the motion picture of interest, and (C3) duration of motion picture stores duration of the motion picture of interest. (C4) time and day of start of availability and (C5) time and day of end of availability store time and date of release of the motion picture of interest and the time and date of end of release of the motion picture, respectively.

As will be described later, the content (motion picture) distributed from distribution server 104 is basically provided by any sponsor, and (C6) sponsor ID stores the identification information for specifying the sponsor providing the motion picture of interest.

In addition, as will be described later, a part of the content distributed from distribution server 104 to game device 12 can be transferred to a portable terminal which will be described later. Accordingly, (C7) portable terminal distribution flag stores a flag value indicating permission/prohibition of transfer to such a portable terminal. In addition, (C8) motion picture ID for portable terminal stores the identification information for indicating the motion picture having image quality optimal for the portable terminal, corresponding to the motion picture of interest.

In addition, (C9) staff list ID stores the identification information for specifying production staff of the content (motion picture) of interest. As will be described later, staff credits are displayed based on the identification information stored in (C9) staff list ID.

It is noted that a method of transmitting information as to which of prepared patterns is adopted as a part such as an eye or a nose constituting the face of the introduction character may be adopted as a method of expressing a face or the like of the introduction character. Alternatively, instead of such a method, bit map data or the like expressing a face of the introduction character may be transmitted.

In addition, the introduction character information shown in FIG. 25A above indicates a method of designating which behavior pattern should be used among behavior patterns prepared in advance, as a method of expressing animation of the introduction character. Instead of such a method, information for chronologically specifying actions of the introduction character (for example, a coordinate position or the like of a character at each time) may be designated.

<Overview of Motion Picture Reproduction Subroutine>

Overview of the motion picture reproduction subroutine shown in step S128 in FIG. 22 and step S1548 in FIG. 23 will now be described.

Figure 26:
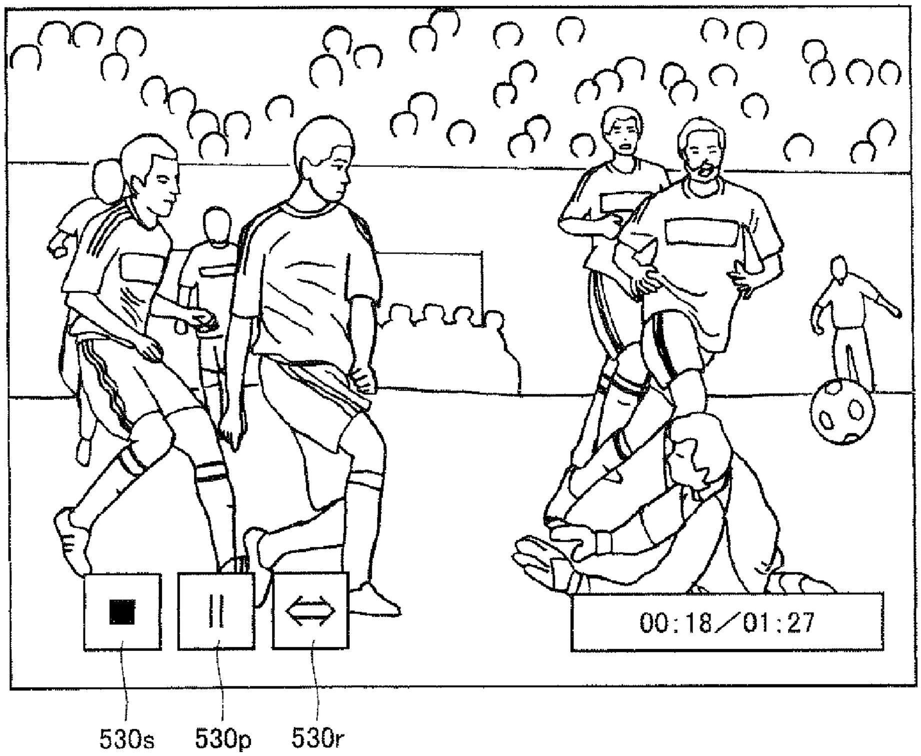
FIG. 26 is a diagram showing an exemplary state of reproduction of a content in the game device according to the embodiment of the present invention.

Initially, when the motion picture reproduction subroutine is started, in parallel to downloading of the content (motion picture) from distribution server 104, the content is reproduced and the video is displayed on monitor 34. Typically, as described above, streaming-play in which downloading and reproduction are performed in parallel is preferred. Depending on a network environment or the like, however, all or some of content data may once be downloaded to game device t2 and thereafter the content may be reproduced. FIG. 26 shows an exemplary screen in which the content (motion picture) is reproduced.

As shown in FIG. 26, during reproduction of the content, an icon or the like for controlling reproduction is displayed. Specifically, a play/stop icon 530*s*, a pause icon 530*p*, a fast forward/rewind icon 530*r*, or the like is displayed in a lower left portion of the screen. When the user operates controller 22 to select play/stop icon 530*s*, reproduction of the content is started or stopped. Play/stop icon 530*s* accepts stop of play of the content while the content is being played, and it accepts start of play of the content while reproduction of the content is stopped. In addition, when pause icon 530*p* is selected, play of the content is temporarily stopped. Moreover, when fast forward/rewind icon 530*r* is selected, fast forward or rewinding of the content being played is performed, depending on a selected position.

Thereafter, when reproduction of the content ends, basically, the screen automatically makes transition to a user evaluation input screen. It is noted that end of the content encompasses interruption or stop of play indicated at any timing by the user, in addition to completion of reproduction of the entire content.

Figure 27:
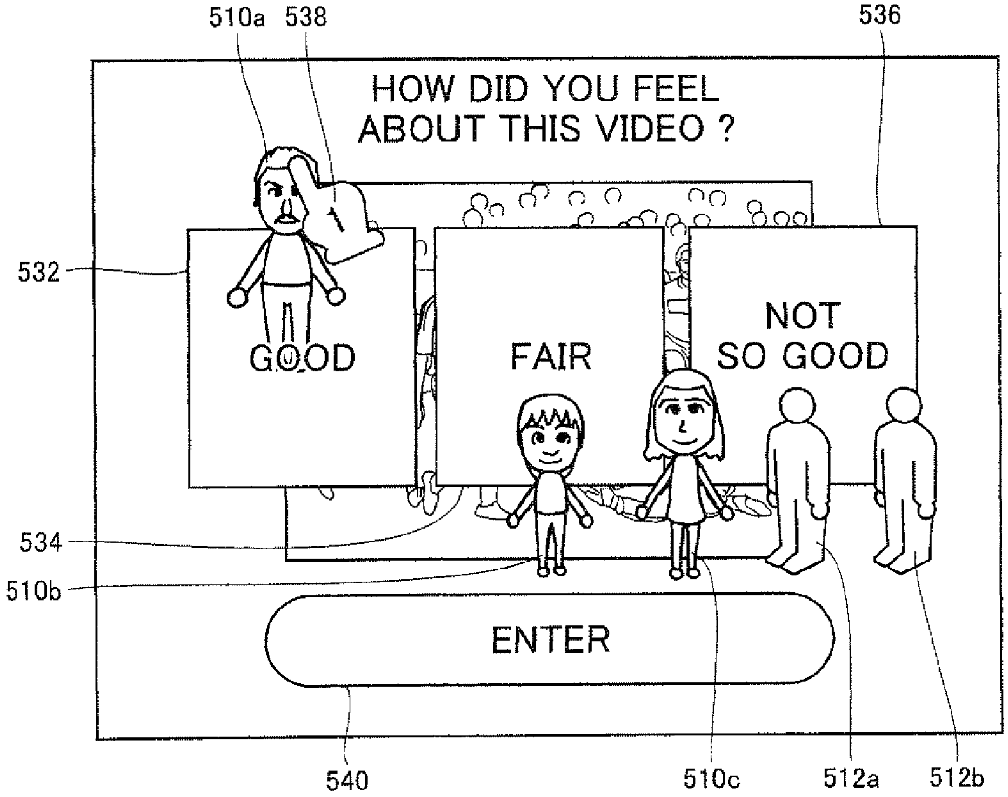
FIG. 27 is a diagram showing an exemplary user evaluation input screen in the game device according to the embodiment of the present invention.

Referring to FIG. 27, an exemplary screen for user evaluation input will be described. In the user evaluation input screen, user characters 510*a* to 510*c* registered in advance through the operation shown in FIGS. 21A to 21F are displayed and guest user characters 512*a* and 512*b* are also simultaneously displayed. In this user evaluation screen, for example, a "good" area 532, a "fair" area 534 and a "not so good" area 536 representing examples of an evaluation item area are provided as evaluation items, in order to enter evaluation in three levels. Each user operates controller 22 to move the user character representing the user himself/herself to a position indicating evaluation that the user made after watching the content. Thus, user evaluation is voted. The example shown in FIG. 27 shows such a state that a cursor 538 like a finger moves user character 510*a* to "good" area 532. It is noted that cursor 538 may show the number of users that have already voted (in the example in FIG. 27, "1").

Specific processing for evaluation input is as follows. Specifically, CPU 40 of game device 12 sets a determination area in correspondence with each area 532, 534, 536 displayed on the screen such that they are not overlapped with one another. Then, CPU 40 determines whether the user character is located in each determination area or not, and if the user character is located in the determination area, CPU 40 determines which user character is present, every prescribed cycle. Namely, CPU 40 periodically determines which user character is disposed for each determination area. Therefore, even when a plurality of user characters are arranged in the same area or even when the user characters are arranged in a plurality of different areas respectively, in any case, CPU 40 can simultaneously accept evaluation inputs. Therefore, even when a plurality of users simultaneously watch the content and thereafter the users operate and move the user characters corresponding to respective users to the areas corresponding to evaluations made by themselves, CPU 40 can simultaneously accept respective users' evaluations. Namely, when the plurality of user characters are moved to positions in respective areas corresponding to a plurality of evaluation levels, CPU 40 determines that evaluation of the reproduced content by a plurality of persons has been input.

After evaluation inputs by a prescribed number of user characters are completed, an "enter" button 540 is activated to be in a selectable state. Typically, at the time point when evaluation input by at least one user character is completed, "enter" button 540 may be activated. On the other hand, "enter" button 540 may remain inactive until evaluation inputs by more user characters or all registered user characters are completed.

In the content distribution application according to the present embodiment, once evaluation input by the user character is provided, that evaluation cannot be changed until a prescribed period of time elapses (typically, until a month next to the month in which evaluation was input comes).

In the present embodiment, whether user's evaluation has been made or not is determined based on the position of the user character in the evaluation item area in the user evaluation screen, that is, based on whether the user character is located within the evaluation item area or not. The present embodiment, however, is not limited as such, and for example, evaluation can be made by providing a radio button for each evaluation item and then turning on/off the radio button. Alternatively, a numeric value input type for entering a numeric value or a description type for inputting characters by operating controller 22 may also be adopted for making evaluation. In addition, for each evaluation item, the number of persons that should make evaluation may also be designated.

In addition, regarding the guest user character, the maximum number of persons that are allowed to input evaluation may preferably be set in advance (for example, ten at the maximum), from a point of view of prevention of abuse of an evaluation result.

Figure 28:
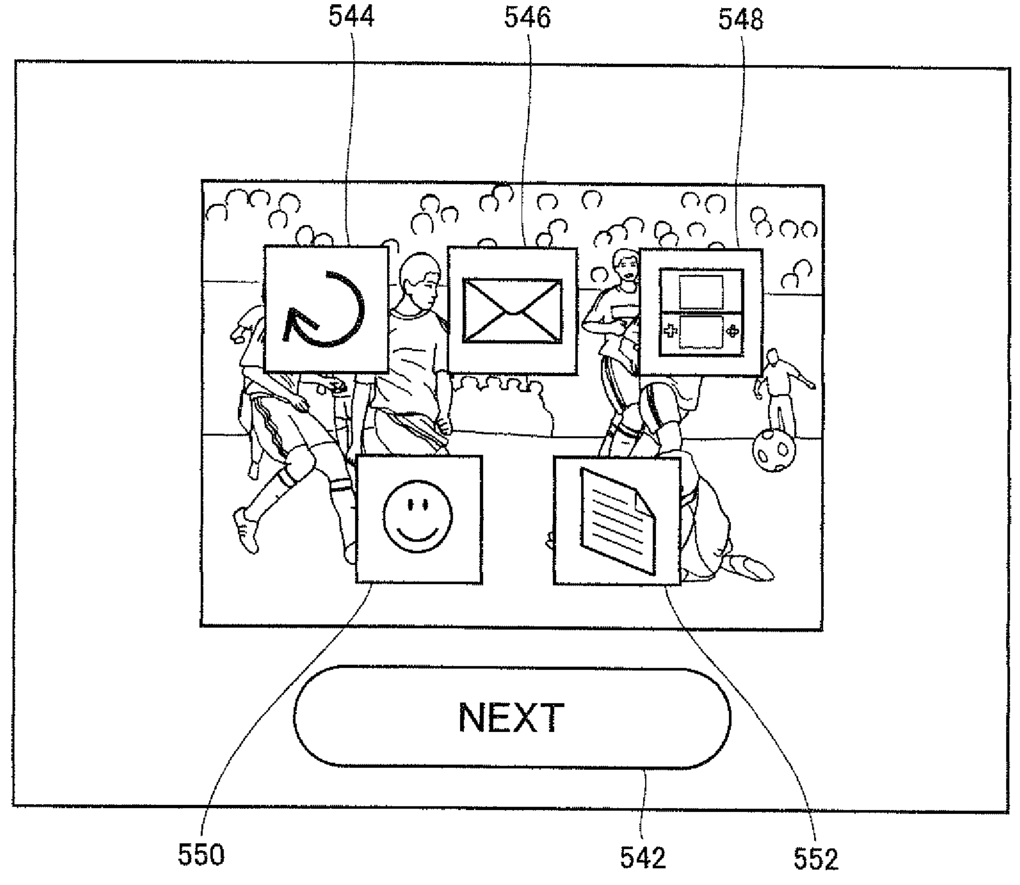
FIG. 28 is a diagram showing an exemplary sub menu screen relating to motion picture reproduction in the game device according to the embodiment of the present invention.

Thereafter, when "enter" button 540 is selected, a state of evaluation input by the user character at selected timing is stored in flash memory 44 or the like. Then, a sub menu screen as shown in FIG. 28 is displayed on monitor 34.

The sub menu screen shown in FIG. 28 shows a watch again icon 544, a message creation icon 546, a portable terminal transfer icon 548, a favorite icon 550, a credit icon 552, and a "next" button 542, in a selectable manner.

When the user operates controller 22 to select "next" button 542, CPU 40 of game device 12 transmits user information (such as age, sex, blood type, or the like) set for the user character to distribution server 104, together with evaluation result shown in FIG. 27. In succession, CPU 40 causes flash memory 44 or the like to store a vote history transmitted to distribution server 104. The vote history stored in flash memory 44 is used for avoiding redundant evaluation inputs made when the user watched again the content that he/she had watched in the past. Detailed processing will be described later.

After such evaluation input and evaluation transmission are processed, in case that the watched content is brought in correspondence with any sponsor, the sponsor selection screen subroutine which will be described later is executed.

On the other hand, when the user operates controller 22 to select watch again icon 544, CPU 40 of game device 12 causes display again of the screen shown in FIG. 26 and accepts again reproduction of the content.

On the other hand, when the user operates controller 22 to select message creation icon 546, CPU 40 of game device 12 executes a message creation subroutine which will be described later.

Alternatively, when the user operates controller 22 to select portable terminal transfer icon 548, CPU 40 of game device 12 executes a portable terminal transfer subroutine which will be described later. If transfer of the watched content to the portable terminal is not permitted, portable terminal transfer icon 548 may be displayed in an inactive state so that it cannot be selected, or portable terminal transfer icon 548 may not be displayed.

Alternatively, when the user operates controller 22 to select favorite icon 550, CPU 40 of game device 12 adds the motion picture ID for identifying the watched content to a favorite folder (not shown) or the like. This favorite folder stores information on a link, for example, to a content selected by the user, and when the user wishes to watch the content again that he/she had once watched, the content can quickly be reproduced with a simplified selection operation.

Alternatively, when the user operates controller 22 to select credit icon 552, CPU 40 of game device 12 downloads corresponding motion picture staff list data from distribution server 104 based on the staff list ID (see FIG. 25C) included in the motion picture information corresponding to the watched content. Then, CPU 40 has the credit list specifying the production staff or the like displayed, based on the downloaded data.

<Processing Procedure for Motion Picture Reproduction>

Figure 29:
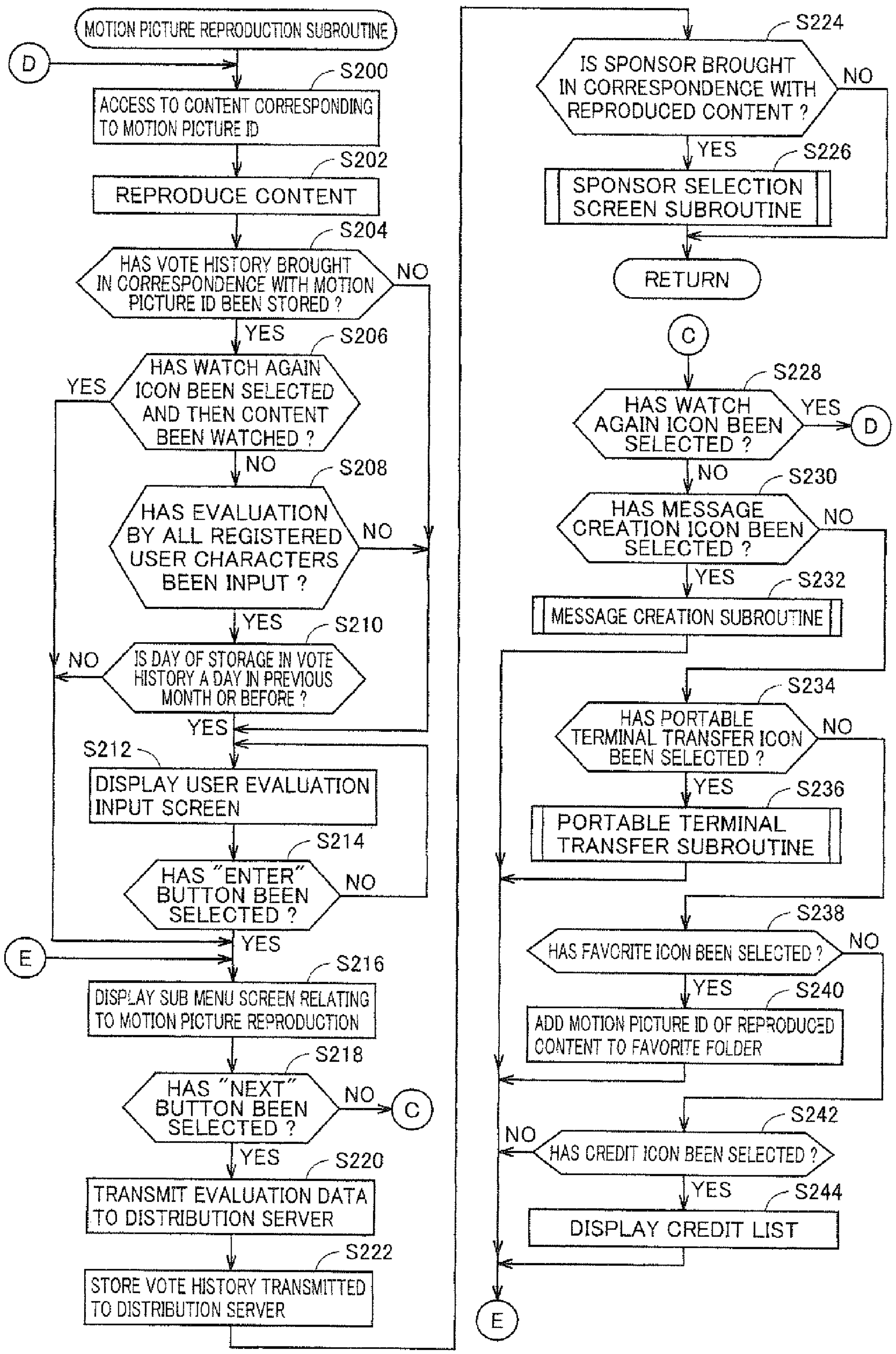
FIG. 29 is a flowchart showing a processing procedure in a motion picture reproduction subroutine in the game device according to the embodiment of the present invention.

Referring next to FIG. 29, the motion picture reproduction subroutine providing the screen relating to motion picture reproduction shown in FIGS. 26 to 28 above (the details in step S128 in FIG. 22 and step S148 in FIG. 23) will now be described. Each step shown in FIG. 29 is provided by execution of the content distribution application according to the present embodiment by CPU 40 of game device 12.

Referring to FIG. 29, initially, CPU 40 of game device 12 accesses the content corresponding to the motion picture ED included in the designated motion picture information among the contents uploaded to distribution server 104 (step S200). Namely, CPU 40 requests transmission of the content designated based on the motion picture ID. In succession, as distribution of the content from distribution server 104 is started, CPU 40 carries out streaming-play of the received content (step S202).

When reproduction of the content ends, CPU 40 determines whether the vote history brought in correspondence with the corresponding motion picture ID has been stored in flash memory 44 or not (step S204). Namely, CPU 40 determines whether evaluation of the same content has already been input or not. When the vote history brought in correspondence with the corresponding motion picture ID is not stored in flash memory 44 (NO in step S204), the process proceeds to step S212.

On the other hand, when the vote history brought in correspondence with the corresponding motion picture ID is stored in flash memory 44 (YES in step S204), CPU 40 determines whether the present reproduction of the content has been carried out based on selection of watch again icon 544 or not (FIG. 28) (step S206). When the present reproduction of the content has been carried out based on selection of watch again icon 544 (YES in step S206), the process proceeds to step S216. In this case, evaluation of the content must have already been input after the content was watched for the first time. Therefore, CPU 40 does not request input of evaluation when the present reproduction of the content ends.

In contrast, when the present reproduction of the content is not based on selection of watch again icon 544 (NO in step S206), CPU 40 determines whether evaluation by all registered user characters has already been input or not (step S208). When evaluation by all registered user characters has not yet been input (NO in step S208), the process proceeds to step S212. In this case (NO in step S208), there is a user character that has not yet input evaluation. Therefore, in order to have that user character make evaluation, input of evaluation is requested. Accordingly, in an example where a plurality of user characters are registered, when evaluation input by some user characters has been made whereas evaluation by remaining user characters has not been made, the user evaluation input screen (FIG. 27) is displayed again also after reproduction of the same content for the second time or later. In this user evaluation input screen displayed again, evaluation by the user character that had already input evaluation may also be made again, however, from a point of view of collecting more accurate statistic information, evaluation input by the same user character for the second time or later is preferably handled as invalid data.

In contrast, when evaluation by all registered user characters has been input (YES in step S208), the process proceeds to step S210.

In step S210, CPU 40 determines whether or not the day of storage in the vote history is a day in a previous month or before. Namely, CPU 40 determines whether or not a month next to the month including the day of vote of evaluation of the same content has come. When the date of vote in the stored vote history is in a previous month or before (YES in step S210), CPU 40 determines that new evaluation input is acceptable. Then, the process proceeds to step S212.

In contrast, when the date of vote in the stored vote history is not in a previous month or before (NO in step S210), CPU 40 determines that a new evaluation input is unacceptable. Then, the process proceeds to step S216.

In the above, a condition for displaying the user evaluation input screen even though the vote history has already been stored was described in connection with the processing in steps S206, S208 and S210. If the vote history has already been stored, that is, if the vote history has already been stored in step S204 (YES in step S204), however, the process may alternatively proceed to step S216.

In addition, regarding a condition for displaying the user evaluation input screen even when the vote history has already been stored, determination may be made based on any one condition in steps S206, S208 and S210, or determination may be made based on combination of conditions as in the present embodiment.

In addition, instead of the condition as to whether evaluation by all registered user characters has been input or not shown in step S208 described above, determination may be made based on such a condition that evaluation by a prescribed number of characters among the registered user characters has already been input.

In step S212, CPU 40 causes monitor 34 to display the user evaluation input screen (FIG. 27) and accepts evaluation of the content. When evaluation by at least one user character is input, CPU 40 sets “enter” button 540 (FIG. 27) to a state that can be pointed, that is, activates “enter” button 540. On the other hand, when evaluation input by the user character has not yet been provided, CPU 40 sets “enter” button 540 (FIG. 27) to a state that cannot be pointed.

In successive step S214, CPU 40 determines whether “enter” button 540 has been selected or not. When “enter” button 540 is selected (YES in step S214), the process proceeds to step S216. On the other hand, when “enter” button 540 is not selected (NO in step S214), the processing in step S212 and subsequent step is repeated.

In step S216, CPU 40 has the sub menu screen (FIG. 28) relating to motion picture reproduction displayed. In successive step S218, CPU 40 determines whether “next” button 542 (FIG. 28) has been selected or not. When “next” button 542 (FIG. 28) is selected (YES in step S218), the process proceeds to step S220. On the other hand, when “next” button 542 (FIG. 28) is not selected (NO in step S218), the process proceeds to step S228.

In step S220, CPU 40 transmits the input evaluation result and the evaluation data including the user information (such as age, sex, blood type, or the like) set for the user character to distribution server 104. In successive step S222, CPU 40 causes flash memory 44 to store the vote history transmitted to distribution server 104. Here, CPU 40 causes the date of transmission of the evaluation data to be stored as the day of vote in the vote history. The day of vote is used for determination processing in step S210 or the like described above.

In further successive step S224, CPU 40 determines whether the sponsor is brought in correspondence with the reproduced content or not. More specifically, CPU 40 makes determination based on a flag value of the sponsor ID (see FIG. 25C) included in the motion picture information corresponding to the reproduced content. When the sponsor is brought in correspondence with the reproduced content (YES in step S224), the process proceeds to step S226. On the other hand, when the sponsor is not brought in correspondence with the reproduced content (NO in step S224), the process returns to the main screen subroutine shown in FIGS. 22 and 23. When the reproduced content is a content selected in a sponsor content list screen (see FIG. 33C) which will be described later, the process returns to the sponsor selection screen subroutine shown in FIG. 34.

In step S226, CPU 40 executes the sponsor selection screen subroutine. After the sponsor selection screen subroutine is executed, the process returns to the main screen subroutine shown in FIGS. 22 and 23.

In contrast, in step S228, CPU 40 determines whether watch again icon 544 (FIG. 28) has been selected or not. When watch again icon 544 is selected (YES in step S228), the processing in step S200 is repeated. In contrast, when watch again icon 544 is not selected (NO in step S228), the process proceeds to step S230.

In step S230, CPU 40 determines whether message creation icon 546 (FIG. 28) has been selected or not. When message creation icon 546 is selected (YES in step S230), CPU 40 executes the message creation subroutine (step S232). Thereafter, the process returns to step S216. In contrast, when message creation icon 546 is not selected (NO in step S230), the process proceeds to step S234.

In step S234, CPU 40 determines whether portable terminal transfer icon 548 (FIG. 28) has been selected or not. When portable terminal transfer icon 548 is selected (YES in step S234), CPU 40 executes the portable terminal transfer subroutine (step S236). Thereafter, the process returns to step S216. In contrast, when portable terminal transfer icon 548 is not selected (NO in step S234), the process proceeds to step S238.

In step S238, CPU 40 determines whether favorite icon 550 (FIG. 28) has been selected or not. When favorite icon 550 is selected (YES in step S238), CPU 40 adds the motion picture ID for identifying the reproduced content to the favorite folder (step S240). Thereafter, the process returns to step S236. In contrast, when favorite icon 550 is not selected (NO in step S238), the process proceeds to step S242.

In step S242, CPU 40 determines whether credit icon 552 (FIG. 28) has been selected or not. When credit icon 552 is selected (YES in step S242), CPU 40 downloads the corresponding motion picture staff list data from distribution server 304 and has the credit list specifying the production staff or the like displayed (step S244). Thereafter, the process returns to step S216. On the other hand, when credit icon 552 is not selected (NO in step S242), the process returns to step S216.

<Structure of Evaluation Data>

An exemplary structure of data exchanged in the flowchart shown in FIG. 29 above will now be described with reference to FIGS. 30A and 30B. FIG. 30A shows exemplary items included in the evaluation data and FIG. 30B shows exemplary items included in the vote history. It is noted that such information is typically described in a markup language such as XML.

Referring to FIG. 30A, the evaluation data typically includes (D1) a motion picture ID, (D2) a time period of watching, (D3) time and day of start of watching, (D4) time and day of end of watching, (D5) selected image quality, (D6) a link source ID, (D7) link source auxiliary information, (D8) a game device number, (D9) an equipment address, (D10) region information, (D11) the number of times of transfer, (D112) the number of times of repeated watch, (D13) the number of times of recommendation, (D14) a sponsor ID, and (D15) evaluation result.

(D1) motion picture ID is the identification information for uniquely specifying the content (motion picture) of interest in distribution server 104. (D2) time period of watching refers to a period of time during which the content (motion picture) of interest was watched on game device 12, (D3) time and day of start of watching and (D4) time and day of end of watching store a time stamp value at which watching of the content (motion picture) was started on game device 12 and a time stamp value at which watching ended, respectively. (D5) selected image quality stores image quality of the content (motion picture) watched on game device 12.

(D6) link source ID stores a link address (a link source) that was present prior to access to the content (motion picture) and (D7) link source auxiliary information stores information other than an address relating to the link source. (D8) game device number stores specific information for identifying game device 12 and (D9) equipment address stores a network address or a MAC address of game device 12.

(D10) region information stores information on a region (for example, a prefecture name) where game device 12 is located. It is noted that the region information is set in advance for game device 12 through a user's operation or the like.

(D11) the number of times of transfer stores the number of times that indicates how many times the content of interest was transferred to the portable terminal which will be described later. (D12) the number of times of repeated watch stores how many times watching of the content of interest was repeated. (D13) the number of times of recommendation stores the number of times of transmission of a message recommending the content of interest. Instead of such a configuration as transmitting a specific number of times of transmission of a message recommending the content to a family member, a friend or the like, information (typically, a flag) indicating whether a message recommending the content to a family member, a friend or the like has been transmitted or not may be employed.

(D14) sponsor ID stores the identification information for specifying the sponsor when the sponsor is brought in correspondence with the content of interest.

(D15) evaluation result stores the evaluation content input for each user character, the user information (such as age, sex, blood type, or the like) set for the user character, and the like. Specifically, (D15) evaluation result includes, for each user character, (D15-1) a user character ID, (D15-2) age, (D15-3) sex, (D15-4) blood type, and (D15-5) evaluation. (D15-1) user character ID stores the identification information for specifying the user character registered in game device 12, and (D15-2) age, (D15-3) sex and (D15-4) blood type store the information set on the setting screen shown in FIG. 21D above. (D15-5) evaluation stores evaluation set on the user evaluation input screen shown in FIG. 27.

Referring to FIG. 30B, the vote history includes at least (E1) a motion picture ID, (E2) time and day of storage, (E3) a sponsor ID, and (E4) an evaluation result. In addition, (E4) evaluation result includes (E4-1) a user character ID and (E4-2) evaluation. Details of each item included in the vote history are substantially the same as the details of the corresponding item included in the evaluation data shown in FIG. 30A. Therefore, detailed description thereof will not be repeated.

<Summarizing Processing in Distribution Server>

Figure 31:
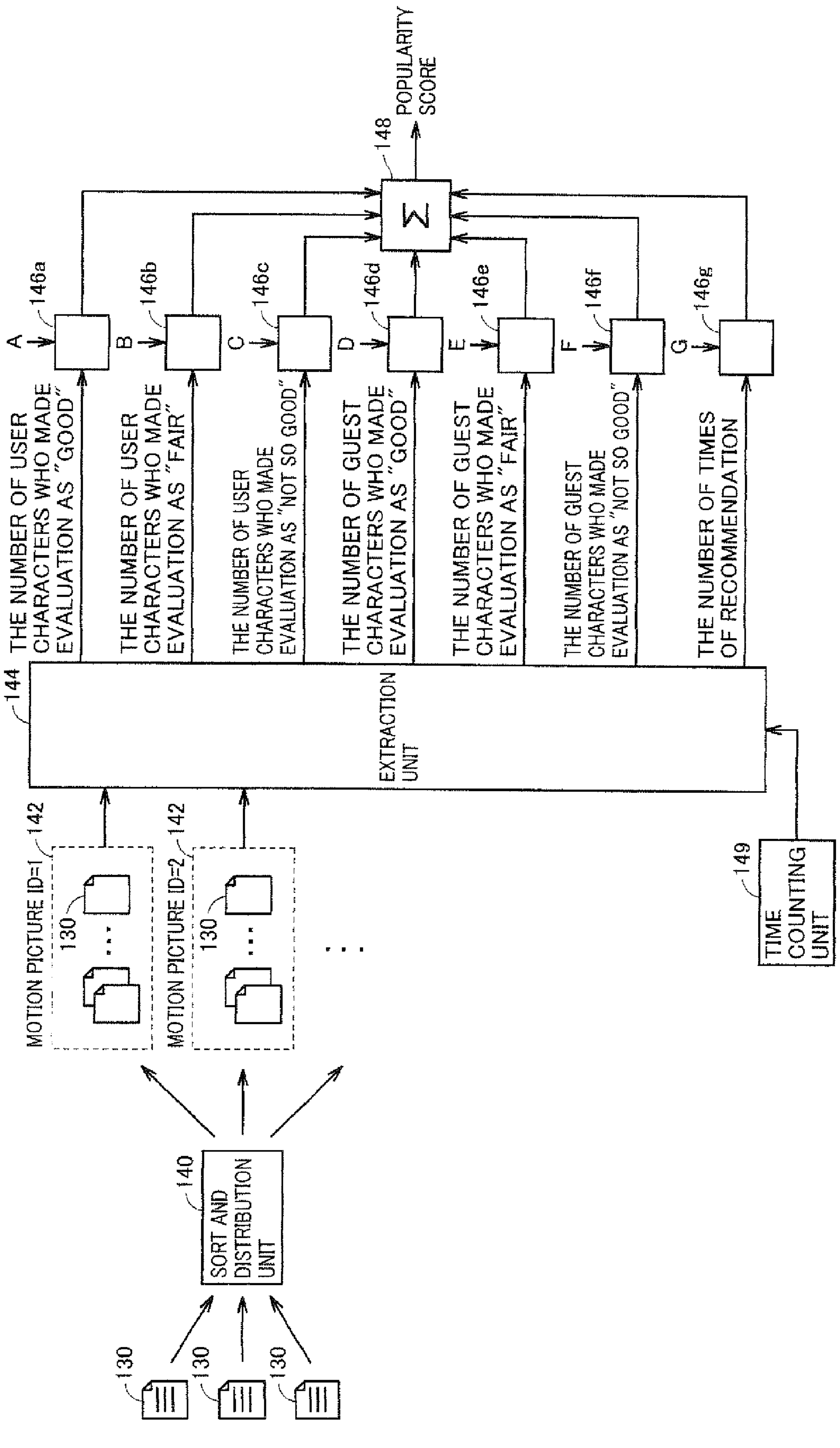
FIG. 31 is a block diagram showing an exemplary summarizing process in the distribution server according to the embodiment of the present invention.

Referring next to FIG. 31, exemplary summarizing processing in distribution server 104 to which the evaluation data is transmitted from game device 12 will be described.

Distribution server 104 according to the present embodiment calculates a popularity score indicating how popular the content (motion picture) is, based on the evaluation data for the most recent X days, by way of example of the summarizing processing thereof, and calculates popularity ranking in a group of contents provided by distribution server 104. The popularity score and the popularity ranking thus calculated are in principle informed of the sponsor providing the content. In addition, a manner of display of the provided contents may be varied, depending on the calculated popularity score and popularity ranking.

The popularity score is calculated, for example, based on a value obtained by multiplying a score of evaluation (any of "good", "fair" and "not so good) by a coefficient corresponding to the number of persons who made the vote and the number of times of transmission of a message recommending the content to a family member, a friend or the like (the number of times of recommendation).

FIG. 31 is a block diagram showing a schematic configuration for providing the summarizing processing in distribution server 104. Distribution server 104 shown in FIG. 31 includes, as its control structure, a sort and distribution unit 140, an evaluation data storage unit 142, an extraction unit 144, coefficient multiplication units 146*a* to 146*g*, a sum unit 14S, and a time counting unit 149.

Sort and distribution unit 140 sorts and distributes evaluation data 130 transmitted from game device 12 based on the motion picture ID. Namely, a plurality of evaluation data storage units 142 are prepared in correspondence with the motion picture IDs assigned to the provided contents. Then, sort and distribution unit 140 that has received evaluation data 130 from game device 12 refers to the motion picture ID included in the received evaluation data and causes corresponding evaluation data storage unit 142 to store evaluation data 130.

Extraction unit 144 refers to evaluation data 130 included in each evaluation data storage unit 142 and outputs the number of pieces of evaluation data that satisfies each condition as statistic information. Namely, extraction unit 144 outputs the statistic information separately for each motion picture ID. More specifically, extraction unit 144 outputs the number of user characters that made evaluation as "good" in the evaluation data stored in certain evaluation data storage unit 142 to coefficient multiplication unit 146*a*. Namely, extraction unit 144 refers to the value of (D15-5) evaluation in (D15) evaluation result included in the evaluation data shown in FIG. 30A and adds up the number of user characters that made evaluation as "good". Similarly, extraction unit 144 outputs the number of user characters that made evaluation as "fair" in the evaluation data stored in certain evaluation data storage unit 142 to coefficient multiplication unit 146*b* and outputs the number of user characters made evaluation as "not so good" therein to coefficient multiplication unit 146*c*.

In addition, extraction unit 144 outputs the number of guest characters that made evaluation as "good" in the evaluation data stored in certain evaluation data storage unit 142 to coefficient multiplication unit 146*d*. Similarly, extraction unit 144 outputs the number of guest characters that made evaluation as "fair" in the evaluation data stored in certain evaluation data storage unit 142 to coefficient multiplication unit 146*e* and outputs the number of user characters that made evaluation as "not so good" in the evaluation data to coefficient multiplication unit 146*f*.

Further, extraction unit 144 adds up the "number of times of recommendation" of each piece of evaluation data stored in certain evaluation data storage unit 142 to output the result to coefficient multiplication unit 146*g*.

Coefficient multiplication units 146*a* to 146*g* output values obtained by multiplying values received from extraction unit 144 by respective corresponding coefficients A to G to sum unit 148.

Sum unit 148 calculates the sum of values received from coefficient multiplication units 146*a* to 146*g* and outputs the result of sum as the popularity score. Namely, the popularity score output from sum unit 148 is shown as a value expressed in the following equation.

Popularity score=(the number of user characters who made evaluation as "good"×coefficient $A$)+(the number of user characters who made evaluation as "fair"×coefficient $B$)+(the number of user characters who made evaluation as "not so good"×coefficient $C$)+(the number of guest characters who made evaluation as "good"×coefficient $D$)+(the number of guest characters who made evaluation as "fair"×coefficient $E$)+(the number of guest characters who made evaluation as "not so good"×coefficient $F$)+(the number of times of recommendation(the total number)×coefficient $G$)

(1. First Variation of Summarizing Processing)

In the summarizing processing described above, a configuration in which the popularity score for each content is calculated based on the number of user characters or the like that made evaluation has been illustrated, however, an average of evaluations voted by user characters may be calculated.

Regarding more specific processing, for example, in a case where evaluation in three levels of "good", "fair" and "not so good" is adopted, "5" points, "3" points and "1" point are allocated to respective evaluation levels. Then, the total points are calculated by multiplying the number of user characters that input evaluation by the corresponding points and then the total points are divided by the total number of user characters that input evaluation Thus, an average point of each content for all user characters can be calculated. Namely, the average point of a certain content for all user characters can be calculated in the following equation.

Average point={(the number of user characters who made evaluation as "good"×5 points)+(the number of user characters who made evaluation as "fair"×3 points)+(the number of user characters who made evaluation as "not so good"×1 point)}/(the number of user characters who made evaluation as "good"+the number of user characters who made evaluation as "fair"+the number of user characters who made evaluation as "not so good")

(2. Second Variation of Summarizing Processing)

In the summarizing processing described above, a configuration in which the popularity score for each content for most recent period of X days is calculated based on the number of user characters or the like that made evaluation has been illustrated, however, the popularity score during each period may further be averaged. Namely, in addition to calculation of the popularity score of each content every X days, an average of the popularity score for a longer period of time (for example, for one month, for one year or the like) may be calculated.

Alternatively, the first variation and the second variation described above may be combined with each other.

It is noted that the processing described above is merely by way of example of the summarizing processing, and various types of statistic processing can naturally be performed by using a value of each item included in the evaluation data transmitted from game device 12.

<Directory Structure of Distribution Server>

Figure 32:
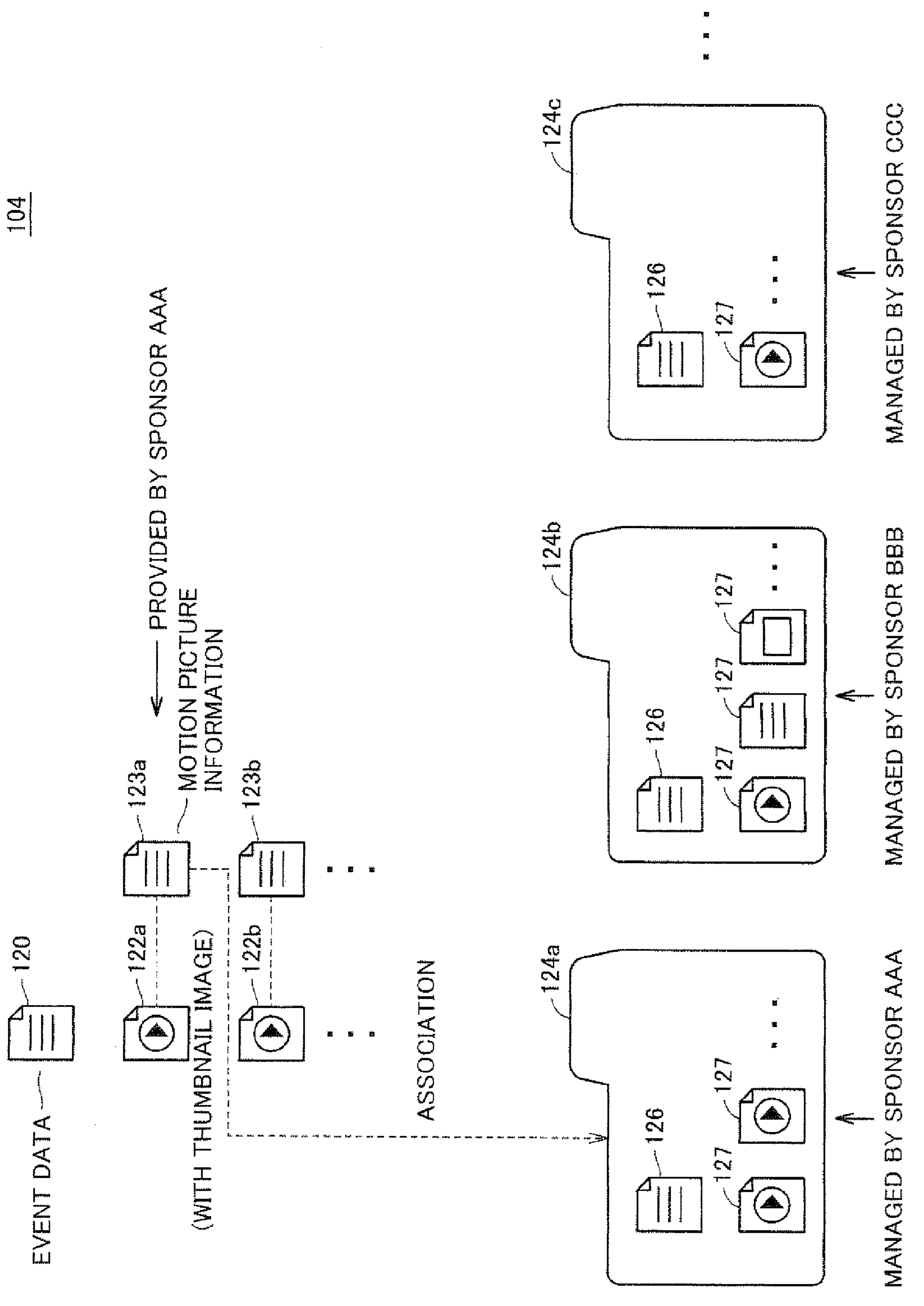
FIG. 32 is a schematic diagram of a directory structure in the distribution server according to the embodiment of the present invention.

Referring next to FIG. 32, a directory structure in which contents and the like are arranged in distribution server 104 will be described.

Referring to FIG. 32, a storage area of distribution server 104 according to the present embodiment stores not only event data 120 downloaded at the time of start-up of game device 12 but also content main bodies 122*a*, 122*b*, . . . . In addition, motion picture information 123*a*, 123*b*, . . . describing a substance of each content is stored in correspondence with each of content main bodies 122*a*, 122*b*, . . . . It is noted that a thumbnail image for displaying an icon for selecting a content main body in game device 12 may be prepared for each of content main bodies 122*a*, 122*b*, . . . . Alternatively, instead of a thumbnail image for displaying an icon for selection, a list including only characters may be prepared, or an icon image provided in advance for selecting each content may be prepared.

As described above, some or all of contents distributed by distribution system 100 according to the present embodiment are brought in correspondence with (basically a single) sponsor. Namely, some or all of the distributed contents are provided by any sponsor. Which sponsor is brought in correspondence with each content is described by storing the sponsor ID in content motion picture information 123*a*, 123*b*, . . . .

In distribution system 100 according to the present embodiment, contents produced or provided independently by (typically) a plurality of sponsors are distributed to the users of game device 12 and the user who watched the content brought in correspondence with such a sponsor is led to a page managed by the sponsor brought in correspondence with that content. Namely, in the storage area of distribution server 104, an area (typically, a directory) 124*a*, 124*b*, 124*c*, . . . , managed independently by each sponsor is provided In these areas 124*a*, 124*b*, 124*c*, . . . , in principle, only the managing sponsor can add, modify or erase the content. Instead of management by the sponsor itself of these areas 124*a*, 124*b*, 124*c*, . . . , an operator entrusted by each sponsor may be responsible for management on behalf of the sponsor.

The processing for providing watching or the like of the contents present in areas 124*a*, 124*b*, 124*c*, . . . independently managed by such respective sponsors is the sponsor selection screen subroutine described above (step S162 in FIG. 23, step S226 in FIG. 29, and the like). As will be described later, access to areas 124*a*, 124*b*, 124*c*, . . . independently managed by the sponsor can be made based on user's arbitrary selection, in addition to an occasion after the user watched the content brought in correspondence with the sponsor.

Each of areas 124*a*, 124*b*, 124*c*, . . . stores one content or a plurality of contents 127 (hereinafter also referred to as a sponsor content 127) prepared by each sponsor and stores content description information 126 describing what kind of sponsor content is stored. This content description information 126 stores a kind of metadata including a title or a substance of each content. Typically, content description information 126 is described in a markup language such as 5. Therefore, when a new content is added to areas 124*a*, 124*b*, 124*c*, . . . , each sponsor should add the substance of the added content to content description information 126.

In terms of a business method in distribution system 100 according to the present embodiment from a point of view of the sponsor, many users who watched the content can be led to the page managed by the sponsor itself as a result of supply of a content attracting user's interest. In addition, in this page managed by the sponsor, not only the motion picture but also an original questionnaire prepared by the sponsor, a discount coupon, acceptance of an order of a sample, a mail order service of a commercial product (hereinafter also collectively referred to as home delivery service), and the like can also be provided. In addition, from a point of view of the user, the user can arbitrarily select a content in which he/she is interested from among a wide variety of contents provided by a plurality of sponsors and can watch the content. Moreover, as provided contents are added or updated in a short cycle, the user is also motivated to access distribution server 104 for new information.

<Sponsor Selection Screen>

Overview of the sponsor selection screen subroutine shown in step S162 in FIG. 23 and step S226 in FIG. 29 will now be described. It is noted that the sponsor selection screen subroutine can be executed based on user's arbitrary selection, without watching the content.

Figure 33A:
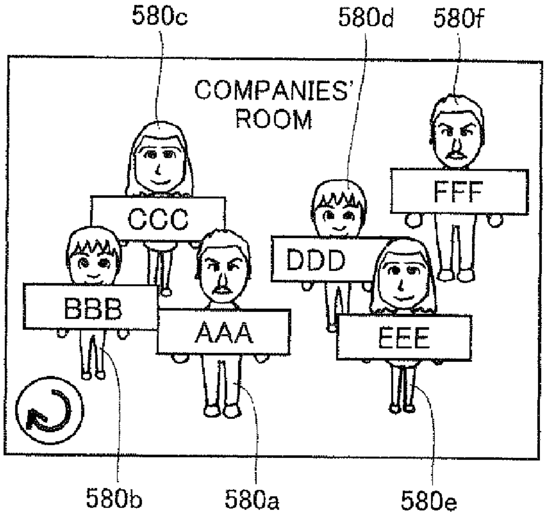
FIGS. 33A to 33D are diagrams showing an exemplary screen displayed when a sponsor selection screen subroutine is executed in the game device according to the embodiment of the present invention.

Initially, when the user selects and executes the sponsor selection screen subroutine without watching the content, CPU 40 of game device 12 causes a sponsor list screen as shown in FIG. 33A displayed. The sponsor displayed on the sponsor list screen shown in FIG. 33A correspond to each of areas 124*a*, 124*b*, 124*c*, . . . independently managed by each sponsor shown in FIG. 32. In the sponsor list screen shown in FIG. 33A, sponsor characters 580*a* to 580*f* representing respective sponsors are displayed. Each of sponsor characters 580*a* to 580*f* is typically expressed as carrying a logo or the like of the sponsor.

When any sponsor character is selected in the sponsor list screen shown in FIG. 33A, CPU 40 of game device 12 has a page corresponding to the selected sponsor displayed.

Figure 33C:
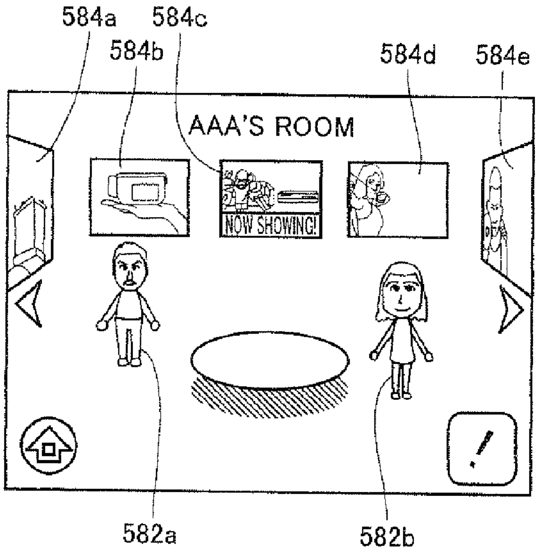
Figure 33B:
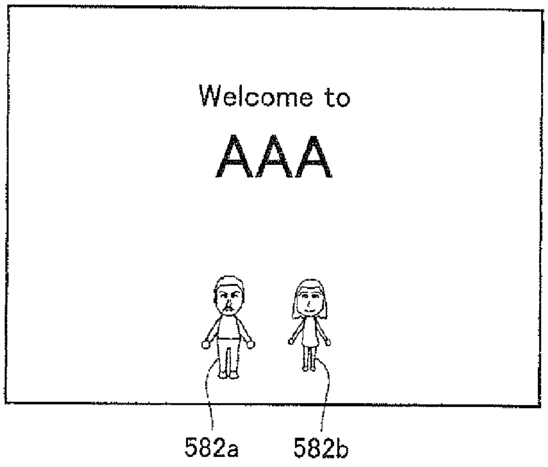

For example, when sponsor character 580*a* of sponsor "AAA" is selected in the sponsor list screen shown in FIG. 33A, CPU 40 of game device 12 has an individual logo screen shown in FIG. 33B displayed and then has the sponsor content list screen as shown in FIG. 33C displayed.

When the sponsor selection screen subroutine is executed in step S162 in FIG. 23 and step S226 in FIG. 29, the individual logo screen as shown in FIG. 33B in connection with the sponsor brought in correspondence with the watched content is directly displayed.

In the sponsor content list screen shown in FIG. 33C, initially, sponsor character 582*a* and/or 582*b* offers greeting for a visit to the page of the sponsor, in a balloon object (not shown) or through voice and sound. Here, a sponsor company can also be introduced. In addition, CPU 40 of game device 12 has thumbnail images 584*a* to 584*e* showing the substance of the sponsor content stored in an area independently managed by each sponsor displayed in a selectable manner, in the sponsor content list screen. Moreover, when the user operates controller 22 to point to any of thumbnail images 584*a* to 584*e* with a cursor or the like, sponsor character 582*a* and/or 582*b* explains the substance of the pointed sponsor content in a balloon object (not shown) or through voice and sound. Here, any user character registered in game device 12 may appear as one of sponsor characters 582*a* and 582*b*. Here, user character 510 registered in the game device itself and introduction character 520 are displayed on the same screen.

In addition, when the user operates controller 22 to select any of thumbnail images 584*a* to 584*e*, CPU 40 of game device 12 performs processing in accordance with the substance of the selected sponsor content. More specifically, if the selected sponsor content is the motion picture, CPU 40 of game device 12 starts reproduction of the selected sponsor content (motion picture).

Alternatively, when the selected sponsor content is the questionnaire, CPU 40 of game device 12 displays questions in the questionnaire and has a screen for accepting input of answers displayed. Then, when input of answers is completed, CPU 40 of game device 12 transmits the input answers to distribution server 104 or other server devices.

Figure 33D:
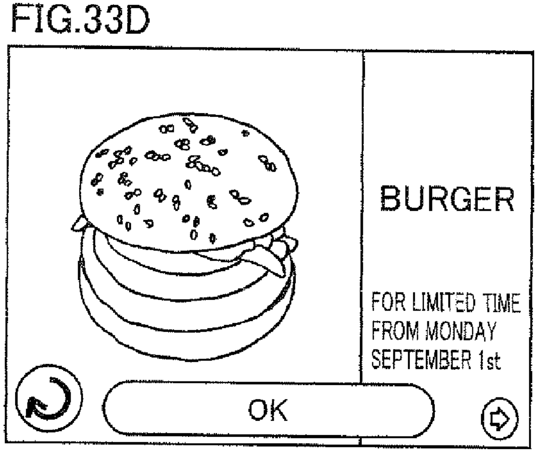

Alternatively, when the selected sponsor content is a discount coupon, CPU 40 of game device 12 has an image to be presented at a shop displayed. More specifically, for example in a case of a discount coupon for a hamburger or the like, a motion picture incorporating in a final frame an image of a hamburger and an image indicating an expiration date or the like as shown in FIG. 33D is downloaded from distribution server 104. In addition, as will be described later, CPU 40 of game device 12 transfers the downloaded discount coupon to the portable terminal. Thus, the discount coupon can be displayed on the portable terminal and the user can present the coupon at the shop to receive discount service.

Alternatively, when the selected sponsor content is acceptance of an order of a sample, a home delivery service of mail order of a commercial product or the like, CPU 40 of game device 12 has a screen for accepting input of a delivery address or name of the user displayed. Then, when input of the address or the like is completed, CPU 40 of game device 12 transmits the input information to distribution server 104 or other server devices.

<Procedure for Processing Sponsor Selection Screen>

Figure 34:
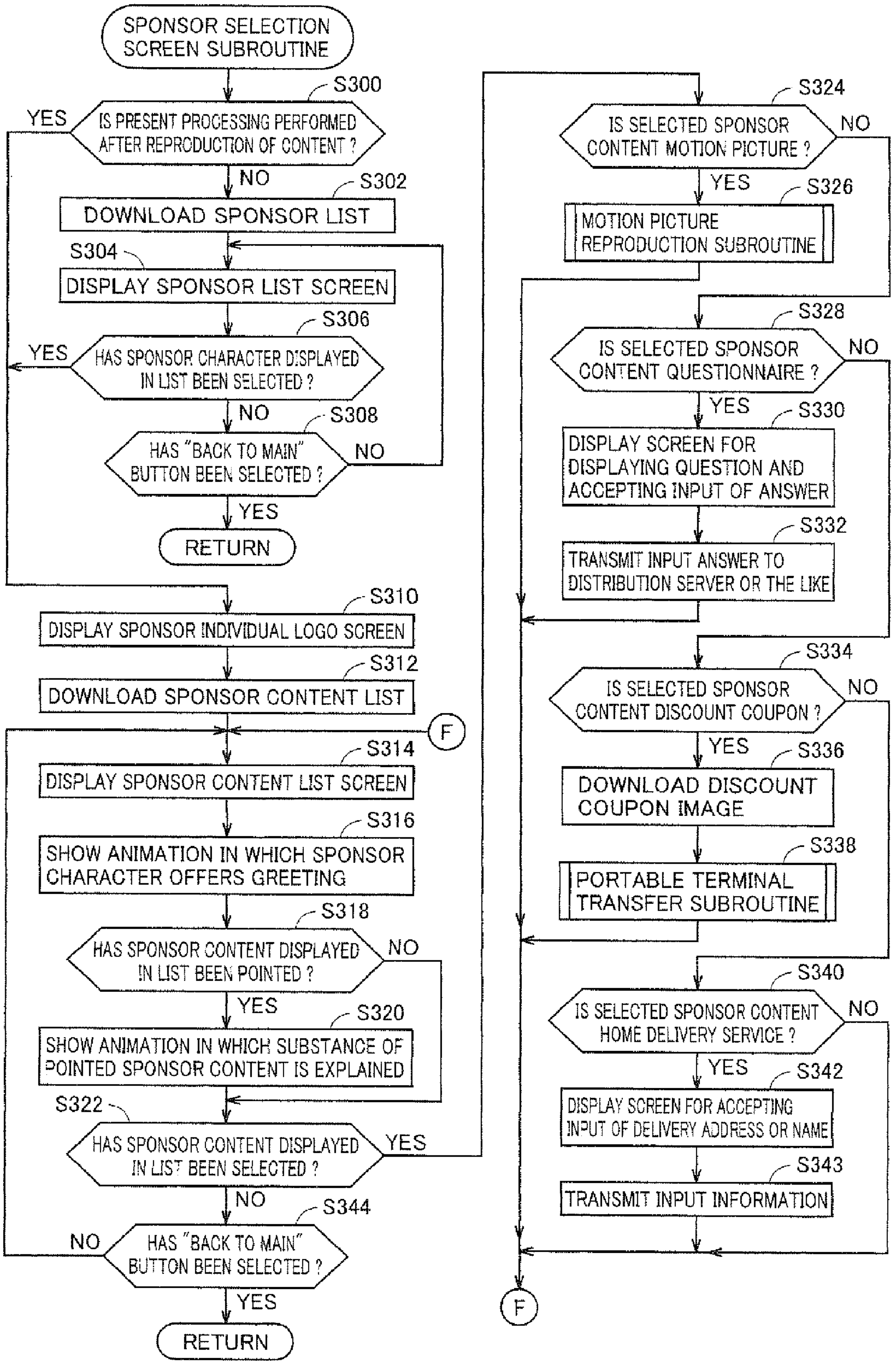
FIG. 34 is a flowchart showing a processing procedure in the sponsor selection screen subroutine in the game device according to the embodiment of the present invention.

Referring next to FIG. 34, the sponsor selection screen subroutine (the details in step S162 in FIG. 23 and step S226 in FIG. 29) providing the sponsor selection screen shown in FIG. 33A above will be described. Bach step shown in FIG. 34 is provided by execution of the content distribution application according to the present embodiment by CPU 40 of game device 12.

Referring to FIG. 34, initially, CPU 40 of game device 12 determines whether the present processing is performed after reproduction of the content or not (step S300). Namely, CPU 40 determines whether or not the present subroutine is executed after the user watched the content, based on the sponsor ID brought in correspondence with the content. When the present processing is not performed after reproduction of the content (NO in step S300), the process proceeds to step S302. It is, for example, a case where foliage plant object 518 on the main screen shown in FIG. 11 is selected. On the other hand, when the present processing is performed after reproduction of the content (YES in step S300), the process proceeds to step S310.

In step S302, CPU 40 downloads the sponsor list from distribution server 104. Namely, CPU 40 obtains the list indicating areas 124*a*, 124*b*, 124*c*, . . . independently managed by the sponsor and generated in distribution server 104. Here, CPU 40 also obtains information for expressing the sponsor character. In successive step S304, CPU 40 has the sponsor list screen as shown in FIG. 33A displayed, based on the obtained sponsor list. In further successive step S306, CPU 40 determines whether any of the sponsor characters displayed in a list has been selected or not. When any of the sponsor characters displayed in a list is selected (YES in step S306), the process proceeds to step S310. On the other hand, when none of the sponsor characters displayed in a list is selected (NO in step S306), the process proceeds to step S308.

In step S308, CPU 40 determines whether a “back to main” button has been selected or not. When the “back to main” button is selected (YES in step S308), the process returns to the main screen subroutine shown in FIGS. 22 and 23. In contrast, when the “back to main” button is not selected (NO in step S308), the processing in step S304 and subsequent steps is repeated.

In step S310, CPU 40 has the designated sponsor or the individual logo screen (see FIG. 33B) of the selected sponsor displayed. In successive step S312: CPU 40 downloads the sponsor content list from distribution server 104. Namely, CPU 40 obtains a list of sponsor contents stored in areas 124*a*, 124*b*, 124*c*, . . . independently managed by the sponsor of interest. Here, CPU 40 also obtains a thumbnail image of each sponsor content. In successive step S314, CPU 40 has the sponsor content list screen as shown in FIG. 33C displayed. In further successive step S316, CPU 40 shows animation in which the sponsor character offers greeting.

In successive step S318, whether any of the sponsor contents displayed in a list has been pointed with a cursor or the like or not is determined. When any of the sponsor contents displayed in a list is pointed (YES in step S318), the process proceeds to step S320. On the other hand, when none of the sponsor contents displayed in a list is pointed (NO in step S318), the process proceeds to step S322.

In step S320, CPU 40 shows animation in which the sponsor character explains the substance of the pointed sponsor content. Thereafter, the process proceeds to step S322.

In step S322, whether any of the sponsor contents displayed in a list has been selected or not (typically, whether A button 26*d* has been pressed or not) is determined. When any of the sponsor contents displayed in a list is selected (YES in step S322), the process proceeds to step S324. On the other hand, when none of the sponsor contents displayed in a list is pointed (NO in step S322), the process proceeds to step S344.

In step S324, CPU 40 determines whether the selected sponsor content is the motion picture or not. When the selected sponsor content is the motion picture (YES in step S324), the process proceeds to step S326. On the other hand, when the selected sponsor content is not the motion picture (NO in step S324), the process proceeds to step S328.

In step S326, CPU 40 executes the motion picture reproduction subroutine to reproduce the selected sponsor content. After this motion picture reproduction subroutine is executed, the process returns to step S314.

In step S328, CPU 40 determines whether the selected sponsor content is a questionnaire or not. When the selected sponsor content is the questionnaire (YES in step S328), the process proceeds to step S330. On the other hand, when the selected sponsor content is not the questionnaire (NO in step S328), the process proceeds to step S334.

In step S330, CPU 40 has a screen for accepting input of answers displayed, together with display of questions in the questionnaire, In successive step S332, CPU 40 transmits the input answers to distribution server 104 or other server devices. Thereafter, the process returns to step S314.

In step S334, CPU 40 determines whether the selected sponsor content is the discount coupon or not. When the selected sponsor content is the discount coupon (YES in step S334), the process proceeds to step S336. On the other hand, when the selected sponsor content is not the discount coupon (NO in step S334), the process proceeds to step S340.

In step S336, CPU 40 downloads the motion picture including the image of the designated discount coupon from distribution server 104. In successive step S338, CPU 40 executes the portable terminal transfer subroutine. After this portable terminal transfer subroutine is executed, the process returns to step S314.

In step S340, CPU 40 determines whether the selected sponsor content is the home delivery service or not. When the selected sponsor content is the home delivery service (YES in step S340), the process proceeds to step S342. On the other hand, when the selected sponsor content is not the home delivery service (NO in step S340), the process returns to step S314.

In step S342, CPU 40 has a screen for accepting input of a delivery address or name of the user displayed. In successive step S343, CPU 40 of game device 12 transmits the information such as the input address to distribution server 104 or other server devices. Thereafter, the process returns to step S314.

In step S344, CPU 40 determines whether the “back to main” button has been selected or not. When the “back to main" button is selected (YES in step S344), the process returns to the main screen subroutine shown in FIGS. 22 and 23. In contrast, when the "back to main" button is not selected (NO in step S344), the process returns to step S314.

<Message Transmission Function>

Overview of the message creation subroutine shown in step S232 in FIG. 29 will now be described. It is noted that the message creation subroutine can be executed based on user's arbitrary selection, without watching the content.

Figure 35A:
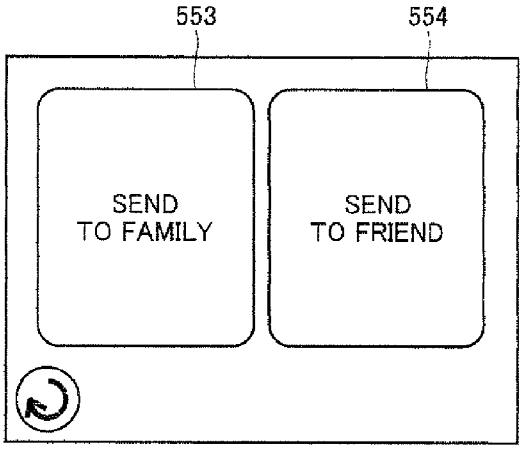
FIGS. 35A to 35F are diagrams showing an exemplary screen displayed when a message creation subroutine is executed in the game device according to the embodiment of the present invention.

Referring to FIGS. 35A to 35F, when the message creation subroutine is executed, CPU 40 of game device 12 initially has a message selection screen as shown in FIG. 35A displayed. In the message selection screen shown in FIG. 35A, a "send to family" button 553 for selecting message transmission to game device 12 itself and a "send to friend" button 554 for selecting message transmission to a user of another game device 12 are displayed in a selectable manner.

Figure 35D:
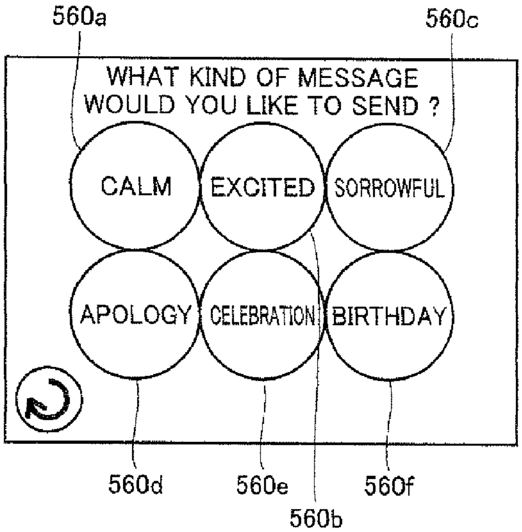
Figure 35B:
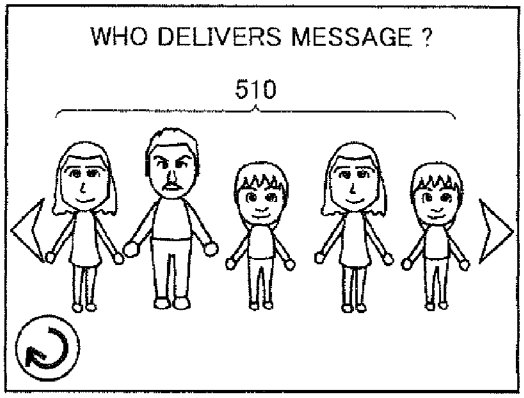

When the user operates controller 22 to select "send to family" button 553, CPU 40 of game device 12 has the user character selection screen as shown in FIG. 35B displayed. Namely, the user character selection screen shown in FIG. 35B is a screen for selecting user character 510 as the sender of the message, and user characters 510 registered in advance in game device 12 are displayed in a list in a selectable manner.

Figure 35E:
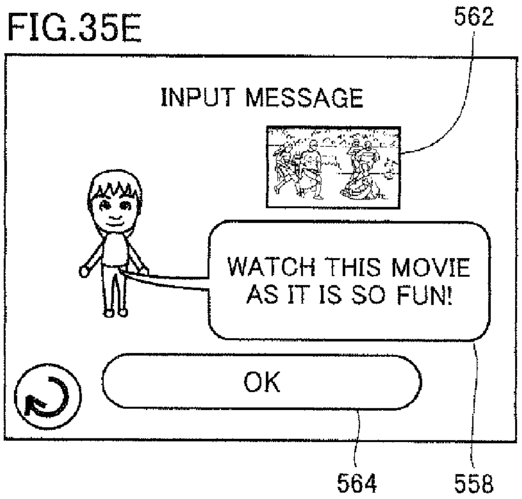
Figure 35C:
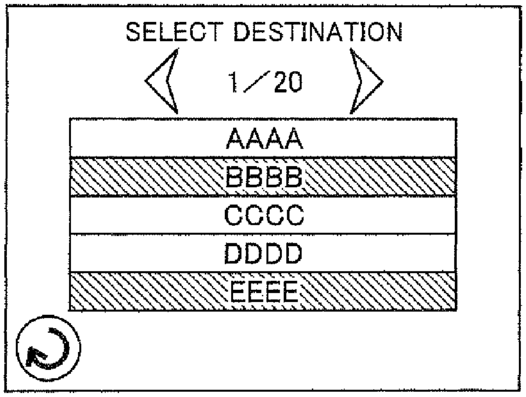

On the other hand, when the user operates controller 22 to select "send to friend" button 554, CPU 40 of game device 12 has a destination selection screen as shown in FIG. 35C displayed. This destination selection screen is a screen for selecting message destination game device 12, and friend list 44*d* including a game device number is registered as an address for specifying destination game device 12. When no data is registered in friend list 44*d*, a warning screen for urging the user to register friend list 44*d* may be displayed. Thereafter, when the user operates controller 22 to select any destination in the destination selection screen shown in FIG. 35C, CPU 40 of game device 12 has the user character selection screen as shown in FIG. 35B displayed.

When the user operates controller 22 to select any user character 510 in the user character selection screen shown in FIG. 35B, CPU 40 of game device 12 has a behavior pattern selection screen as shown in FIG. 35D displayed. Namely, the behavior pattern selection screen shown in FIG. 35D accepts selection of a behavior to be exhibited when selected user character 510 delivers the message. Specifically, in the behavior pattern selection screen shown in FIG. 35D, the total of six icons of a calm icon 560*a*, an excited icon 560*b*, a sorrowful icon 560*c*, an apology icon 560*d*, a celebration icon 560*e*, and a birthday icon 560*f* are displayed in a selectable manner. User character 510 delivers the message, with the expression or the action in accordance with the icon selected from among these icons.

Figure 35F:
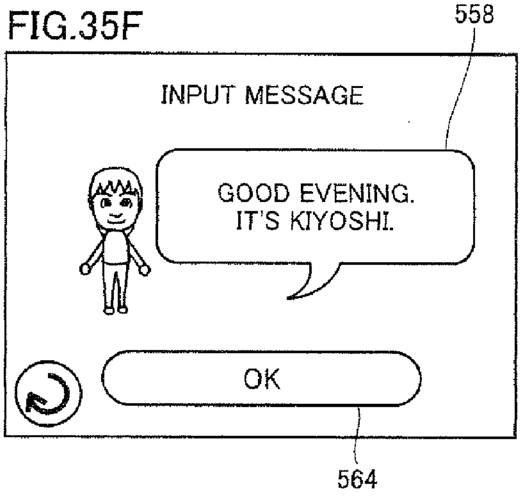

When any behavior pattern is selected in FIG. 35D, a message input screen as shown in FIG. 35E is displayed for creating a message for the user to recommend any content to a family member, a friend or the like, or otherwise, a message input screen as shown in FIG. 35F is displayed. Namely, CPU 40 of game device 12 determines whether or not the present message creation subroutine is executed after any content was watched. If it is the case, CPU 40 obtains the thumbnail image or the like of the content and has the thumbnail image or the like displayed together with a balloon object 558.

In the message input screen shown in FIG. 35E, balloon object 558 for accepting a message is displayed together with a thumbnail image 562 showing the content recommended by the user. For confirmation, the selected user character is also displayed. When the user selects balloon object 558, CPU 40 of game device 12 has, for example, a character input screen like a keyboard displayed. When the user successively selects an icon corresponding to a key of the keyboard displayed on the character input screen, a character is input in balloon object 558. When the user selects an "OK" button 564, CPU 40 of game device 12 transmits the input message to mail server 102 or the like. It is noted that "OK" button 564 may remain inactive so long as no character is input to balloon object 558.

On the other hand, in the message input screen shown in FIG. 35F, balloon object 558 for accepting a message is displayed, without display of thumbnail image 562. Input of a character in this balloon object 558 is also made, for example, through the character input screen like a keyboard. Then, when the user selects OK button 564, CPU 40 of game device 12 transmits the input message to mail server 102 or the like.

If a query about an installation status of an application in destination game device 12 is issued to mail server 102 or the like and it is found that the present content distribution application is not installed in destination game device 12, a message may be transmitted in a normal mail format or as converted into a format readable with the message board function described above.

Thus, CPU 40 generates the introduction character information brought in correspondence with the content reproduced in response to the user's operation and including information for displaying the selected user character object. Then, CPU 40 transmits the generated introduction character information to another game device 12 (information processing device).

In addition, CPU 40 of game device 12 indicated as the message destination obtains content information (motion picture information) of the reproduced content brought in correspondence with the introduction character information from distribution server 104, in response to reception of the introduction character information from another game device 12. Moreover, CPU 40 causes monitor 34 to display the introduction character information based on the introduction character information and outputs information for introducing the reproduced content in association with the introduction character object, based on the obtained content information (motion picture information).

<Procedure for Processing Message Transmission Function>

Figure 36:
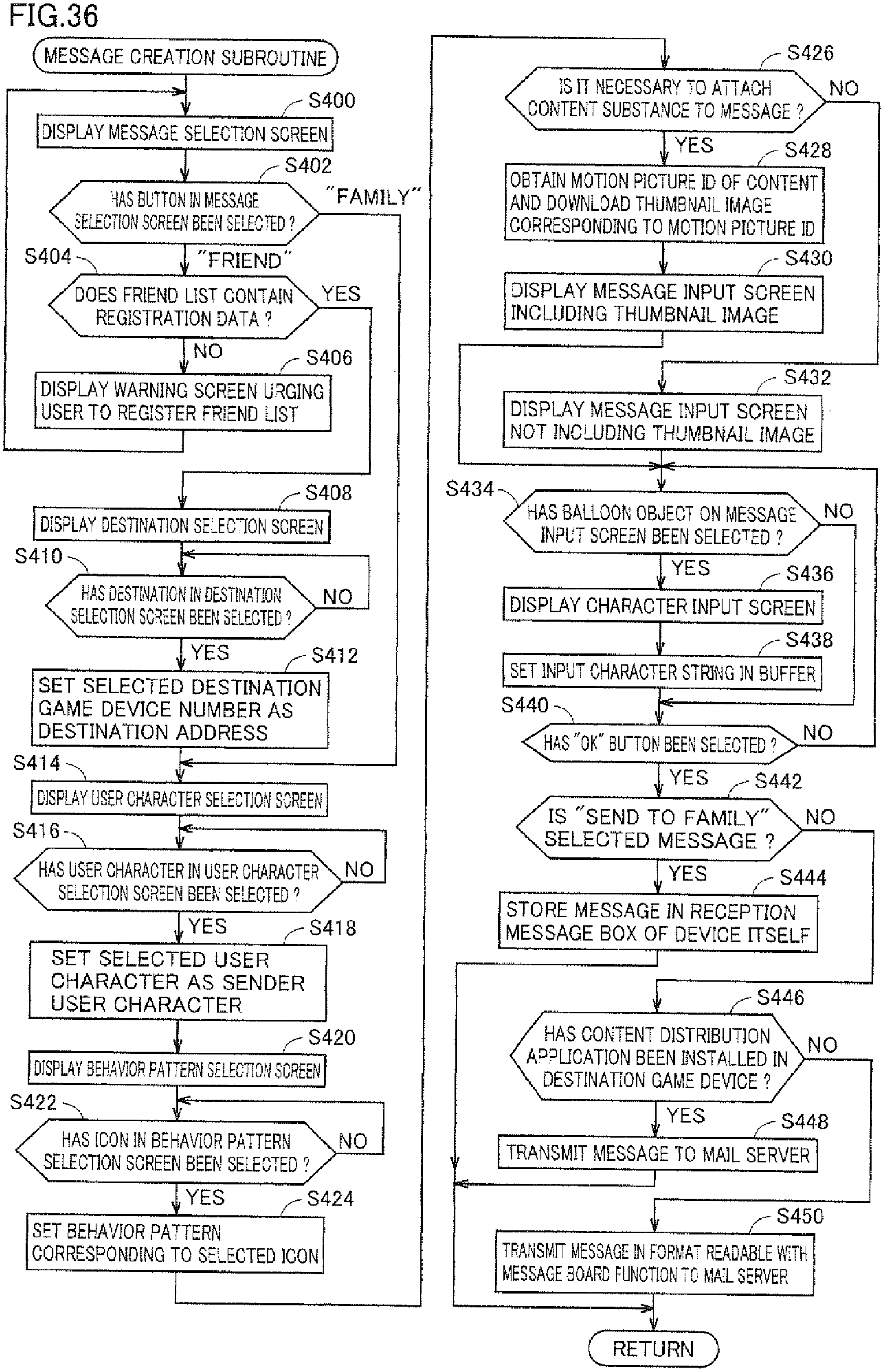
FIG. 36 is a flowchart showing a processing procedure in the message creation subroutine in the game device according to the embodiment of the present invention.

Referring next to FIG. 36, the message creation subroutine providing the screen for creating the message shown in FIGS. 35A to 35F above (details in step S232 in FIG. 29) will be described. Each step shown in FIG. 36 is provided by execution of the content distribution application according to the present embodiment by CPU 40 of game device 12.

Referring to FIG. 36, initially, CPU 40 of game device 12 has the message selection screen as shown in FIG. 35A displayed (step S400). In successive step S402, CPU 40 determines whether any button displayed on the message selection screen has been selected or not. When "send to family" button 553 on the message selection screen is selected ("FAMILY" in step S402), the process proceeds to step S414. On the other hand, when "send to friend" button 554 on the message selection screen is selected ("FRIEND" in step S402), the process proceeds to step S404.

In step S404, CPU 40 determines whether the registration data is present in friend list 44*d* or not. When there is no entry in friend list 44*d* (NO in step S404), the process proceeds to step S406. When there is entry in friend list 44*d* (YES in step S404), the process proceeds to step S408.

In step S406, CPU 40 has a warning screen for urging the user to register friend list 44*d* displayed. Then, the process returns to step S400.

In step S408, CPU 40 has a destination selection screen as shown in FIG. 35C displayed, based on the registration data in friend list 44*d*. In successive step S410, CPU 40 determines whether a destination displayed on the destination selection screen has been selected or not. When the destination displayed on the destination selection screen is not selected (NO in step S430), the processing in step S410 is repeated. On the other hand, when the destination displayed on the destination selection screen is selected (YES in step S410), CPU 40 sets the selected destination game device number as the destination address (step S412). Thereafter, the process proceeds to step S414.

In step S414, CPU 40 has the user character selection screen shown in FIG. 35B displayed. In successive step S436, CPU 40 determines whether the user character displayed on the user character selection screen has been selected or not. When the user character displayed on the user character selection screen is not selected (NO in step S416), the processing in step S416 is repeated. On the other hand, when the user character displayed on the user character selection screen is selected (YES in step S416), CPU 40 sets the selected user character as the sender user character (step S418). Thereafter, the process proceeds to step S420.

In step S420, CPU 40 has the behavior pattern selection screen shown in FIG. 35D displayed. In successive step S422, CPU 40 determines whether any icon displayed on the behavior pattern selection screen has been selected or not. When no icon displayed on the behavior pattern selection screen is selected (NO in step S422), the processing in step S422 is repeated. On the other hand) when any icon displayed on the behavior pattern selection screen is selected (YES in step S422), CPU 40 sets the behavior pattern corresponding to the selected icon (step S424). Thereafter, the process proceeds to step S426.

In step S426, CPU 40 determines whether it is necessary to attach the substance of the content to the message or not. More specifically, CPU 40 determines whether the present message creation subroutine was executed after any content was watched. When it is necessary to attach the substance of the content to the message (YES in step S426), the process proceeds to step S428. On the other hand, when it Is not necessary to attach the substance of the content to the message (NO in step S426), the process proceeds to step S432.

In step S428, CPU 40 obtains the motion picture ID of the content that was previously watched and downloads a thumbnail image of the content corresponding to the obtained motion picture JD from distribution server 104. In successive step S430, CPU 40 has the message input screen including the downloaded thumbnail image displayed (see FIG. 35E). Thereafter, the process proceeds to step S434.

On the other hand, in step S432, CPU 40 has the message input screen not including the thumbnail image of the content displayed (see FIG. 35F). Thereafter, the process proceeds to step S434.

In step S434, CPU 40 determines whether a balloon object on the message input screen has been selected or not. When the balloon object is selected (YES in step S434), the process proceeds to step S436. On the other hand, when the balloon object is not selected (NO in step S434), the process proceeds to step S440.

In step S436, CPU 40 has the character input screen displayed and accepts character input by the user. In successive step S438, CPU 40 sets the input character string in the buffer. Then, the process proceeds to step S440.

In step S440, CPU 40 determines whether "OK" button 564 has been selected or not. When "OK" button 564 is selected (YES in step S440), the process proceeds to step S442. On the other hand, when "OK" button 564 is not selected (NO in step S440), the processing in step S434 and subsequent steps is repeated.

In step S442, CPU 40 determines whether "send to family" is the selected message or not. When "send to family" is the selected message (YES in step S442), the process proceeds to step S444. On the other hand, when "send to family" is not the selected message (NO in step S442), the process proceeds to step S446. Namely, this case corresponds to selection of "send to friend."

In step S444, CPU 40 causes reception message box 44*b* of game device 12 itself to store information representing the sender user character, the behavior pattern, the input message, the thumbnail image and the motion picture ID of the content (as necessary), the type code, and the message including the designated date. Thereafter, the process returns to the parent process.

In contrast, in step S446, CPU 40 issues a query to mail server 102 to determine whether the present content distribution application has been installed in destination game device 12 or not. When the present content distribution application is installed in destination game device 12 (YES in step S446), the process proceeds to step S448. On the other hand, when the present content distribution application is not installed in destination game device 12 (NO in step S446), the process proceeds to step S450.

In step S448, CPU 40 transmits the information representing the sender user character, the behavior pattern, the input message, the thumbnail image and the motion picture ID of the content (as necessary), the type code, and the message including the designated date to mail server 102, after designating the destination address (game device number). Thereafter, the process returns to the parent process.

In contrast, in step S450, CPU 40 generates a message in a format accessible by the message board function, including the input message, the thumbnail image and the motion picture ID of the content (as necessary), the type code, and the designated date. In addition, CPU 40 transmits the generated message to mail server 102, after designating the destination address (game device number). Thereafter, the process returns to the parent process.

<Configuration of Portable Terminal>

Figure 37:
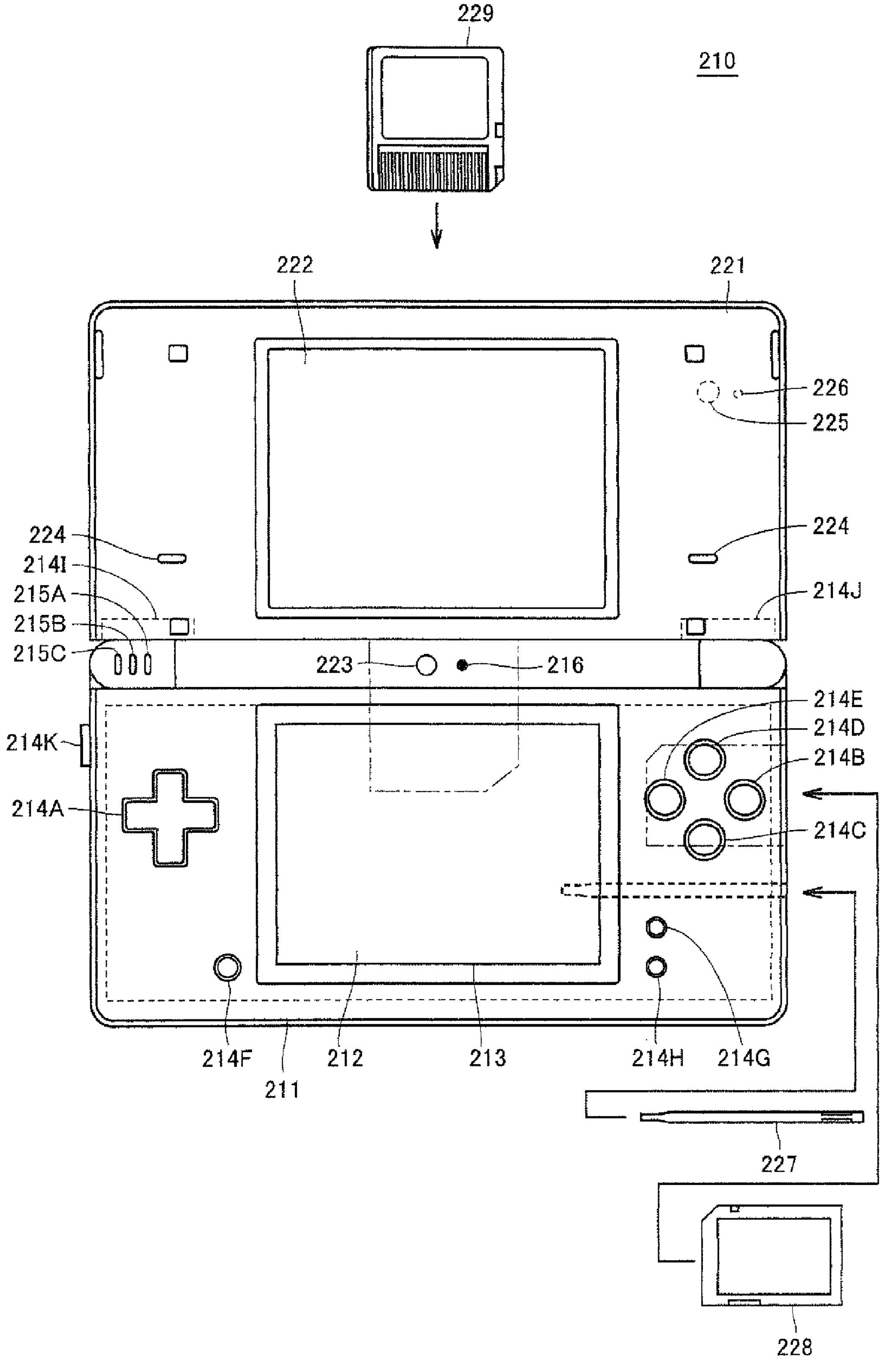
FIG. 37 shows appearance of a portable game device according to the embodiment of the present invention.
Figure 38:
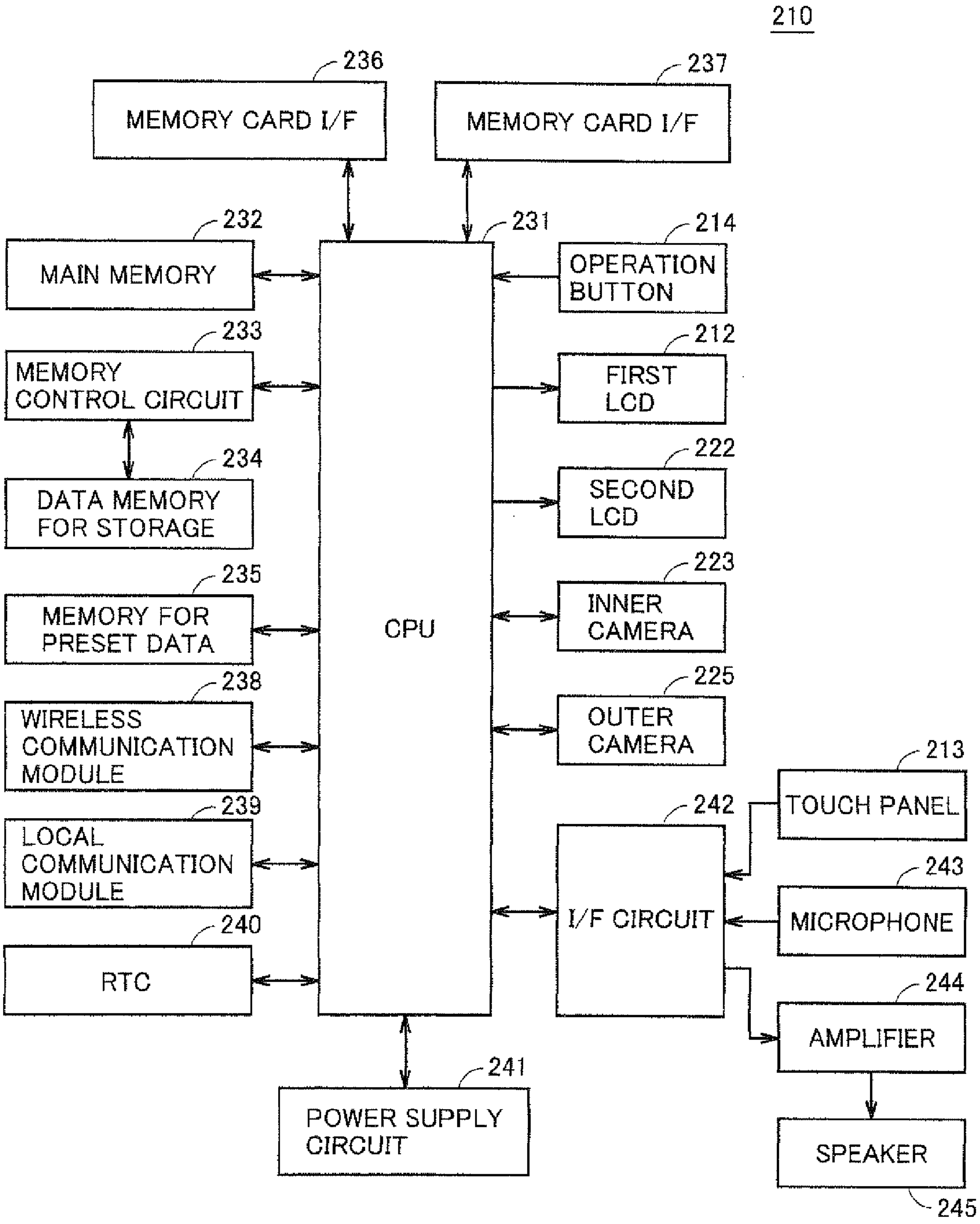
FIG. 38 is a block diagram showing an electric configuration of the portable game device according to the embodiment of the present invention.

Referring next to FIGS. 37 and 38, a portable game device 210 will be described by way of a typical example of a portable terminal according to the present embodiment. It is noted that distribution system 100 according to the present embodiment is also applicable to a general-purpose portable terminal such as a portable telephone or a PDA (Personal Digital Assistant).

Referring to FIG. 37, portable game device 210 according to the present embodiment is a foldable portable game device. FIG. 37 shows portable game device 210 in an unfolded state (opened state). Portable game device 210 is configured to have such a size that the user can hold portable game device 210 with both hands or one hand even in the unfolded state.

Portable game device 210 has a first housing 211 and a second housing 221. First housing 211 and second housing 221 are coupled to allow opening and closing (be foldable). In the example shown in FIG. 37, first housing 211 and second housing 221 are each formed in a shape of a horizontally long, rectangular plate, and they are coupled to each other to be pivotable around a long side portion thereof by means of a hinge.

A first LCD (Liquid Crystal Display) 212 is provided as a display portion (display means) in first housing 211. First LCD 212 is in a rectangular shape and it is arranged such that a direction in which its long side extends coincides with a direction in which a long side of first housing 211 extends. In the present embodiment, though an LCD is adopted as the display portion (display means), other appropriate display device such as a display device utilizing EL (Electro Luminescence) may be adopted. In addition, resolution of the display portion (display means) may be designed as appropriate in accordance with an application to be executed.

Buttons 214A to 214K are provided as the input portion (input means) in first housing 211 for performing various operations on portable game device 210. Among buttons 214A to 214K, a direction input button 214A, an operation button 214B, an operation button 214C, an operation button 214D, an operation button 214E, a power button 214F, a start button 214G, and a select button 214H are provided on an inner main surface of first housing 211, which is located on the inner side when first housing 211 and second housing 221 are folded.

An L button 214I is provided at a left end portion of an upper side surface of first housing 211 in the drawing and an R button 214J is provided at a right end portion of the upper side surface of first housing 211 in the drawing. In addition, a volume button 214K is provided on a left side surface of first housing 211.

Direction input button 214A, L button 214I, and R button 214J are used, for example, for a selection operation. Buttons 214B to 214E are used, for example, for an enter operation or a cancel operation. Power button 214F is used for turning on/off the power of portable game device 210. Volume button 214K is used for adjusting a volume of a speaker included in portable game device 210.

Portable game device 210 further includes a touch panel 213 as the input portion (input means) different from buttons 214A to 214K. Touch panel 213 is attached to cover a screen of first LCD 212 and detects a coordinate when the user performs an input operation. Namely, touch panel 213 is arranged in correspondence with a display surface of first LCD 212.

For example, a resistive touch panel may be adopted as touch panel 213, however, touch panel 213 is not limited to the resistive type and various pressing-type touch panels may be adopted. In addition, resolution (detection accuracy) of touch panel 213 is preferably as high as resolution (display accuracy) of first LCD 212. The resolution of touch panel 213, however, does not necessarily have to be equal to the resolution of first LCD 212.

An insertion opening (shown with a dashed line in FIG. 37) for a touch pen 227 is provided in a right side surface of first housing 211 in the drawing. Touch pen 227 used for performing an input operation on touch panel 213 can be accommodated in the insertion opening. Normally, an input operation to touch panel 213 is performed by using touch pen 227, however, input operation of touch panel 213 can also be performed with a finger of the user, instead of touch pen 227.

Moreover, an insertion opening (shown with a chain-double-dotted line in FIG. 37) for accommodating a memory card 228 is provided in the right side surface of first housing 211 in the drawing. A connector (not shown) for electrically connecting portable game device 210 and memory card 228 with each other is provided in the inside of this insertion opening. Memory card 228 is removably attached to the connector. Memory card 228 is used, for example, for reading a game program or image data obtained from another information processing device or a game device, for storing (saving) image data picked up and/or processed by portable game device 210, or the like. Memory card 228 is implemented by a non-volatile storage medium such as an SD (Secure Digital) card.

An insertion opening (shown with a chain-dotted line in FIG. 37) for accommodating a memory card 229 is provided in the upper side surface of first housing 211 in the drawing. A connector (not shown) for electrically connecting portable game device 210 and memory card 229 with each other is provided in the inside of this insertion opening. Memory card 229 is removably attached to the connector. Memory card 229 stores a game program or the like.

Three LEDs 215A to 215C are disposed in a portion on the left of the coupling portion of first housing 211 and second housing 221 in the drawing. A first LED 215A Illuminates when the power of portable game device 210 is turned on. A second LED 215B illuminates in accordance with a state of a battery of portable game device 210 (indicating during charging or a state of charge being low). As will be described later, portable game device 210 can establish wireless communication with other equipment, and a third LED 215C illuminates depending on a status of wireless communication. Therefore, three LEDs 215A to 215C can notify the user of a state of power on/off, a state of charge, and a status of wireless communication of portable game device 210.

A second LCD 222 is provided in second housing 221 as a display portion (display means). Second LCD 222 has a rectangular shape and it is arranged such that a direction in which its long side extends coincides with a direction in which a long side of second housing 221 extends. As in first LCD 212, another appropriate display device may be adopted instead of the LCD. Though portable game device 210 adopts such a configuration that the touch panel serving as the input means (input portion) is attached to cover the screen of first LCD 212, yet another touch panel may be attached to the screen of second LCD 222.

In addition, two cameras (an inner camera 223 and an outer camera 225) serving as image pick-up means (an image pick-up device) are provided in second housing 221. As shown in FIG. 37, inner camera 223 is disposed in an inner main surface of second housing 221 around the coupling portion. On the other hand, outer camera 225 is disposed in a surface opposite to the inner main surface where inner camera 223 is disposed, that is, in an outer main surface of second housing 221 (corresponding to a surface on the outside when portable game device 210 is in the closed state). In FIG. 37, outer camera 225 is shown with a dashed line.

A microphone (a microphone 243 shown in FIG. 38) is accommodated as an audio input device in the coupling portion of portable game device 210. In the inner main surface around the coupling portion of portable game device 210, a microphone hole 216 is provided such that microphone 243 can sense sound around portable game device 210.

A fourth LED 226 is provided on the outer main surface of second housing 221 at a position proximate to outer camera 225. Fourth LED 226 illuminates depending on a state of image pick-up by outer camera 225.

A sound emission hole 224 is provided in the inner main surface of second housing 221, on each of left and right sides of second LCD 222 provided around the center of the inner main surface. A speaker (a speaker 245 shown in FIG. 38) is accommodated as an audio output device, in second housing 221 communicating to sound emission hole 224.

Referring to FIG. 38, portable game device 210 includes such electronic parts as a CPU 231, a main memory 232, a memory control circuit 233, a data memory 234 for storage, a memory 235 for preset data, memory card interfaces (memory card I/F) 236 and 237, a wireless communication module 238, a local communication module 239, a real time clock (RTC) 240, a power supply circuit 241, and an interface circuit (I/F circuit) 242. These electronic parts are mounted on an electronic circuit board and accommodated in first housing 211 (or in second housing 221).

CPU 231 is an operation processing unit for executing various programs. CPU 231 develops and executes on main memory 232, a game program stored in any of a memory within portable game device 210 (typically, data memory 234 for storage), memory card 228 and memory card 229. As a result of execution of a program by CPU 231, various types of processing according to the present embodiment which will be described later are provided. As will be described later, the game program according to the present embodiment is typically supplied from the distribution server or the like connected to the network through a wire or wireless communication line to portable game device 210. The game program supplied to portable game device 210 is stored in data memory 234 for storage.

In addition, CPU 231 has a not-shown VRAM (Video Random Access Memory) for exclusively controlling display on first LCD 212 and second LCD 222. The VRAM temporarily stores image data or the like for displaying various images which will be described later. It is noted that data stored in main memory 232 is transferred to the VRAM, or a file (data) or the like stored in data memory 234 for storage is directly read and the substance thereof is written in the VRAM.

Main memory 232, memory control circuit 233 and memory 235 for preset data are connected to CPU 231. In addition, data memory 234 for storage is connected to memory control circuit 233.

Main memory 232 is storage means used as a work area or a buffer area of CPU 231. Namely, main memory 232 temporarily stores data used for various types of processing or develops and temporarily stores a game program read from data memory 234 for storage, memory card 228, memory card 229, or the like. In the present embodiment, for example, a PSRAM (Pseudo-SRAM) is employed as main a memory 232.

Data memory 234 for storage is storage means for storing a game program executed by CPU 231, data of images picked up by inner camera 223 and outer camera 225, and the like. Data memory 234 for storage is implemented, for example, by a non-volatile storage medium such as a NAND-type flash memory. Memory control circuit 233 is a circuit for controlling reading and writing of data from/to data memory 234 for storage in accordance with an instruction from CPU 231.

Memory 235 for preset data is storage means for storing data such as various parameters set in advance in portable game device 210 (preset data). A flash memory connected to CPU 231 through an SPI (Serial Peripheral Interface) bus may be adopted as memory 235 for preset data.

Memory card I/Fs 236 and 237 are each connected to CPU 231. Memory card JIF 236 performs reading and writing of data from/to memory card 228 attached to the connector in response to an instruction from CPU 231. In addition, memory card I/F 237 performs reading and writing of data from/to memory card 229 attached to the connector in response to an instruction from CPU 231.

Wireless communication module 238 establishes communication with game device 12 or the like under Bluetooth® specifications. It is noted that communication by wireless communication module 238 may be established under other specifications such as infrared or wireless LAN. Alternatively, wire connection may be adopted. In addition, local communication module 239 has a function to establish wireless communication with a game device of a similar type under a prescribed communication scheme. Wireless communication module 238 and local communication module 239 are connected to CPU 231. CPU 231 can exchange data with other equipment through a network circuit such as the Internet by using wireless communication module 238, or exchange data with another came device of a similar type by using local communication module 239.

In addition, RTC 240 and power supply circuit 241 are connected to CPU 231. RTC 240 counts time and outputs the counted time to CPU 231. For example, CPU 231 is also able to calculate current time (date) or the like based on the time counted by RTC 240. Power supply circuit 241 controls electric power supplied from a power supply of portable game device 210 (typically, a battery housed in first housing 211) and supplies electric power to each part of portable game device 210.

Portable game device 210 further includes I/F circuit 242 connected to CPU 231. Microphone 243, an amplifier 244 and touch panel 213 are connected to I/F circuit 242.

Microphone 243 senses voice and sound or the like of the user issued toward portable game device 210 and outputs an audio signal indicating the sensed voice and sound to I/F circuit 242. Amplifier 244 amplifies the audio signal from I/F circuit 242 and causes the audio signal to be output from speaker 245.

A touch panel control circuit included in I/F circuit 242 generates touch position data based on a detection signal from touch panel 213 and outputs the data to CPU 231. For example, the touch position data includes a coordinate value indicating a position where input to an input surface of touch panel 213 was made. Here, the touch panel control circuit performs, cyclically or in a prescribed cycle, reading of a signal from touch panel 213 and generation of the touch position data. CPU 231 obtains the touch position data through I/F circuit 242 (the touch panel control circuit) so that it can detect an input coordinate where the user has performed an input operation to touch panel 213.

In addition, first LCD 212 and second LCD 222 are each connected to CPU 231. First LCD 212 and second LCD 222 display an image in response to an instruction from CPU 231.

<Processing for Transfer to Portable Terminal>

Figure 39A:
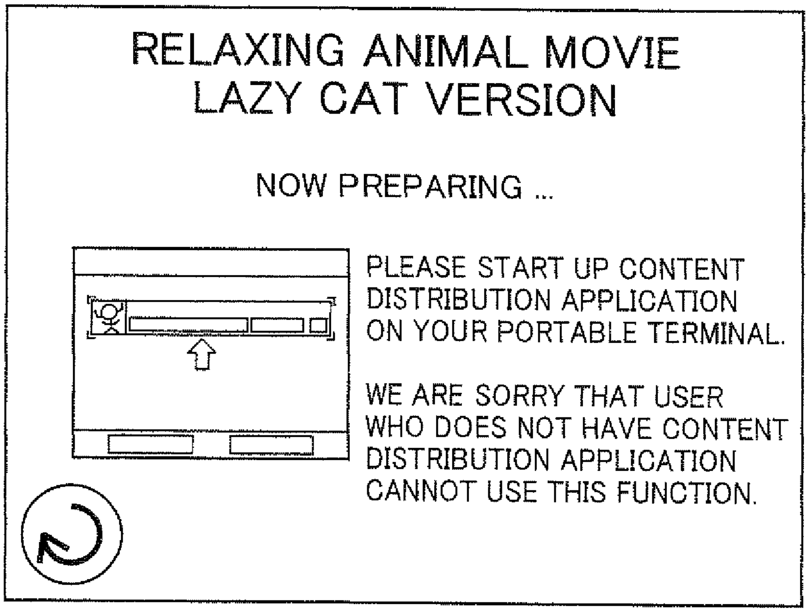
FIGS. 39A and 39B are diagrams showing an exemplary screen displayed when a portable terminal transfer subroutine is executed in the game device according to the embodiment of the present invention.
Figure 39B:
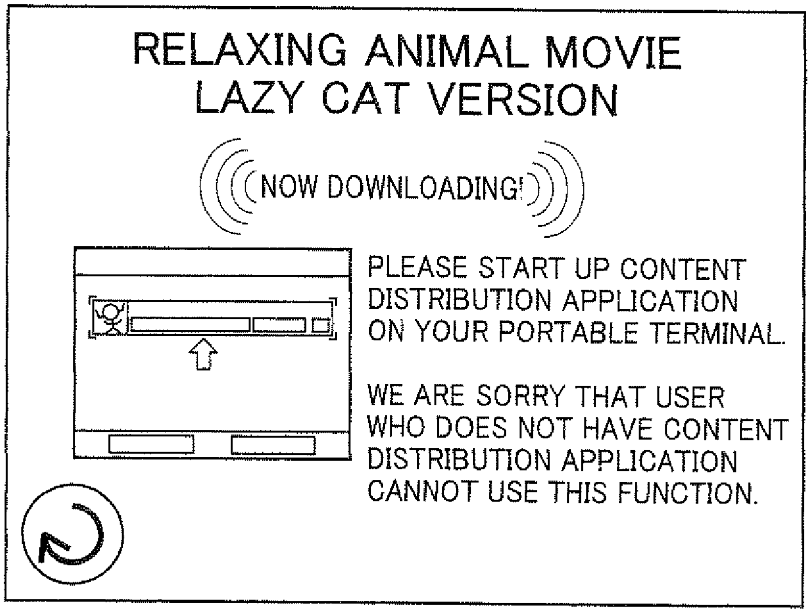

Referring next to FIGS. 39A and 39B, FIGS. 40A to 40D, and FIGS. 41A to 41D, overview of the portable terminal transfer subroutine shown in step S236 in FIG. 29 and step S338 in FIG. 34 will be described. It is noted that FIGS. 39A and 39B show an exemplary screen displayed on monitor 34 of game device 12, and FIGS. 40A to 40D and FIGS. 41A to 41D show an exemplary screen displayed on first LCD 212 and second LCD 222 of portable game device 210 representing a typical example of the portable terminal. In addition, it is assumed that a distribution application for portable terminal capable of establishing communication with the content distribution application according to the present embodiment is installed in portable game device 210.

When the portable terminal transfer subroutine is executed, CPU 40 of game device 12 initially has a notification screen as shown in FIG. 39A displayed. In the notification screen shown in FIG. 39A, a title of the content to be transferred to the portable terminal and a communication status between game device 12 and portable game device 210 (in the example shown in FIG. 39A, "now preparing") are displayed. In addition, in the notification screen shown in FIG. 39A, a message urging the user to start up the distribution application for portable terminal in the portable terminal and a message notifying that the content cannot be transferred unless the distribution application for portable terminal is installed in the portable terminal are displayed.

Thereafter, when communication between game device 12 and portable game device 210 is established and transfer of the content from game device 12 to portable game device 210 is started, a status "now downloading" as shown in FIG. 39B is displayed.

Figure 40A:
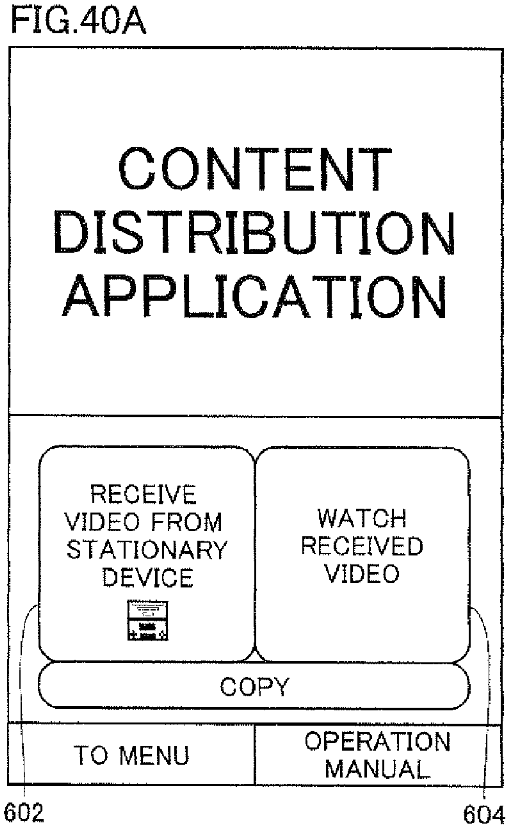
FIGS. 40A to 40D are diagrams showing an example (No. 1) of a screen displayed when a distribution application for portable terminal is executed in the portable game device according to the embodiment of the present invention.

On the other hand, when the user starts up the distribution application for portable terminal in portable game device 210, a menu screen as shown in FIG. 40A is displayed. In FIG. 40A to 40D and FIGS. 41A to 41D, for the sake of illustration, the images (screen shots) displayed on respective first LCD 212 and second LCD 222 are shown together as a whole.

In the menu screen shown in FIG. 40A, a "receive video from stationary device" button 602 for receiving the content from game device 12 and a "watch received video" button 604 for reproducing the content stored in portable game device 210 are displayed.

Figure 40C:
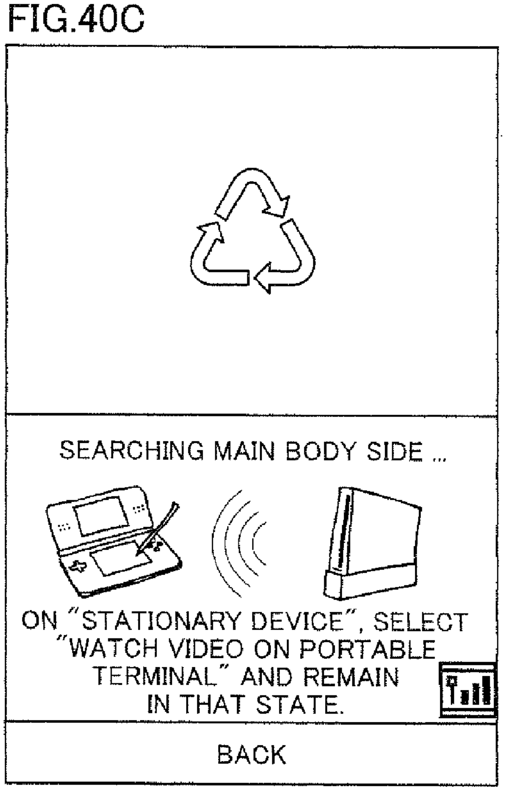
Figure 40B:
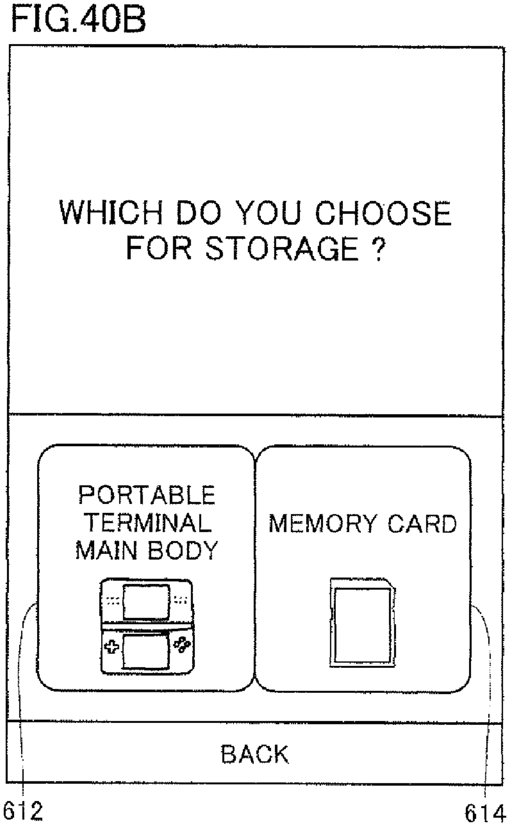
Figure 40D:
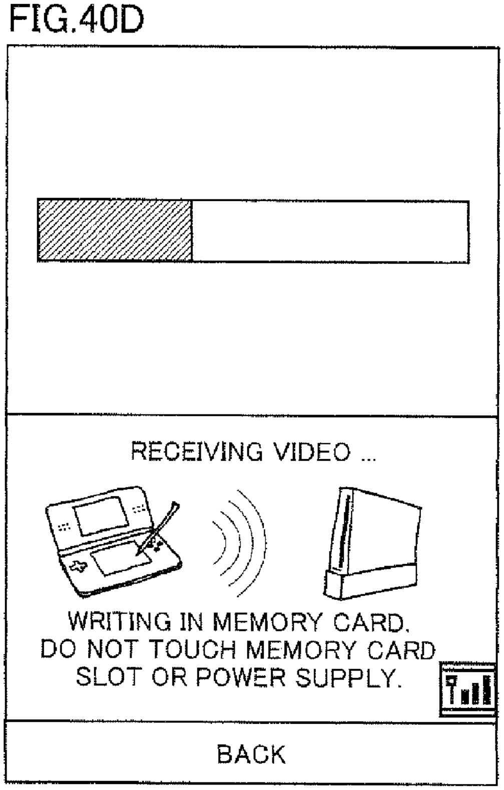

When the user uses touch pen 227 or the like to touch button 602, CPU 231 of portable game device 210 performs processing for receiving the content from game device 12 as shown in FIGS. 40B to 40D. On the other hand, when the user uses touch pen 227 or the like to touch button 604, CPU 231 of portable game device 210 performs processing for reproducing the stored content as shown in FIGS. 41A to 41D.

Referring initially to FIG. 40B, when button 602 is touched in the menu screen shown in FIG. 40A, CPU 231 of portable game device 210 has a screen for accepting selection of a storage destination of the content received from game device 12 displayed. More specifically, a "portable terminal main body" button 612 for setting data memory 234 for storage of portable game device 210 as the storage destination and a "memory card" button 614 for setting memory card 228 attached to portable game device 210 as the storage destination are displayed. In succession, when the user uses touch pen 227 or the like to touch any of buttons 612 and 614, CPU 231 of portable game device 210 starts processing for searching for game device 12 to be connected and has a screen indicating that game device 12 is being searched for as shown in FIG. 40C displayed.

Thereafter, when communication is established between portable game device 210 and game device 12, transfer of the content from game device 12 to portable game device 210 is started. Along with this transfer processing, CPU 231 of portable game device 210 has a screen indicating that the content is being received from game device 12 as shown in FIG. 40D displayed. Here, a status indicating how much data of the entire content has been received is displayed.

Through such an operation, the content can be transferred from game device 12 to portable game device 210.

Figure 41A:
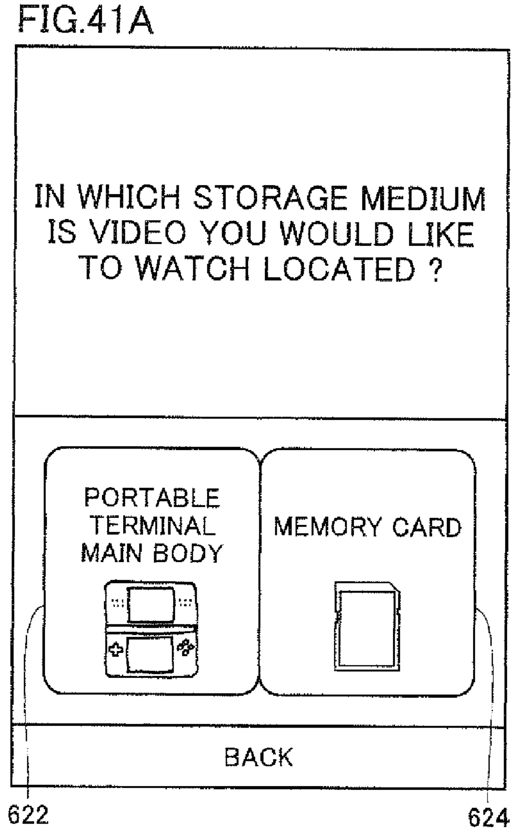
FIGS. 41A to 41D are diagrams showing an example No. 2) of a screen displayed when the distribution application for portable terminal is executed in the portable game device according to the embodiment of the present invention.

On the other hand, when button 604 is touched on the menu screen shown in FIG. 40A, CPU 231 of portable game device 210 has a screen displayed for accepting selection of a storage medium storing a content to be reproduced, as shown in FIG. 41A. More specifically, a "portable terminal main body" button 622 for reproducing the content stored in data memory 234 for storage of portable game device 210 and a "memory card" button 624 for reproducing the content stored in memory card 228 attached to portable game device 210 are displayed.

Figure 41C:
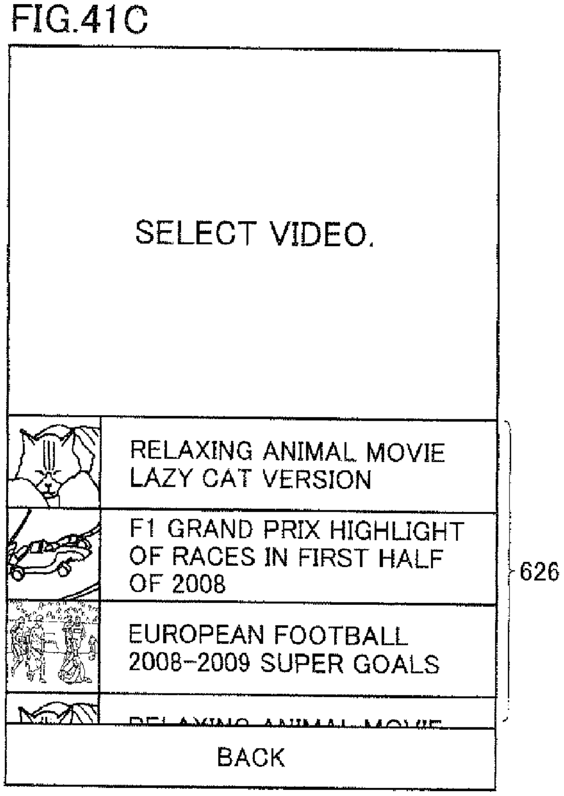
Figure 41B:
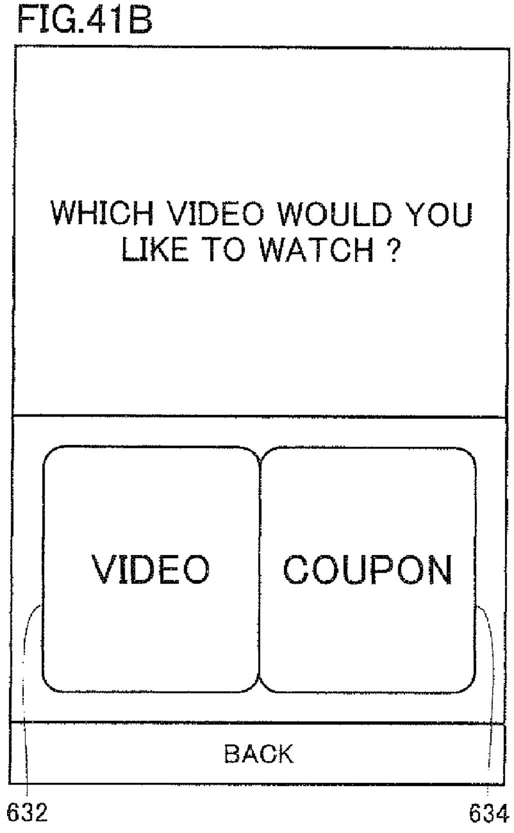

In succession, when the user uses touch pen 227 or the like to touch any of buttons 622 and 624, CPU 231 of portable game device 210 has a screen displayed for accepting selection of a type of a content to be reproduced, as shown in FIG. 41B. More specifically, a "video" button 632 for reproducing a video content such as a motion picture and a "coupon" button 634 for reproducing a discount coupon as shown in FIG. 331) above are displayed.

When the user uses touch pen 227 or the like to touch button 632 on the screen shown in FIG. 41B, CPU 231 of portable game device 210 has a screen for accepting selection of a video content to be reproduced as shown in FIG. 410 displayed. More specifically, CPU 231 of portable game device 210 extracts video contents stored in the storage medium selected in the screen shown in FIG. 41A and has thumbnail images and a list of titles 626 displayed.

Figure 41D:
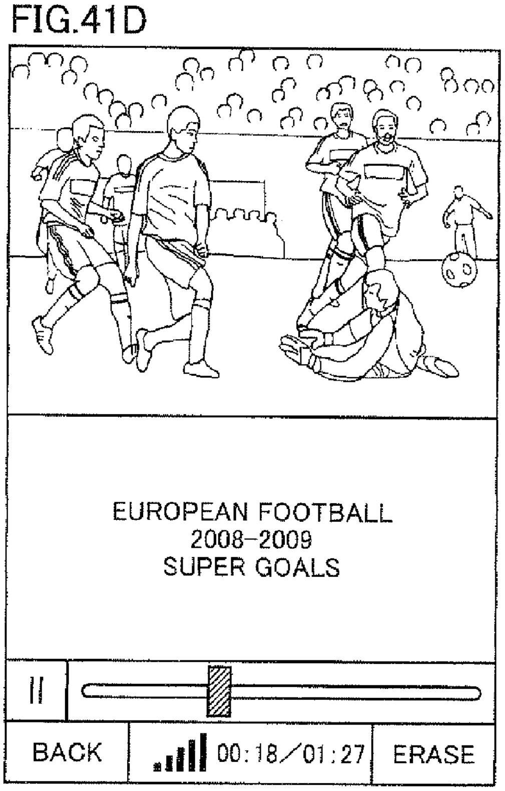

In addition, when the user uses touch pen 227 or the like to touch any content on the screen shown in FIG. 41, CPU 231 of portable game device 210 starts reproduction of the touched content as shown in FIG. 41D.

Though not shown, when the user uses touch pen 227 or the like to touch button 634 on the screen shown in FIG. 411B, CPU 231 of portable game device 210 extracts images of coupons stored in the storage medium selected in the screen shown in FIG. 41A and has the thumbnail images thereof or the like displayed in a list. Then, when any coupon is touched, CPU 23*l* of portable game device 210 reproduces the motion picture of the selected coupon.

<Processing Procedure for Transfer to Portable Terminal>

Figure 42:
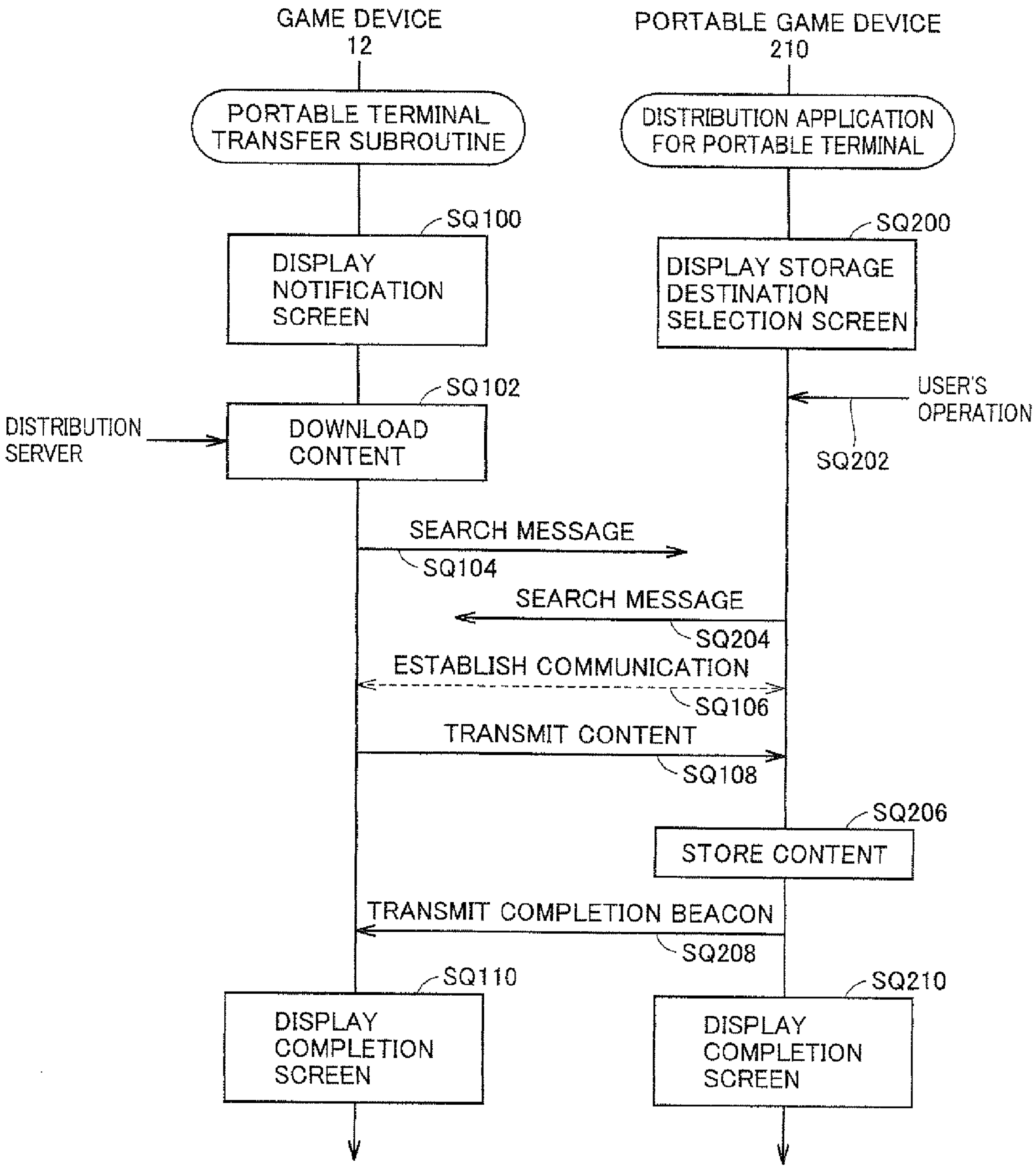
FIG. 42 is a sequence diagram showing processing for transferring a content between the game device and the portable game device according to the embodiment of the present invention.

Referring next to FIG. 42, processing for transferring the content between game device 12 and portable game device 210 will be described.

CPU 40 of game device 12 causes monitor 34 to display the notification screen as shown in FIG. 39A when the portable terminal transfer subroutine is executed (sequence SQ100). In succession, CPU 40 of game device 12 downloads the content of interest from distribution server 104 (sequence SQ102). Thereafter, CPU 40 of game device 12 starts transmission of a radio signal including a search message (sequence SQ104).

On the other hand, when the distribution application for portable terminal is executed, CPU 231 of portable game device 230 has the storage destination selection screen as shown in FIG. 40A displayed (sequence SQ200). In succession, after the storage destination is determined in response to the user's operation, CPU 231 of portable game device 210 starts transmission of a radio signal including a search message (sequence SQ204).

When reception of the search message and a handshake procedure are completed between game device 12 and portable game device 210 and communication is established between these devices (sequence SQ106), CPU 40 of game device 12 transmits the content obtained from distribution server 104 to portable game device 210 (sequence SQ108). CPU 231 of portable game device 210 has the content received from game device 12 stored (sequence SQ206). Thereafter, CPU 231 of portable game device 210 transmits a completion beacon to game device 12 (sequence SQ208).

Thereafter, CPU 231 of portable game device 210 has a completion screen displayed (sequence SQ210) and the process ends.

On the other hand, a completion screen is also displayed on game device 12 that received the completion beacon (sequence SQ110) and the process ends.

Figure 43:
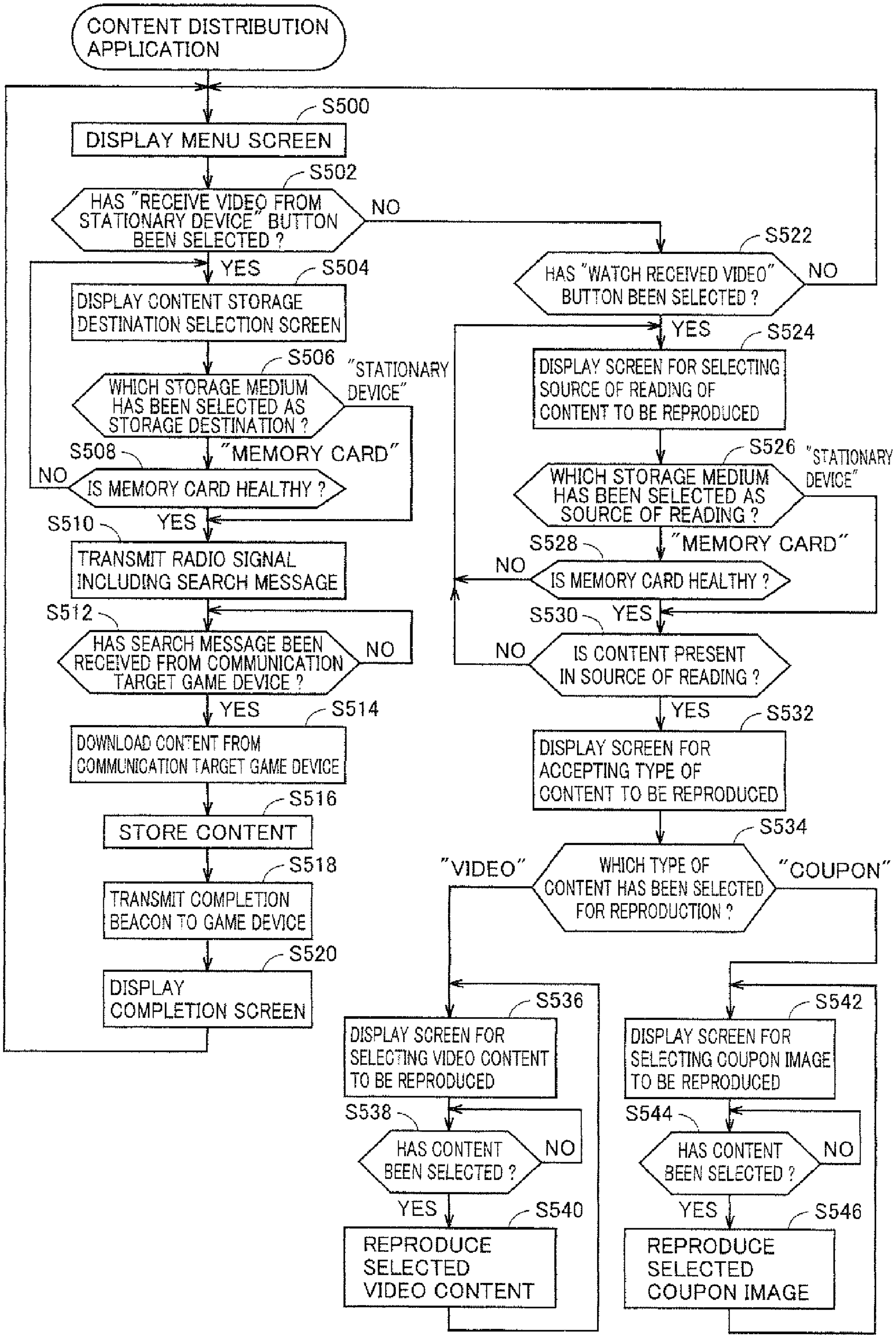
FIG. 43 is a flowchart showing a procedure for processing the distribution application for portable terminal in the portable game device according to the embodiment of the present invention.

Referring next to FIG. 43, a procedure for processing the distribution application for portable terminal shown in FIGS. 40A to 40D and FIGS. 41A to 41D above will be described. Each step shown in FIG. 43 is provided by execution of the distribution application for portable terminal according to the present embodiment by CPU 231 of portable game device 210.

Referring to FIG. 43, initially, CPU 231 of portable game device 210 has the menu screen as shown in FIG. 40A displayed (step S500). In successive step S502, CPU 231 determines whether "receive video from stationary device" button 602 on the menu screen has been selected or not. When "receive video from stationary device" button 602 is selected (YES in step S502), the process proceeds to step S504. On the other hand, when "receive video from stationary device" button 602 is not selected (NO in step S502), the process proceeds to step S522.

In step S504, CPU 231 has the content storage destination selection screen as shown in FIG. 40B displayed. In successive step S506, CPU 231 determines which storage medium has been selected as the storage destination. When data memory 234 for storage of portable game device 210 is selected as the storage destination ("stationary device" in step S506), CPU 231 sets data memory 234 for storage as the storage destination. Then, the process proceeds to step S510. On the other hand, when memory card 228 attached to portable game device 210 is selected as the storage destination ("memory card" in step S506), CPU 231 sets memory card 228 as the storage destination. In successive step S508, CPU 231 determines whether memory card 228 attached to portable game device 210 is healthy or not. When memory card 228 attached to portable game device 210 is healthy (YES in step S508), the process proceeds to step S510. On the other hand, when memory card 228 attached to portable game device 210 is not healthy (NO in step S508), the process returns to step S504.

In step S510, CPU 231 transmits a radio signal including a search message in order to search for communication target game device 12. Here, CPU 231 has a screen indicating that game device 12 is being searched for displayed as shown in FIG. 40C. In successive step S512, CPU 231 determines whether the search message has been received from communication target game device 12 or not. When the search message has not been received from communication target game device 12 (NO in step S512), the processing in step S512 is repeated. On the other hand, when the search message has been received from communication target game device 12 (YES in step S512), the process proceeds to step S514.

In step S514, CPU 231 downloads the content from communication target game device 12. Here, CPU 231 has a screen indicating that the content is being received from game device 12 as shown in FIG. 40D displayed. In successive step S516, when downloading of the content is completed, CPU 231 causes data memory 234 for storage or memory card 228 set as the storage destination to store the content. In further successive step S518, CPU 231 transmits the completion beacon to game device 12. In successive step S520, CPU 231 has the completion screen displayed. Then, the process returns to step S500.

In contrast, in step S522, CPU 231 determines whether "watch received video" button 604 in the menu screen has been selected or not. When "watch received videos" button 604 is selected (YES in step S522), the process proceeds to step S524. On the other hand, when "watch received video" button 604 is not selected (NO in step S522), the process returns to step S500.

In step S524, CPU 231 has a screen displayed for accepting which storage medium should be selected to reproduce a content stored therein, as shown in FIG. 41A. In successive step S526, CPU 231 determines which storage medium is selected to reproduce a content stored therein. When reproduction of the content stored in data memory 234 for storage of portable game device 210 is selected ("main body" in step S526), CPU 231 sets data memory 234 for storage as the source of reading of the content. Then, the process proceeds to step S530. On the other hand, when reproduction of the content stored in memory card 228 attached to portable game device 210 is selected ("memory card" in step S526), CPU 231 sets memory card 228 as the source of reading of the content. In successive step S528, CPU 231 determines whether memory card 228 attached to portable game device 210 is healthy or not. When memory card 228 attached to portable game device 210 is healthy (YES in step S528), the process proceeds to step S530. On the other hand, when memory card 228 attached to portable game device 210 is not healthy (NO in step S528), the process returns to step S524.

In step S530, CPU 231 determines whether a content is present in the source of reading or not. When no content is present in the source of reading (NO in step S530), the process returns to step S524. On the other hand, when a content is present in the source of reading (YES in step S530), the process proceeds to step S532.

In step S532, CPU 231 has a screen for accepting selection of a type of a content to be reproduced as shown in FIG. 41B displayed. In successive step S534, CPU 231 determines which type of content has been selected as the content to be reproduced. When the video content is selected for reproduction ("video" in step S534), the process proceeds to step S536. On the other hand, when the coupon is selected for reproduction ("coupon" in step S534), the process proceeds to step S542.

In step S536, CPU 231 reads the video content to be reproduced, that has been read from the source of reading, and has a screen for accepting selection of the video content to be reproduced as shown in FIG. 41C displayed. In successive step S538, CPU 231 determines which content has been selected. When any content is selected (YES in step S538), the process proceeds to step S540. On the other hand, no content is selected (NO in step S538), the processing in step S538 is repeated.

In step S540, CPU 231 reproduces the selected video content. Thereafter, the process returns to step S536.

In step S542, CPU 231 reads the coupon motion picture to be reproduced, that has been read from the source of reading, and has a screen displayed for accepting selection of the coupon motion picture to be reproduced. In successive step S544, CPU 231 determines whether any content has been selected or not. When any content has been selected (YES in step S544), the process proceeds to step S546. On the other hand, when no content is selected (NO in step S544), the processing in step S544 is repeated.

In step S546, CPU 231 reproduces the selected coupon motion picture. Here, typically, as an image showing the content of the coupon is incorporated in the final frame of the coupon motion picture, the image in the final frame is displayed as a still image. Thereafter, the process returns to step S542.

Search for contents can further be facilitated by distributing any of the video content and the discount coupon in a form of a motion picture content. Regarding the discount coupon, however, an image that can be presented at a shop should only be displayed. Therefore, a still image may be used instead of a motion picture. By using a still image, load imposed on the network can be lessened.

<Calendar Function>

Figure 44:
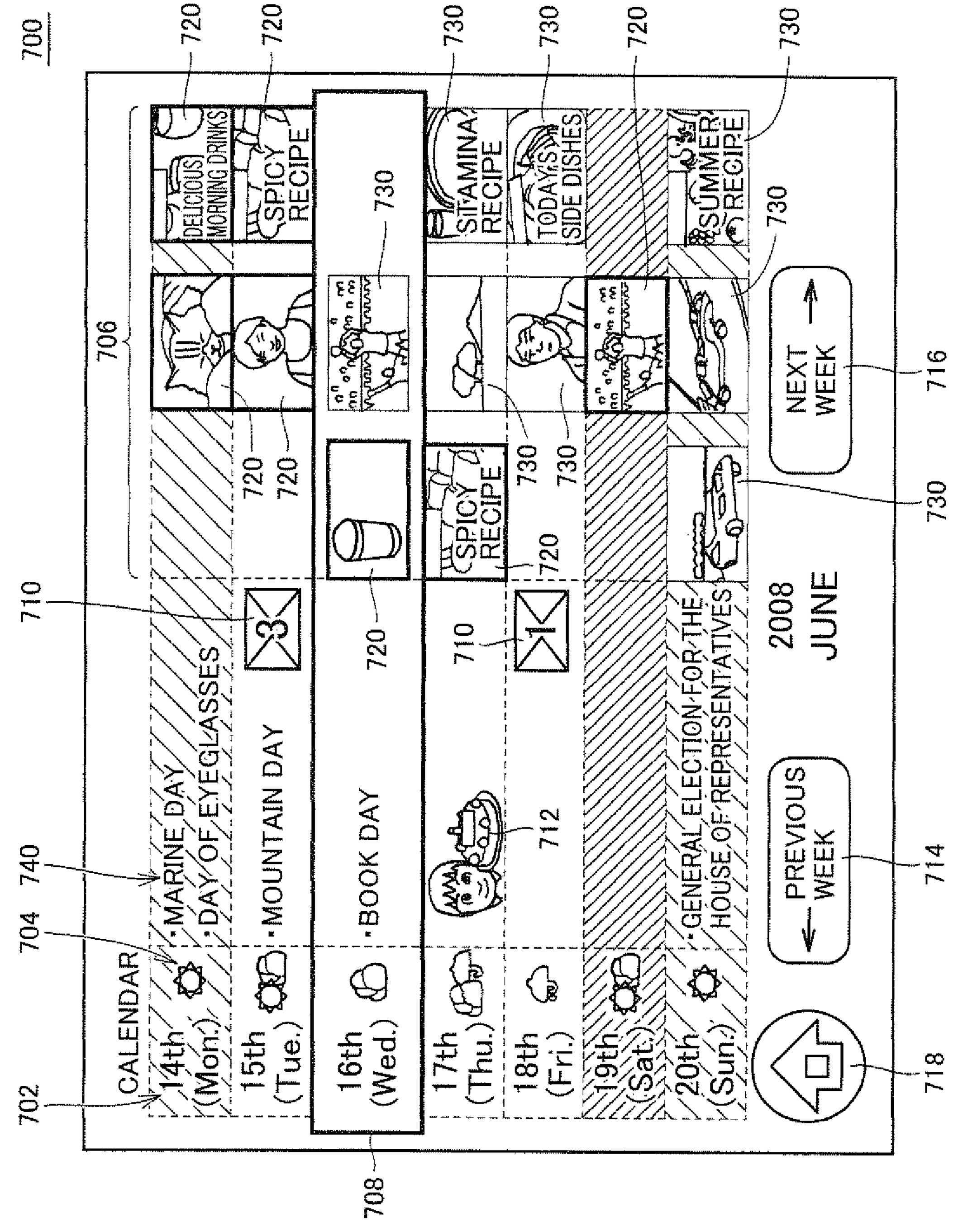
FIG. 44 is a diagram showing an example (No. 1) of a screen displayed when a calendar subroutine is executed in the game device according to the embodiment of the present invention.
Figure 45:
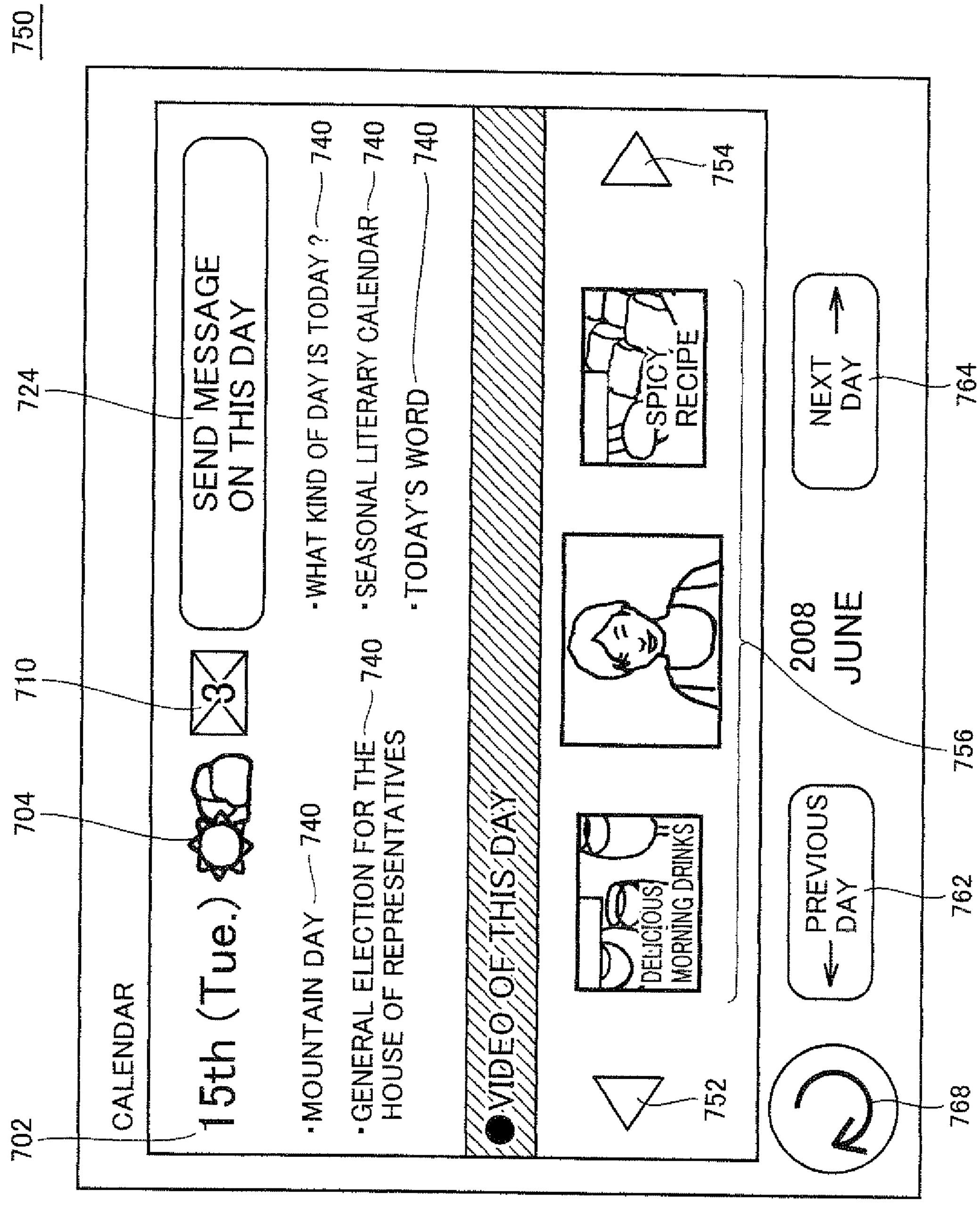
FIG. 45 is a diagram showing an example (No. 2) of a screen displayed when the calendar subroutine is executed in the game device according to the embodiment of the present invention.

Referring next to FIGS. 44 and 45, overview of a calendar subroutine shown in step S166 in FIG. 23 will be described.

When the calendar subroutine is executed, CPU 40 of game device 12 initially has a weekly calendar screen 700 as shown in FIG. 44 displayed. In this calendar screen 700, dates in a week (in the example in FIG. 44, 14th to 20th) are displayed separately. Then, in the field of each day, a date 702 and weather forecast 704 on that day are displayed. In addition, in the field of each day, a literary calendar headword 740 indicating some anniversary is added. A field corresponding to the time and day of the current time point among these fields is displayed differently from fields of other days. In the example in FIG. 44, a bold frame 708 surrounds the field corresponding to the time and day of the current time point.

In addition, in the field of each day, if a message designated to be opened on that day has arrived, an icon 710 notifying the user of reception of the message is displayed. Icon 710 also shows the number indicating the number of received messages.

In addition, a content display field 706 is provided in calendar screen 700, and a thumbnail image or the like of the content brought in correspondence with each day is displayed. More specifically, a time and day of start of availability and a time and day of end of availability are determined for each content such as a motion picture, and the user is permitted to download the content during a period from that time and day of start of availability to time and day of end of availability. It is noted that the time and day of start of availability of each content is a date brought in correspondence with that content. Thus, by bringing each content in correspondence with any date and by setting a period during which the content can be watched, content distribution in various forms in accordance with the substance thereof can be achieved. For example, in distributing a content that records a method of fabricating a jack-o'-lantern used for Halloween, such a form as starting distribution from a day before Halloween is preferred. On the other hand, by limiting a period during which the content can be watched, user's willingness to watch the content can also be enhanced.

Typically, in calendar screen 700, a manner of display of corresponding thumbnail images may be different between a content selectable at the current time point and other non-selectable contents. In the example shown in FIG. 44, content display field 706 includes a thumbnail image 720 surrounded with a bold frame, which indicates a selectable content, and a normal thumbnail image 730 which indicates a non-selectable content.

In addition, in a lower portion of calendar screen 700, a "previous week" button 714 and a "next week" button 716 are displayed. When the user selects any of buttons 714 and 716, the date displayed on calendar screen 700 is changed week by week.

In addition, in the lower portion of calendar screen 700, a back icon 718 is displayed. When the user selects this icon 718, the screen returns to the main screen.

In addition, when the user selects any date displayed on calendar screen 700, a daily calendar screen 750 as shown in FIG. 45 is displayed. In this calendar screen 750, a literary calendar of the selected date, a content brought in correspondence with that day or the like is displayed.

More specifically, in calendar screen 750, if a message designated to be opened on that day is present, icon 710 informing the user of that fact is displayed together with date 702 and weather forecast 704 on that day. In addition, in calendar screen 750, literary calendar headword 740 of the literary calendar on that day is displayed in a selectable manner.

Moreover, in calendar screen 750, if a date corresponding to the current time point or a date after that is selected, a "send message on this day" button 724 is displayed in a selectable manner. When this button 724 is selected, a screen for creating a message designated to be opened on that selected date is displayed on calendar 750. With this function, for example, a message of which day of mailing (or a day of reception) is set in correspondence with a birthday or the like of a family member or a friend can be created and transmitted. Therefore, if a date prior to the current time point is selected, "send message on this day" button 724 is not displayed.

In addition, calendar screen 750 is provided with a content display field 756, where a thumbnail image of the content brought in correspondence with each day is displayed. If the number of contents brought in correspondence with is greater than a prescribed number, display switch buttons 752 and 754 are displayed. When button 752 or 754 is selected, the displayed thumbnail images of the contents are changed.

Moreover, in the lower portion of calendar screen 750, a "previous day" button 762 and a "next day" button 764 are displayed. When the user selects any of buttons 762 and 764, the date displayed on calendar screen 750 is changed day by day.

Further, in the lower portion of calendar screen 750, a back icon 768 is displayed. When the user selects this icon 768, the screen returns to calendar screen 700.

In addition, when any literary calendar headword 740 displayed on calendar screen 750 is selected, transition to a screen (not shown) displaying details of the selected literary calendar is made. In the screen displaying the details of this literary calendar, not only texts but also an image set in advance may be displayed. Alternatively, detailed explanation of the literary calendar may be provided only by the motion picture.

<Data Exchange in Calendar Function>

Data exchange in distribution system 100 during execution of the calendar function will now be described.

Figure 46:
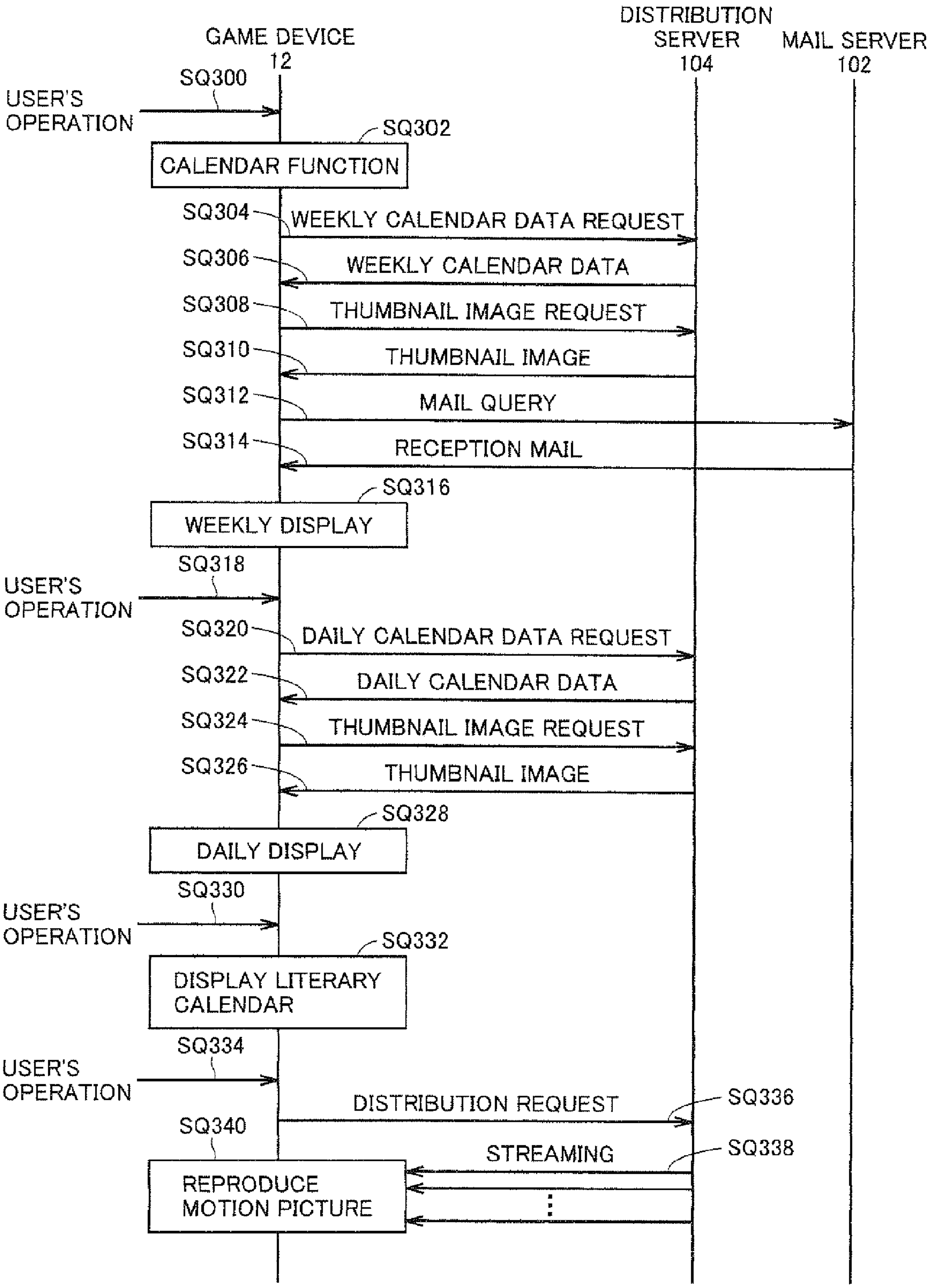
FIG. 46 is a sequence diagram showing data exchange when a calendar function is attained in the distribution system according to the embodiment of the present invention.

Referring to FIG. 46, when the user's operation to indicate execution of the calendar function is performed (sequence SQ300), CPU 40 of game device 12 starts execution of the calendar function (sequence SQ302). In succession, CPU 40 of game device 12 transmits a weekly calendar data request to distribution server 104 (sequence SQ304) In response to this weekly calendar data request, distribution server 104 transmits the weekly calendar data to game device 12 (sequence SQ306). In addition, CPU 40 of game device 12 transmits a thumbnail image request to distribution server 104 (sequence SQ308). In response to this thumbnail image request, distribution server 104 transmits the thumbnail image to game device 12 (sequence SQ310). In addition, CPU 40 of game device 12 sends a query about presence/absence of a mail to mail server 102 (sequence SQ312). In response to this query, if a mail is present, mail server 102 transmits the mail to game device 12 (sequence SQ314).

When downloading of data from distribution server 104 and mail server 102 is completed, CPU 40 of game device 12 has the weekly calendar displayed based on the weekly calendar data, the thumbnail image, and the message (sequence SQ316).

Thereafter, when the user performs an operation to select any date displayed on the weekly calendar (sequence SQ318), CPU 40 of game device 12 transmits a daily calendar data request to distribution server 104 (sequence SQ320). In response to this daily calendar data request, distribution server 104 transmits the daily calendar data to game device 12 (sequence SQ322). In addition, CPU 40 of game device 12 transmits a thumbnail image request to distribution server 104 (sequence SQ324). In response to this thumbnail image request, distribution server 104 transmits the thumbnail image to game device 12 (sequence SQ326).

When downloading of data from distribution server 104 is completed, CPU 40 of game device 12 has the daily calendar displayed based on the daily calendar data and the thumbnail image (sequence SQ328).

Thereafter, when a user's operation to indicate selection of any literary calendar headword is performed (sequence SQ330), CPU 40 of game device 12 has details of the selected literary calendar displayed on the screen (sequence SQ332).

In addition, when a user's operation to indicate selection of any motion picture content is performed (sequence SQ334), CPU 40 of game device 12 transmits a distribution request including the motion picture ED corresponding to the selected content to distribution server 104 (sequence SQ336). In response to this distribution request, distribution server 304 starts distribution (typically, streaming-play) of the designated content stored in the server itself to game device 12 (sequence SQ338). CPU 40 of game device 12 generates this distributed motion picture (sequence SQ340).

<Data Structure of Calendar Data>

An exemplary structure of the calendar data exchanged in the sequence diagram shown in FIG. 46 above will now be described with reference to FIGS. 47A and 47B. FIG. 47A shows exemplary items included in the weekly calendar data and FIG. 47B shows exemplary items included in the daily calendar data. It is noted that such information is typically described in a markup language such as XML.

Referring to FIG. 47A, the weekly calendar data typically includes (FT) year, month and day of interest, (F2) days of the week, (F3) a holiday flag, (F4) a literary calendar headword, and (F5) motion picture information. As the items from (F1) to F5) are set for each day, the weekly calendar data includes the items from (F1) to (F5) for seven days.

(F1) year, month and day of interest indicates year, month and day that should reflect the stored information (F2) days of the week indicate a day of the week of corresponding (F1) year, month and day of interest. (F3) holiday flag indicates whether the corresponding (F1) year, month and day of interest is a holiday or not. (F4) literary calendar headword stores the substance of literary calendar headword 740 displayed on calendar screen 700 shown in FIG. 44.

(F5) motion picture information stores the information on the content displayed on calendar screen 700 shown in FIG. 44. More specifically, (F5) motion picture information includes (F5-1) an order, (F5-2) a motion picture ID, (F5-3) a time and day of start of availability, (F5-4) a time and day of end of availability, and (F5-5) a title. Regarding (F5-1) order, the order of display of the content of interest in the field of each day is allocated. (F5-2) motion picture ID is the identification information for uniquely specifying the content (motion picture) of interest in distribution server 104 (F5-3) time and day of start of availability indicates beginning of a period during which watching (downloading) of the content of interest is permitted. (F5-4) time and day of end of availability indicates an end of the period during which watching (downloading) of the content of interest is permitted. (F5-5) title stores a title of the content of interest. It is noted that the number of pieces of described (F5) motion picture information corresponds to the number of contents brought in correspondence with the day of interest.

Referring to FIG. 47B, the daily calendar data typically includes (G1) year, month and day of interest, (G2) days of the week, (G3) a holiday flag, (G4) literary calendar information, and (G5) motion picture information. The number of pieces of described (G4) literary calendar information corresponds to the number of literary calendars brought in correspondence with the day of interest. Similarly, the number of pieces of described (C5) motion picture information corresponds to the number of contents brought in correspondence with the day of interest.

In (G1) year, month and day of interest, (G2) days of the week and (G3) holiday flag, substantially the same items as (F1) year, month and day of interest, (F2) days of the week and (F3) holiday flag included in the weekly calendar data shown in FIG. 47A are stored respectively.

(G4) literary calendar information stores information for displaying calendar screen 750 shown in FIG. 45 and a screen (not shown) showing more detailed contents of the literary calendar. More specifically, (G4) literary calendar information includes (G4-1) a literary calendar index, (G4-2) a literary calendar headword, (G4-3) a literary calendar text, (G4-4) a literary calendar image type, and (G4-5) a literary calendar FIG. 45. (G4-1) literary calendar index is an identification number for specifying the literary calendar on the day of interest. (G4-2) literary calendar headword stores the substance of literary calendar headword 740 displayed on calendar screen 750 shown in FIG. 45. (G4-3) literary calendar text stores texts explaining the more detailed substance of the literary calendar. (G4-4) literary calendar image type stores presence/absence of an image to be displayed together with the substance of the literary calendar, a size of the image for display, or the like. (G4-5) literary calendar BGM stores the identification information for specifying a BGM in displaying the substance of the literary calendar.

In addition, (G5) motion picture information stores the item substantially the same as (F5) motion picture information included in the weekly calendar data shown in FIG. 47A.

<Processing Procedure of Calendar Function>

Figure 48:
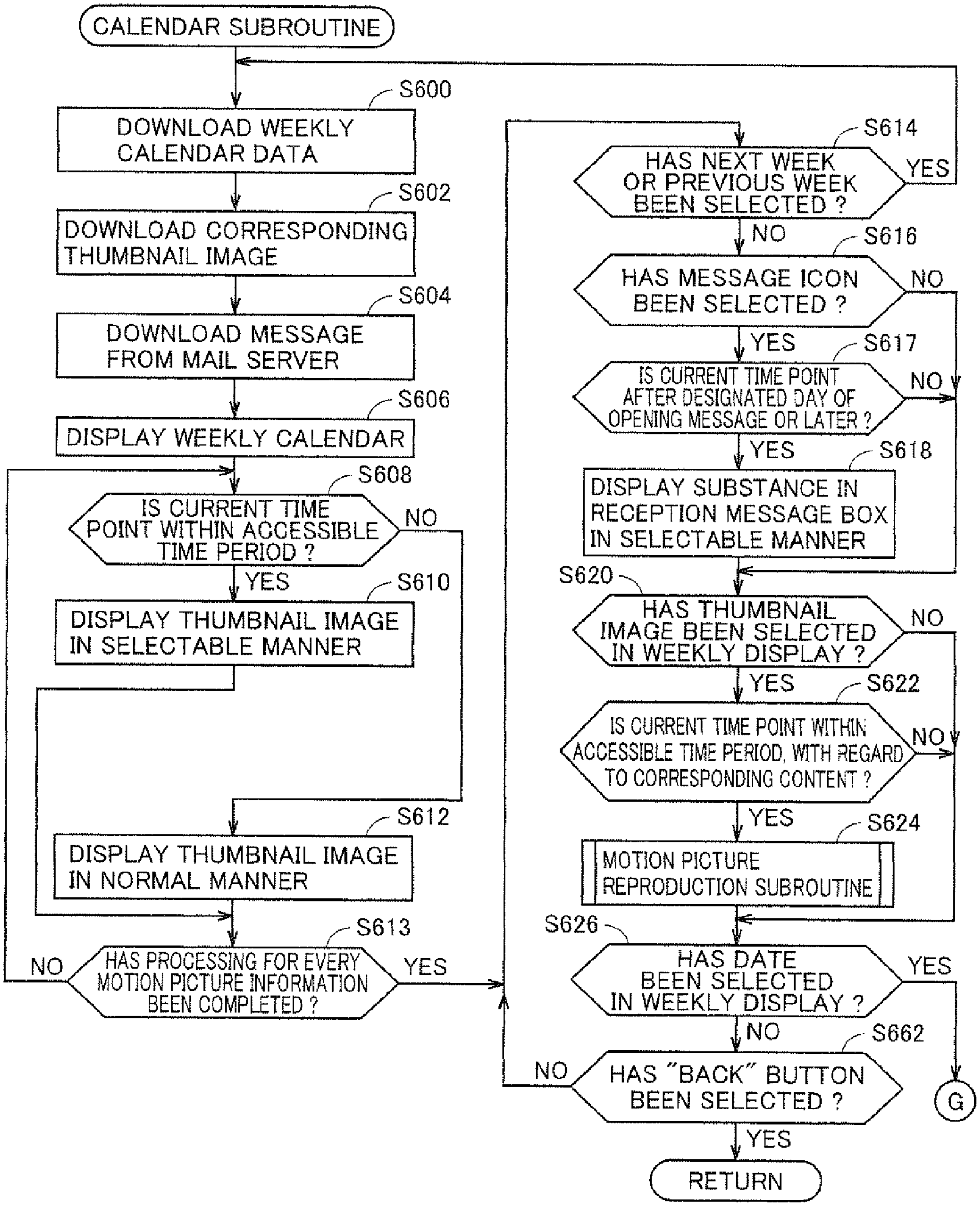
FIG. 48 is a flowchart showing a processing procedure (No. 1) in a calendar subroutine in the game device according to the embodiment of the present invention.
Figure 49:
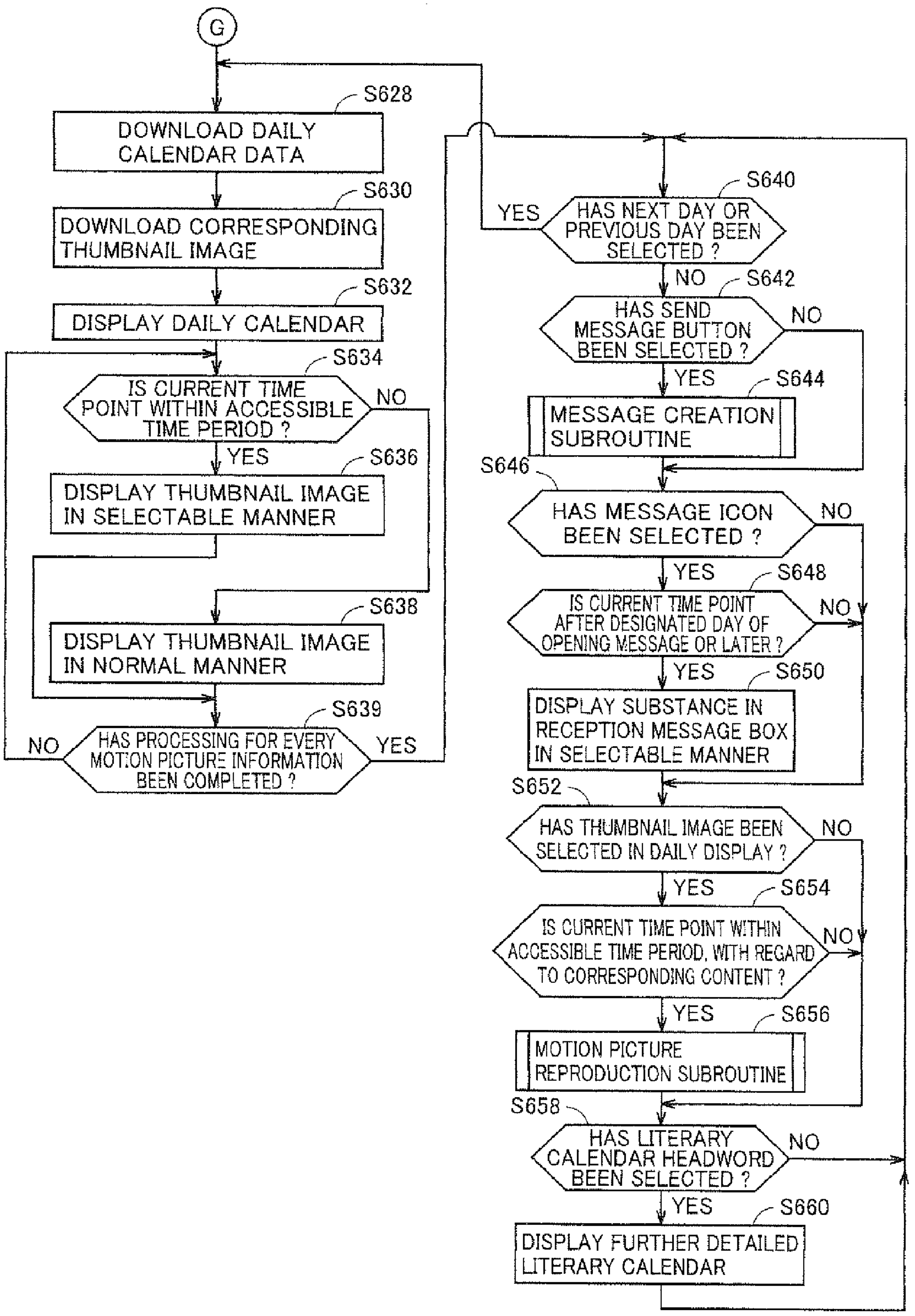
FIG. 49 is a flowchart showing a processing procedure (No. 2) in the calendar subroutine in the game device according to the embodiment of the present invention.

Referring next to FIGS. 48 and 49, a calendar subroutine (details in step S166 in FIG. 23) providing the calendar function shown in FIGS. 44 and 45 above will be described. Each step shown in FIGS. 48 and 49 is provided by execution of the content distribution application according to the present embodiment by CPU 40 of game device 12.

Referring to FIGS. 48 and 49, initially, CPU 40 of game device 12 downloads the weekly calendar data from distribution server 104 (step S600). In successive step S602, CPU 40 downloads the thumbnail image of the content corresponding to each motion picture ID based on the motion picture ID included in the downloaded weekly calendar data. In further successive step S604, CPU 40 sends a query to mail server 102 and downloads a message for which any day in the week included in that downloaded weekly calendar data is designated to be opened. CPU 40 causes reception message box 44*b* of flash memory 44 to store the downloaded message.

Thereafter, in step S606, CPU 40 has the weekly calendar as shown in FIG. 44 displayed based on the downloaded weekly calendar data and the message. In successive step S608, CPU 40 refers to ROM/RTC 48 to obtain the current time and day, and determines whether or not the current time point is within an accessible time period (a period from the time and day of start of availability to the time and day of end of availability) of (F5) motion picture information included in the downloaded weekly calendar data. When the current time point is within the accessible time period (YES in step S608), the process proceeds to step S610. On the other hand, when the current time point is not within the accessible time period (NO in step S608), the process proceeds to step S612.

In step S610, CPU 40 has the thumbnail image corresponding to (F5) motion picture information of interest displayed, as surrounded by a bold frame indicating that the content is selectable. Thereafter, the process proceeds to step S613.

In step S612, CPU 40 has the thumbnail image corresponding to (F5) motion picture information of interest displayed in a normal manner indicating that the content is not selectable. Thereafter, the process proceeds to step S613.

In step S613, CPU 40 determines whether the processing for every (P5) motion picture information included in the downloaded weekly calendar data has been completed or not. When the processing for every (F5) motion picture information included in the downloaded weekly calendar data has not been completed (NO in step S613), the processing in step S608 and subsequent steps is repeated. On the other hand, when the processing for every (F5) motion picture information included in the downloaded weekly calendar data has been completed (YES in step S613), the process proceeds to step S614. At this time point, display of weekly calendar screen 700 as shown in FIG. 44 is completed.

In step S614, CPU 40 determines whether a next week or a previous week relative to the currently displayed week has been selected or not. When the next week or the previous week relative to the currently displayed week is selected (YES in step S614), the processing in step S600 and subsequent steps is repeated. When the next week or the previous week relative to the currently displayed week is not selected (NO in step S614), the process proceeds to step S616.

In step S616, CPU 40 determines whether a message icon has been selected or not. When the message icon is selected (YES in step S616), the process proceeds to step S617. On the other hand, when the message icon is not selected (NO in step S616), the process proceeds to step S620.

In step S617, CPU 40 refers to ROM/RTC 48 to obtain the current time, and determines whether the current time point coincides with the date brought in correspondence with the selected message icon or has passed that date. When the current time point coincides with the date brought in correspondence with the selected message icon or has passed that date (YES in step S617), the process proceeds to step S618. On the other hand, when the current time point does not coincide with the date brought in correspondence with the selected message icon and has not passed that date (NO in step S617), the processing in step S618 is skipped and the process proceeds to step S620.

In step S618, CPU 40 has the substance stored in reception message box 44*b* of flash memory 44 displayed in a selectable manner. Namely, a message transmitted from another game device 12 or the like via mail server 102 may be attached with a year, month and day designated as the day to open the message, and such a message of which day of opening is designated is stored in transmission message box 44*a* in correspondence with the designated date. In addition, in calendar screen 700 as well, the message is displayed in correspondence with the designated date. Such a message to which the designated day of opening has been added is typically intended to be read on a specific day such as a birthday or some kind of anniversary. Therefore, CPU 40 of game device 12 prohibits accessing by the user of such a message to which the designated day of opening has been added until the designated day of opening comes. Namely, CPU 40 outputs the message only when the designated day of opening added to the received message coincides with the current time point or the current time point has passed the designated day of opening. Then, the process proceeds to step S620.

In step S620, CPU 40 determines whether any thumbnail image displayed in the weekly calendar has been selected or not. When any thumbnail image is selected (YES in step S620), the process proceeds to step S622. On the other hand, when no thumbnail image is selected (NO in step S620), the process proceeds to step S626.

In step S622, CPU 40 refers to ROM/RTC 48 to obtain the current time and day, and determines whether the current time point is within the accessible time period (the period from the time and day of start of availability to the time and day of end of availability) of the content (motion picture) corresponding to the selected thumbnail image. More specifically, CPU 40 specifies the motion picture ID brought in correspondence with the selected thumbnail image and obtains (F5-3) time and day of start of availability and (F5-4) time and day of end of availability corresponding to that motion picture ID described in the downloaded weekly calendar data. Then, CPU 40 compares the obtained time and day of start of availability and time and day of end of availability with the current time point (current date).

When the current time point is within the accessible time period of the content (motion picture) corresponding to the selected thumbnail image (YES in step S622), the motion picture reproduction subroutine is executed (step S624). After this motion picture reproduction subroutine is executed, the process proceeds to step S626. On the other hand, when the current time point is not within the accessible time period of the content (motion picture) corresponding to the selected thumbnail image (NO in step S622), CPU 40 prohibits reproduction of the selected content (motion picture). Then, the process proceeds to step S626.

In step S626, CPU 40 determines whether any date displayed in the weekly calendar has been selected or not. When any date is selected (YES in step S626), the process proceeds to step S628. On the other hand, when no date is selected (NO in step S628), the process proceeds to step S662.

In step S628, the daily calendar data in connection with the selected date is downloaded. In successive step S630, CPU 40 downloads the thumbnail image of the content corresponding to each motion picture ID based on the motion picture ID included in the downloaded daily calendar data.

Thereafter, in step S632, CPU 40 has the daily calendar as shown in FIG. 45 displayed, based on the downloaded daily calendar data and the message. In successive step S634, CPU 40 refers to ROM/RTC 48 to obtain the current time and day, and determines whether the current time point is within the accessible time period (the period from the time and day of start of availability to the time and day of end of availability) of (G5) motion picture information included in the downloaded daily calendar data. When the current time point is within the accessible time period (YES in step S634), the process proceeds to step S636. On the other hand, when the current time point is not within the accessible time period (NO in step S634), the process proceeds to step S638.

In step S636, CPU 40 has the thumbnail image corresponding to (G5) motion picture information of interest displayed, as surrounded by a bold frame indicating that the content is selectable. Thereafter, the process proceeds to step S639.

In step S638, CPU 40 has the thumbnail image corresponding to (G5) motion picture information of interest displayed in a normal manner indicating that the content is not selectable. Thereafter, the process proceeds to step S639.

In step S639, CPU 40 determines whether the processing for every (G5) motion picture information included in the downloaded daily calendar data has been completed or not. When the processing for every (G5) motion picture information included in the downloaded daily calendar data has not been completed (NO in step S639), the processing in step S634 and subsequent steps is repeated. On the other hand, when the processing for every (G5) motion picture information included in the downloaded daily calendar data has been completed (YES in step S639), the process proceeds to step S640. At this time point, display of daily calendar screen 750 as shown in FIG. 45 is completed.

In step S640, CPU, 40 determines whether a next day or a previous day relative to the currently displayed day has been selected or not. When the next day or the previous day relative to the currently displayed day is selected (YES in step S640), the processing in step S628 and subsequent steps is repeated. When the next day or the previous day relative to the currently displayed day is not selected (NO in step S640), the process proceeds to step S642.

In step S642, CPU 40 determines whether "send message on this day" button 724 has been selected or not. When "send message on this day" button 724 is selected (YES in step S642), the process proceeds to step S644. On the other hand, when "send message on this day" button 724 is not selected (NO in step S642), the process proceeds to step S646.

In step S644, CPU 40 executes the message creation subroutine assuming the selected date in the calendar as the year, month and day of interest. The year, month and day of interest is added as information indicating the designated day of opening the created message. After this message creation subroutine is executed, the process proceeds to step S646.

In step S646, CPU 40 determines whether a message icon has been selected or not. When the message icon is selected (YES in step S646), the process proceeds to step S648. On the other hand, when the message icon is not selected (NO in step S646), the process proceeds to step S652.

In step S648, CPU 40 refers to ROM/RTC 48 to obtain the current time and day, and determines whether the current time point coincides with the date brought in correspondence with the selected message icon or has passed that date. When the current time point coincides with the date brought in correspondence with the selected message icon or has passed that date (YES in step S648), the process proceeds to step S650. On the other hand, when the current time point does not coincide with the date brought in correspondence with the selected message icon and has not passed that date (NO in step S648), the processing in step S650 is skipped and the process proceeds to step S652.

In step S650, CPU 40 has the substance stored in reception message box 44*b* of flash memory 44 displayed in a selectable manner. Then, the process proceeds to step S652.

In step S652, CPU 40 determines whether any thumbnail image displayed in the daily calendar has been selected or not. When any thumbnail image is selected (YES in step S652), the process proceeds to step S654. On the other hand, when no thumbnail image is selected (NO in step S652), the process proceeds to step S658.

In step S654, CPU 40 refers to ROM/RTC 48 to obtain the current time and day, and determines whether the current time point is within the accessible time period (the period from the time and day of start of availability to the time and day of end of availability) of the content (motion picture) corresponding to the selected thumbnail image. More specifically, CPU 40 specifies the motion picture ID brought in correspondence with the selected thumbnail image and obtains (G5-3) time and day of start of availability and (G5-4) time and day of end of availability corresponding to the motion picture ID described in the downloaded daily calendar data. Then, CPU 40 compares the obtained time and day of start of availability and time and day of end of availability with the current time point (current date).

When the current time point is within the accessible time period of the content (motion picture) corresponding to the selected thumbnail image (YES in step S654), the motion picture reproduction subroutine is executed (step S656). After this motion picture reproduction subroutine is executed, the process proceeds to step S658. On the other hand, when the current time point is not within the accessible time period of the content (motion picture) corresponding to the selected thumbnail image (NO in step S654), CPU 40 prohibits reproduction of the selected content (motion picture). Then, the process proceeds to step S658.

In step S658, CPU 40 determines whether any literary calendar headword displayed in the daily calendar has been selected or not. When any literary calendar headword is selected (YES in step S658), the process proceeds to step S660. On the other hand, when no literary calendar headword is selected (NO in step S658), the process returns to step S640.

In step S660, CPU 40 has a more detailed literary calendar displayed based on the image and/or the literary calendar texts brought in correspondence with the selected literary calendar. Thereafter, the process returns to step S640.

In step S662, CPU 40 determines whether the "back" button has been selected or not. When the "back" button is selected (YES in step S662), the process returns. On the other hand, when the "back" button is not selected (NO in step S662), the process returns to step S614.

<Variation of Calendar Data>

In the weekly calendar data shown in FIG. 47A, a configuration in which whether distribution of the content to the user is permitted or not is determined based on the time and day defined by (F5-3) time and day of start of availability and (F5-4) time and day of end of availability has been illustrated.

Figure 50:
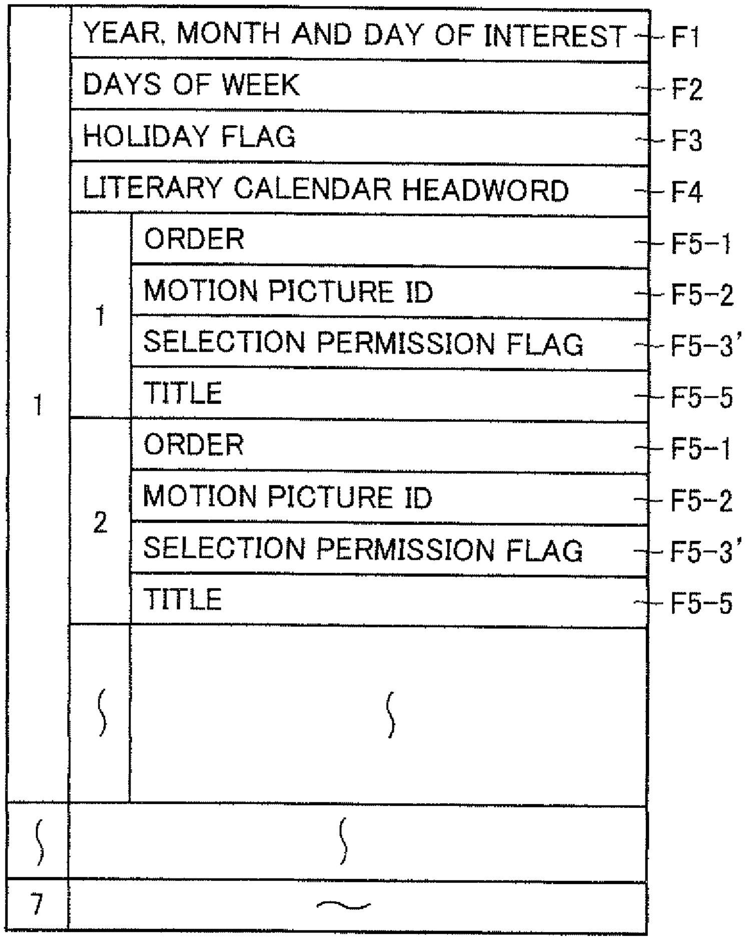
FIG. 50 is a diagram showing an exemplary data structure of weekly calendar data according to a variation of the embodiment of the present invention.

Instead of such a configuration, a configuration using the intended time and day at which distribution of the content is started and information indicating whether or not to permit distribution of the content prior to that time and day may be adopted. FIG. 50 shows an exemplary data structure of weekly calendar data according to a variation of the embodiment of the present invention. The weekly calendar data shown in FIG. 50 includes (F5-3') a selection permission flag instead of (F5-3) time and day of start of availability and (F5-4) time and day of end of availability in the weekly calendar data shown in FIG. 47A. (F5-3') selection permission flag stores a flag value as to whether or not to permit distribution of a content of interest prior to a day of release, which is (F-1) year, month and day of interest.

More specifically, when any content (or thumbnail image indicating the content) is selected, CPU 40 of game device 12 refers to ROM/RTC 48 to obtain the current time and day, and refers to the corresponding weekly calendar data. Then, CPU 40 determines whether the current time point is after (F1) year, month and day of interest or not. When the current time point is after (F1) year, month and day of interest, downloading and reproduction of the selected content is started. On the other hand, when the current time point is not after (F1) year, month and day of interest, CPU 40 of game device 12 refers to (F5-3') selection permission flag and when this flag value permits distribution prior to the day of release, downloading and reproduction of the selected content is started. In contrast, when the flag value stored in (F5-3') selection permission flag does not permit distribution prior to the day of release, downloading of the selected content is not performed.

<Search Function>

Figure 51A:
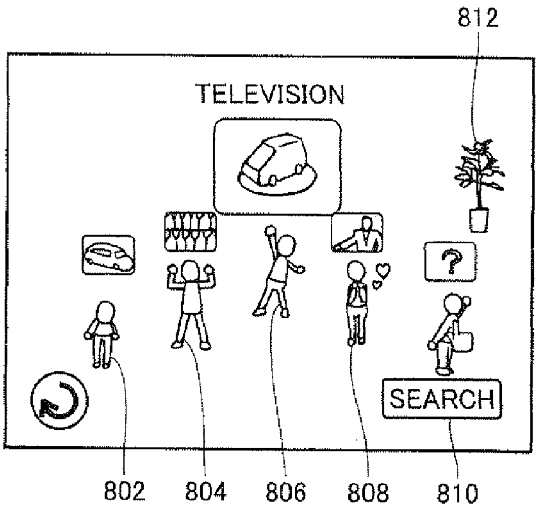
FIGS. 51A to 51D are diagrams showing an exemplary screen displayed when a content search subroutine is executed in the game device according to the embodiment of the present invention.

Referring next to FIGS. 51A to 51D, processing performed when the user operates controller 22 to select television object 512 displayed on the main screen will be described. When television object 512 is selected on the main screen shown in FIG. 11, CPU 40 of game device 12 has the content selection screen as shown in FIG. 51A displayed, by executing the content search subroutine.

In the content selection screen shown in FIG. 51A, such animation that a plurality of characters behave in a predetermined manner is shown. More specifically, functions of "new arrival content display," "high-satisfaction content display," "recommended content display," and "favorite content display" are allocated to characters 802, 804, 806, and 808 respectively, and when the user operates controller 22 to point to any character with a cursor or the like, explanation thereof is displayed in a balloon object. In addition, when the user operates controller 22 to select any character, a list of contents in accordance with the corresponding function is displayed. When any content is selected, the motion picture reproduction subroutine as shown in FIG. 29 is executed.

In the content selection screen shown in FIG. 51A, foliage plant object 812 is displayed in a selectable manner, and when the user operates controller 22 to select foliage plant object 812, the sponsor selection screen subroutine as shown in FIG. 34 is executed.

Figure 51C:
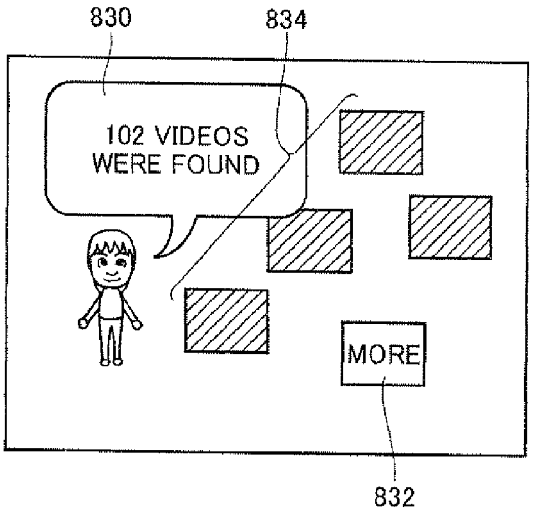
Figure 51B:
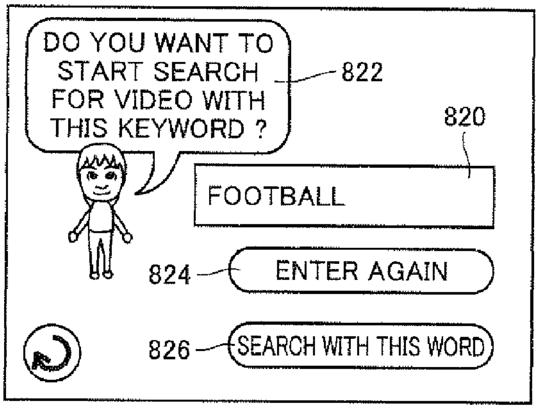
Figure 51D:
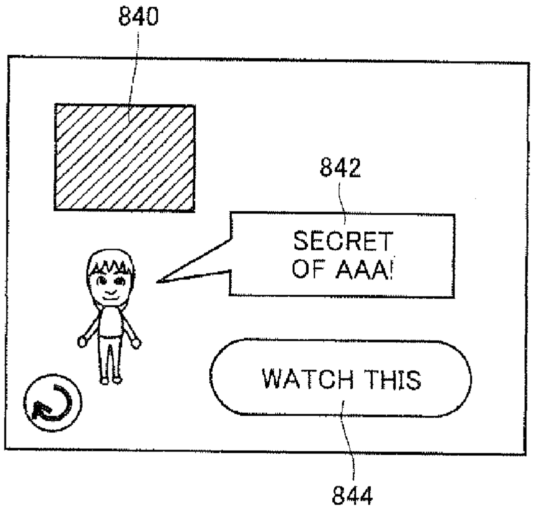

In addition, a function of "content search" is allocated to character 810, and when the user operates controller 22 to select character 810, a screen providing the content search function as shown in FIGS. 51B to 51D is displayed.

Namely, when character 810 is selected, CPU 40 of game device 12 has a search keyword entry screen as shown in FIG. 51B displayed. In the search keyword entry screen shown in FIG. 51B, an entry box 820 for entering a keyword, an "enter again" button 824, and a "search with this word" button 826 are displayed. Moreover, in a balloon object 822 proximate to the character, a message that "do you want to start search for video with this keyword?" is displayed.

When the user selects entry box 820, CPU 40 of game device 12 has a character input screen, for example like a keyboard, displayed. As the user successively selects an icon corresponding to a key of the keyboard displayed on this character input screen, a character is input in entry box 820. Thereafter, when the user selects "search with this word" button 826, CPU 40 of game device 12 transmits the input message to distribution server 104. On the other hand, when the user selects "enter again" button 824, CPU 40 of game device 12 resets the character string entered in entry box 820.

Distribution server 104 basically regards all contents present in the server itself as search targets. Namely, when distribution server 104 receives a keyword from any game device 12, distribution server 104 extracts motion picture information including all or a part of the received keyword(s) among motion picture information brought in correspondence with all contents stored in the server itself. In addition, distribution server 104 sends back to game device 12, representative thumbnail image of each content corresponding to the extracted motion picture and information indicating the number of extracted contents. Game device 12 that received this information has the search result screen as shown in FIG. 51C displayed.

During a period from transmission of a search keyword to distribution server 104 until reception of a search result from distribution server 104, CPU 40 of game device 12 may display such a message as "now searching for video . . . wait for a moment" in a balloon object proximate to the character, in order to inform the user of the fact that search is in progress.

In the search result screen shown in FIG. 51C, a balloon object 830 proximate to the character shows the number of contents retrieved as hits, such as "102 videos were found." At the same time, in the search result screen shown in FIG. 51C, thumbnail images 834 of contents (in the example in FIG. 51C, four contents) having motion picture information having a relatively high hit rate among, the retrieved contents are displayed. In the search result screen shown in FIG. 51C, a "more" button 832 is displayed, and when the user selects this "more" button 832, thumbnail images of more retrieved contents are displayed.

When a search result received from distribution server 104 indicates zero, that is, when no content that hits the search keyword was found, a message urging the user to enter again a keyword may be displayed. For example, CPU 40 of game device 12 causes a balloon object proximate to the character to display a message: "No video corresponding to that keyword was found. Try another keyword."

When the user selects any thumbnail image in the search result screen shown in FIG. 51C, CPU 40 of game device 12 has a reproduction confirmation screen shown in FIG. 51D displayed. In the reproduction confirmation screen shown in FIG. 51D, a selected thumbnail image 840 is zoomed in for display and a comment thereon is displayed in a balloon object 842 (in the example shown in FIG. 51D, "secret of AAA!"). In addition, in the reproduction confirmation screen shown in FIG. 51D, a "watch this" button 844 is also displayed, and when the user selects this "watch this" button 844, reproduction of the selected content is started.

<Data Exchange in Search Function>

Figure 52:
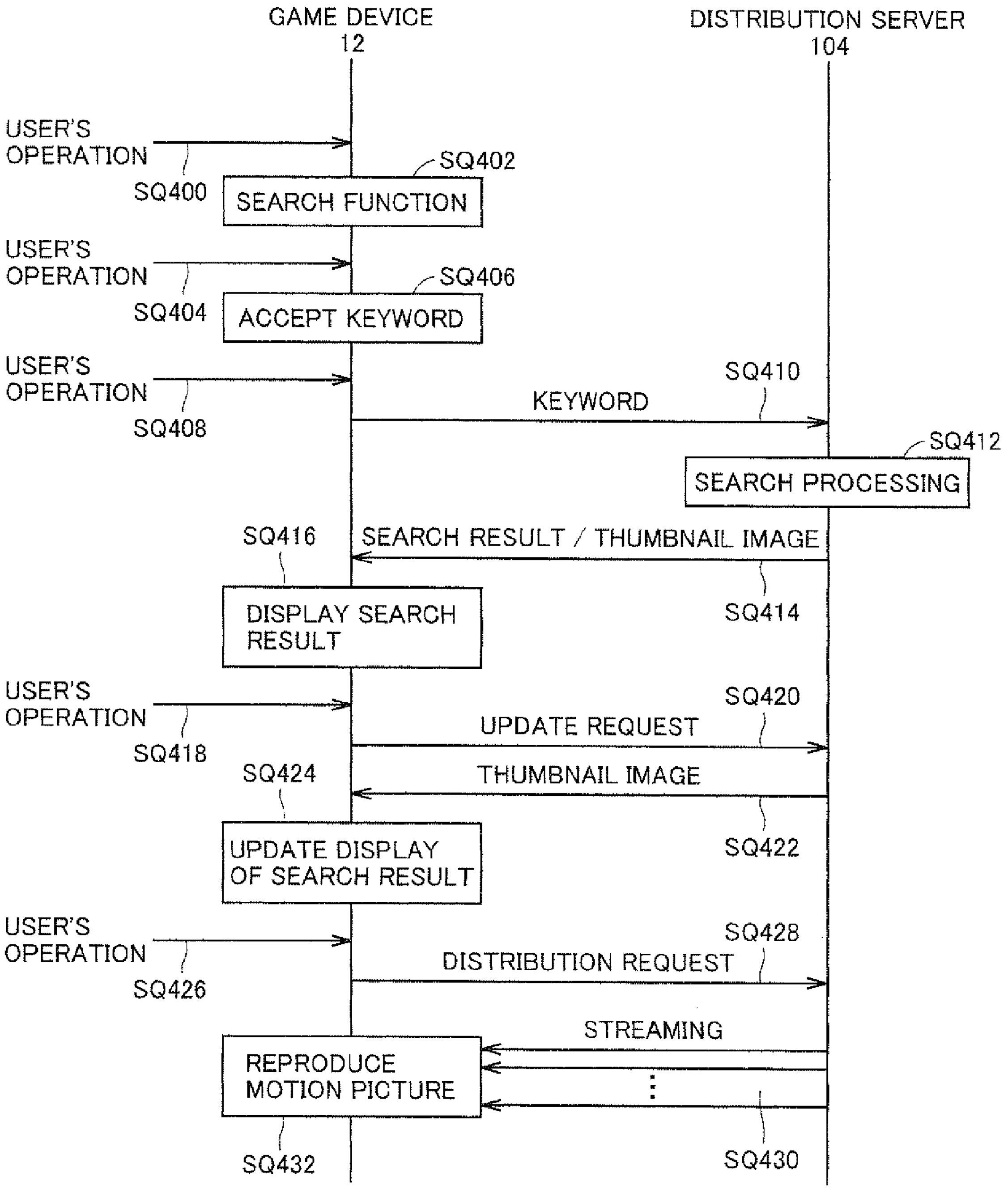
FIG. 52 is a sequence diagram showing a procedure for processing a search function in the distribution system according to the embodiment of the present invention.

Referring next to FIG. 52, data exchange in the search function shown in FIGS. 51A to 5 ID above will be described.

Referring to FIG. 52, when a user's operation to indicate execution of the search function is performed (sequence SQ400), CPU 40 of game device 12 starts execution of the search function (sequence SQ402). In succession, when a user's operation to enter a search keyword is performed (sequence SQ404), CPU 40 of game device 12 accepts the entered keyword (sequence SQ406). In addition, when a user's operation to indicate start of search is performed (sequence SQ408), CPU 40 of game device 12 transmits an entered keyword to distribution server 404 (sequence SQ410).

In response to this transmitted keyword, distribution server 104 performs search processing based on the keyword for the motion picture information brought in correspondence with each content stored in the server itself (sequence SQ412). Then, distribution server 104 transmits a search result extracted in the search processing and a thumbnail image included in the search result to game device 12 (sequence SQ414).

CPU 40 of game device 12 has the search result as shown in FIG. 51C displayed based on the search result and the thumbnail image received from distribution server 104 (sequence SQ416). Thereafter, when a user's operation to request more retrieved contents is performed (sequence SQ418), CPU 40 of game device 12 transmits an update request to distribution server 104 (sequence SQ420). In response to this update request, distribution server 104 transmits a thumbnail image that has not yet been transmitted in the extracted search result to game device 12 (sequence SQ422). CPU 40 of game device 12 updates display of the search result based on a new thumbnail image received from distribution server 104 (sequence SQ424).

In addition, when a user's operation to indicate selection of any motion picture content is performed (sequence SQ426), CPU 40 of game device 12 transmits a distribution request including the motion picture ID corresponding to the selected content to distribution server 104 (sequence SQ428). In response to this distribution request, distribution server 104 starts distribution (typically, streaming-play) of the designated content stored in the server itself to game device 12 (sequence SQ430). CPU 40 of game device 12 generates this distributed motion picture (sequence SQ432).

<Processing Procedure of Search Function>

Figure 53:
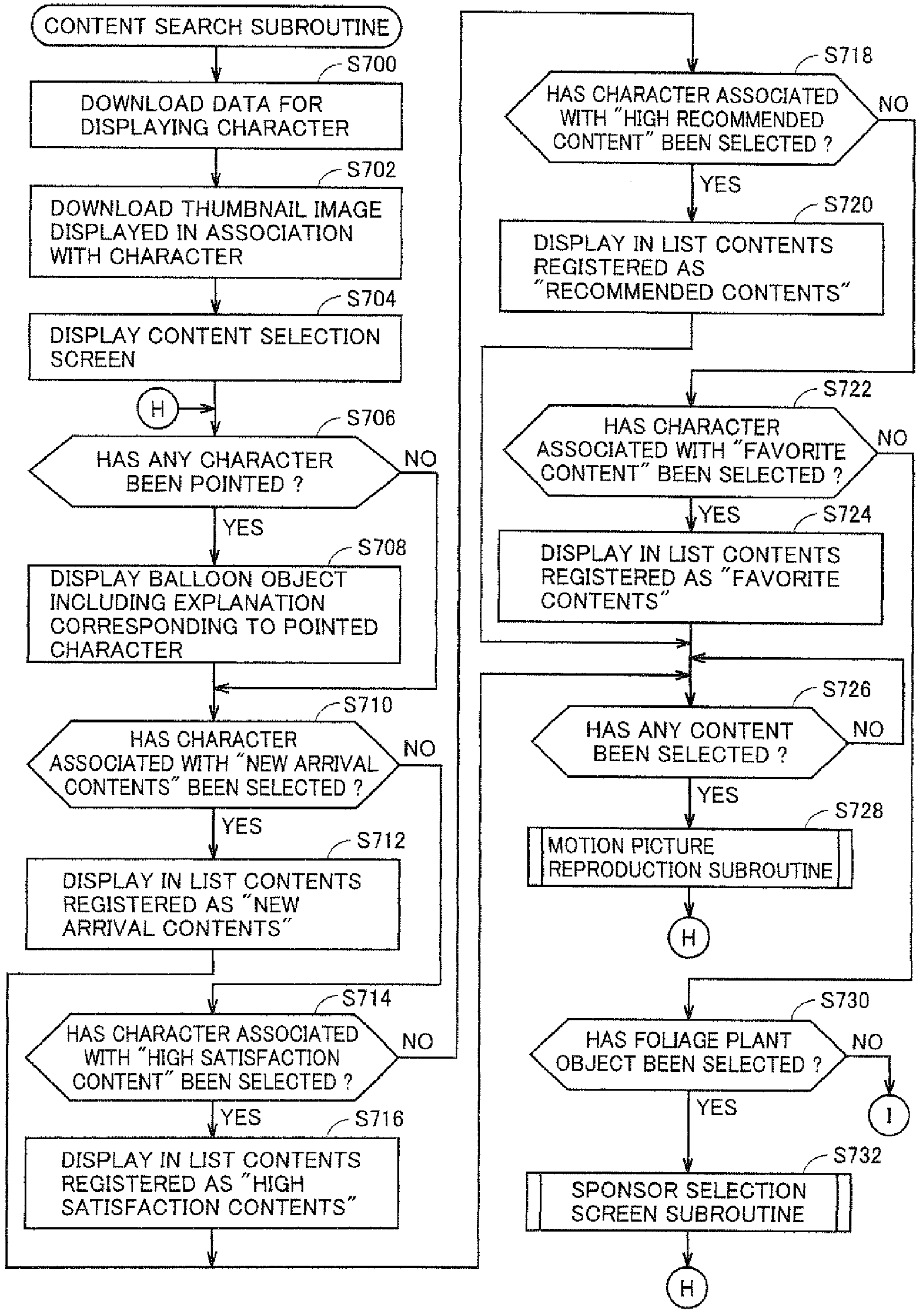
FIG. 53 is a flowchart showing a procedure (No. 1) for processing the content search subroutine in the distribution system according to the embodiment of the present invention.
Figure 54:
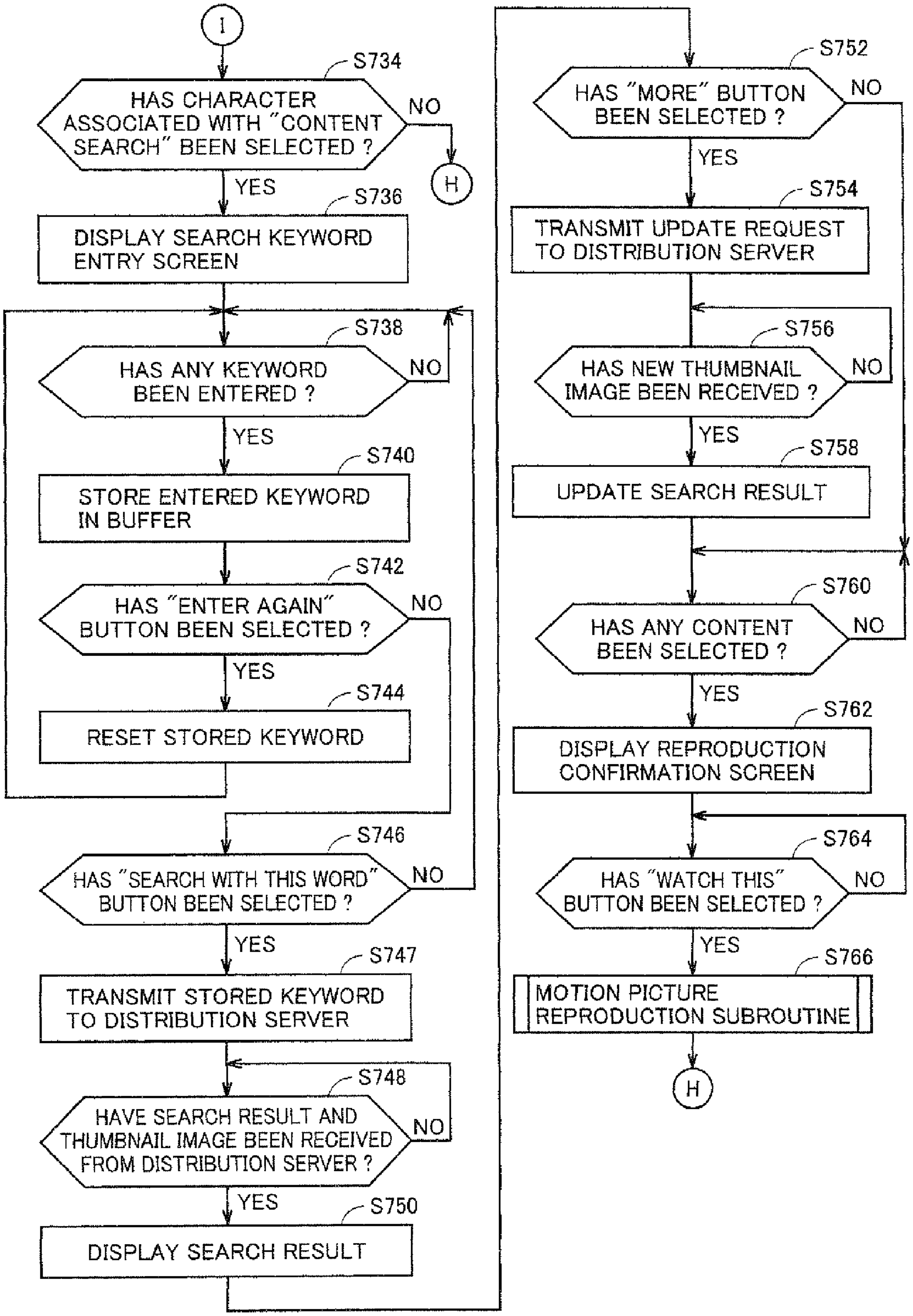
FIG. 54 is a flowchart showing a procedure (No. 2) for processing the content search subroutine in the distribution system according to the embodiment of the present invention.

Referring next to FIGS. 53 and 54, the content search subroutine (details in step S170 in FIG. 23) providing the search function shown in FIGS. 51A to 51D above will be described. Each step shown in FIGS. 53 and 54 is provided by execution of the content distribution application according to the present embodiment by CPU 40 of game device 12.

Referring to FIGS. 53 and 54, initially, CPU 40 of game device 12 downloads data for displaying a character on the content selection screen shown in FIG. 51A from distribution server 104 (step S700). In successive step S702, CPU 40 downloads a thumbnail image to be displayed in association with each downloaded character from distribution server 104. Namely, CPU 40 obtains thumbnail images representative of a "new arrival content," a "high-satisfaction content," a "recommended content", and a "favorite content" displayed on the content selection screen shown in FIG. 51A, respectively. Thereafter, in step S704, CPU 40 causes monitor 34 to display the content selection screen shown in FIG. 51A. Then, the process proceeds to step S706.

In step S706, CPU 40 determines whether any character on the content selection screen shown in FIG. 51A has been pointed or not. When any character on the content selection screen has been pointed (YES in step S706), the process proceeds to step S708. On the other hand, when no character on the content selection screen is pointed (NO in step S706), the process proceeds to step S710.

In step S708, CPU 40 causes monitor 34 to display a balloon object including explanation corresponding to the pointed character. Thereafter, the process proceeds to step S710.

In step S710, CPU 40 determines whether character 802 associated with the "new arrival content" has been selected or not. When character 802 associated with the "new arrival content" is selected (YES in step S710), CPU 40 has contents registered as "new arrival contents" displayed in a list (step S712). It is noted that information on contents registered as the "new arrival contents" is downloaded from distribution server 104 at appropriate timing. Then, the process proceeds to step S726

On the other hand, when character 802 associated with the "new arrival content" is not selected (NO in step S710), CPU 40 determines whether character 804 associated with the "high-satisfaction content" is selected or not (step S714). When character 804 associated with the "high-satisfaction content" is selected (YES in step S714), CPU 40 has contents registered as the "high-satisfaction contents" displayed in a list (step S716). Then, the process proceeds to step S726.

On the other hand, when character 804 associated with the "high-satisfaction content" is not selected (NO in step S714), CPU 40 determines whether character 806 associated with the "recommended content" has been selected or not (step S718). When character 806 associated with the "recommended content" is selected (YES in step S718), CPU 40 has contents registered as the "recommended contents" displayed in a list (step S720). Then, the process proceeds to step S726.

On the other hand, when character 806 associated with the "recommended content" is not selected (NO in step S718), CPU 40 determines whether character 808 associated with the "favorite content" has been selected or not (step S722). When character 808 associated with the "favorite content" is selected (YES in step S722), CPU 40 has contents registered as the "favorite contents" displayed in a list (step S724). Then, the process proceeds to step S726.

On the other hand, when character 808 associated with the "favorite content" is not selected (NO in step S722), the process proceeds to step S730.

In step S726, CPU 40 determines whether any content in a list of displayed contents has been selected or not. When no content in the list of displayed contents is selected (NO in step S726), the processing in step S726 and subsequent step is repeated.

On the other hand, when any content in the list of displayed contents is selected (YES in step S726), CPU 40 executes the motion picture reproduction subroutine for reproducing the selected content (step S728). After this motion picture reproduction subroutine is executed, the process returns to step S706.

In contrast, in step S730, CPU 40 determines whether foliage plant object 812 has been selected or not. When foliage plant object 812 is selected (YES in step S730), CPU 40 executes the sponsor selection screen subroutine (step S732). After the sponsor selection screen subroutine is executed, the process returns to step S706.

On the other hand, when foliage plant object 812 is not selected (NO in step S730), CPU 40 determines whether character 810 associated with "content search" has been selected or not (step S734). When character 810 associated with "content search" is not selected (NO in step S734), the process returns to step S706.

On the other hand, when character 810 associated with "content search" is selected (YES in step S734), CPU 40 has the search keyword entry screen as shown in FIG. 51B displayed (step S736). In successive step S738, CPU 40 determines whether any keyword has been entered in the search keyword entry screen or not. When no keyword is entered in the search keyword entry screen (NO in step S738), the processing in step S738 is repeated.

On the other hand; when some keyword is entered in the search keyword entry screen (YES in step S738), CPU 40 causes the buffer to store the entered keyword (step S740). In successive step S742, CPU 40 determines whether "enter again" button 824 in the search keyword entry screen as shown in FIG. 51B has been selected or not. When "enter again" button 824 is selected (YES in step S742), CPU 40 resets the keyword stored in the buffer (step S744). Thereafter, the process returns to step S738.

On the other hand, when "enter again" button 824 is not selected (NO in step S742), CPU 40 determines whether "search with this word" button 826 in the search keyword entry screen shown in FIG. 51B has been selected or not (step S746). When "search with this word" button 826 is not selected (NO in step S746), the process returns to step S738.

In contrast, when "search with this word" button 826 is selected (YES in step S746), CPU 40 transmits the keyword stored in the buffer to distribution server 104 (step S747). In successive step S748, CPU 40 determines whether the search result and the thumbnail image have been received from distribution server 104 or not. When the search result and the thumbnail image have not been received from distribution server 104 (NO in step S748), the processing in step S748 is repeated.

On the other hand, when the search result and the thumbnail image are received from distribution server 104 (YES in step S748), CPU 40 has the search result as shown in FIG. 51C displayed based on the search result and the thumbnail image received from distribution server 104 (step S750). In successive step S752, CPU 40 determines whether "more" button 832 in the search result screen as shown in FIG. 51C has been selected or not (step S752). When "more" button 832 is not selected (NO in step S752), the process proceeds to step S760.

In contrast, when "more" button 832 is selected (YES in step S752), CPU 40 transmits the update request for updating the search result to distribution server 104 (step S754). In successive step S756, CPU 40 determines whether a new thumbnail image has been received from distribution server 104 or not. When the new thumbnail image is not received from distribution server 104 (NO in step S756), the processing in step S756 is repeated.

On the other hand, when the new thumbnail image is received from distribution server 104 (YES in step S756), CPU 40 updates the search result as shown in FIG. 51C based on the new thumbnail image received from distribution server 104 (step S758). Thereafter, the process proceeds to step S760.

In step S760, CPU 40 determines whether any content in the list of contents displayed as the search result has been selected or not. When no content is selected (NO in step S760), the processing in step S760 and subsequent step is repeated On the other hand, when any content is selected (YES in step S760), CPU 40 has the reproduction confirmation screen for the selected content as shown in FIG. 51D displayed (step S762). In successive step S764, CPU 40 determines whether "watch this" button 844 in the reproduction confirmation screen as shown in FIG. 5 ID has been selected or not. When "watch this" button 844 is not selected (NO in step S764), the process returns to step S764.

On the other hand, when "watch this" button 844 is selected (YES in step S764), CPU 40 executes the motion picture reproduction subroutine in order to reproduce the selected content (step S766). After this motion picture reproduction subroutine is executed, the process returns to step S706.

Other Embodiments

In the embodiments described above, game device 12 and portable game device 210 have been illustrated by way of representative examples of the information processing device according to the present invention, however, the information processing device is not limited thereto. Namely, an application executable by a personal computer may be provided as a program according to the present invention. Here, the program according to the present invention may be incorporated as a partial function of various applications executed on the personal computer.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-transitory storage medium comprising a program, said program being executed by an information processing device connected to be able to communicate with a server capable of content distribution and interacting with a display device, said program causing a computer representing the information processing device to:

obtain calendar information from the server that includes a data structure having at least one piece of date information and specific content information relating to a specific content, different formats of said data structure are provided depending on a display type of a calendar screen, the at least one piece of specific content information is associated with the date information in the data structure and the specific content information varies based on the format of said data structure that is provided depending on the display type of the calendar screen, the specific content information including identification information for specifying the specific content from a plurality of content stored in the server;

output the calendar screen including areas divided for each date while information for introducing the specific content associated with a corresponding date is allocated to the areas divided for each date included in said calendar screen, based on said calendar information; and obtain the specific content selected on said calendar screen in response to a user's operation from said server and output the specific content on said display device.

2. The non-transitory storage medium according to claim 1, wherein said program further causes said computer to determine whether the specific content can be selected or not based on said specific content information.

3. The non-transitory storage medium according to claim 2, wherein said specific content information includes information indicating an accessible time period, said computer is further configured to interact with a time counting device, determine, based on comparison of a current time point with the accessible time period of a specific content of interest, whether the specific content of interest can be selected, and output the specific content of interest only when the current time point is within the accessible time period of said specific content of interest.

4. The non-transitory storage medium according to claim 3, wherein the information indicating the accessible time period of the specific content is defined based on corresponding said date information.

5. The non-transitory storage medium according to claim 4, wherein the information indicating the accessible time period of the specific content includes permission information indicating whether or not distribution is permitted based on said date information, and whether said specific content of interest can be selected is determined based on the accessible time period determined by said date information and said permission information.

6. The non-transitory storage medium according to claim 3, wherein said specific content information is configured as information indicating the accessible time period of said specific content, such that definition limiting the accessible time period to a specific period and definition not limiting the accessible time period to a specific time period can be set.

7. The non-transitory storage medium according to claim 2, wherein said program further causes said computer to:

obtain a thumbnail image corresponding to each piece of specific content information included in said calendar information, and output obtained said thumbnail image as the information for introducing said specific content.

8. The non-transitory storage medium according to claim 2, wherein said program further causes said computer to:

determine whether a current time point is within said accessible time period for each piece of specific content information included in said calendar information, and change a manner of display on screen of the information for introducing said specific content, between specific content information for which the current time point has been determined as being within the accessible time period and specific content information for which the current time point has been determined as not being within the accessible time period.

9. The non-transitory storage medium according to claim 1, wherein said program further causes said computer to:

display an image for accepting a message creation instruction in correspondence with a date displayed on said calendar screen, generate a message in response to selection of said image for accepting the message creation instruction from a user, transmit generated said message to another information processing device, and add the date brought in correspondence, as a designated day of opening the message.

10. The non-transitory storage medium according to claim 9, wherein said program further causes said computer to:

receive said message from another information processing device, output received said message, determine, with regard to said received message, whether a current time point coincides with or has passed said designated day of opening the message added to that message, and output that message only when it is determined that the current time point coincides with or has passed said designated day of opening the message.

11. The non-transitory storage medium according to claim 1, wherein said specific content includes at least one of a motion picture and a still image, and said program further causes said computer to:

reproduce the motion picture when the specific content of interest is the motion picture, and display the still image when the specific content of interest is the still image.

12. A non-transitory storage medium comprising a program, said program being executed by an information processing device connected to be able to communicate with a server capable of content distribution and interacting with a display device, said program causing a computer representing the information processing device to:

obtain calendar information from the server that includes a data structure having at least one piece of a date of interest and specific content information relating to a specific content, different formats of said data structure are provided depending on a display type of a calendar screen, the at least one piece of specific content information is associated with the date of interest in the data structure and the specific content information varies based on the format of said data structure that is provided depending on the display type of the calendar screen, said specific content information including access permission information indicating whether access to the specific content is permitted before the date of interest comes, said specific content information further including identification information for specifying the specific content from a plurality of content stored in the server;

obtain a thumbnail image corresponding to each piece of specific content information included in said calendar information;

output the calendar screen including areas divided for each date while said thumbnail image of the specific content associated with a corresponding date is allocated to the areas divided for each date included in said calendar screen, based on said calendar information;

determine, when any thumbnail image allocated in said calendar screen is selected, with regard to the specific content corresponding to the selected thumbnail image, whether access to that specific content is permitted, based on whether access permission information indicating that access before corresponding said date of interest is permitted is defined and whether a current time point coincides with or has passed corresponding said date of interest; and obtain said specific content of interest from said server and output the specific content on said display device when it is determined that access to said specific content of interest is permitted.

13. An information processing device comprising at least one processor and connected to be able to communicate with a server capable of content distribution and interacting with a display device, the information processing device configured to:

obtain calendar information from the server that includes a data structure having at least one piece of date information and specific content information relating to a specific content, different formats of said data structure are provided depending on a display type of a calendar screen, the at least one piece of specific content information is associated with the date information in the data structure and the specific content information varies based on the format of said data structure that is provided depending on the display type of the calendar screen, the specific content information including identification information for specifying the specific content from a plurality of content stored in the server;

output the calendar screen including areas divided for each date while information for introducing the specific content based on said specific content information of the specific content associated with a corresponding date is allocated to the areas divided for each date included in said calendar screen, based on said calendar information; and obtain the specific content selected on said calendar screen in response to a user's operation from said server and output the specific content on said display device.

14. The non-transitory storage medium according to claim 1, wherein the specific content is obtained when a current point in time is within an accessible time period for obtaining said specific content.

15. The non-transitory storage medium according to claim 14, wherein the specific content is accessible after a start time of the accessible time period and is no longer accessible after an end time of the accessible time period.

16. The non-transitory storage medium according to claim 1, wherein a display type of said calendar screen is changed based upon a received input, and a format of said data structure changes to correspond to the changed display type.

17. The non-transitory storage medium according to claim 1, wherein said data structure having at least a first format and a second format corresponding to first and second display types of said calendar screen.

18. The non-transitory storage medium according to claim 17, wherein said first format of said data structure having a data content different from said second format of said data structure.

19. The non-transitory storage medium according to claim 1, wherein a format of said data structure varies based on a display type of said calendar screen, the format of said data structure including at least one selected from the group comprising a daily calendar data structure and/or a weekly calendar data structure.

20. The non-transitory storage medium according to claim 1, wherein the specific content is a motion picture.

21. The non-transitory storage medium according to claim 1, wherein a thumbnail image corresponding to the specific content is displayed on the calendar screen in association with the specific content.

22. The non-transitory storage medium according to claim 1, wherein the specific content is a motion picture and a thumbnail image corresponding to the motion picture is displayed on the calendar screen in association with the motion picture.

* * * * *